Jan. 1, 1963 E. K. WAGNER 3,071,028
METHOD OF AND APPARATUS FOR POSITIONING MACHINE PARTS
Filed Feb. 18, 1957 20 Sheets-Sheet 8
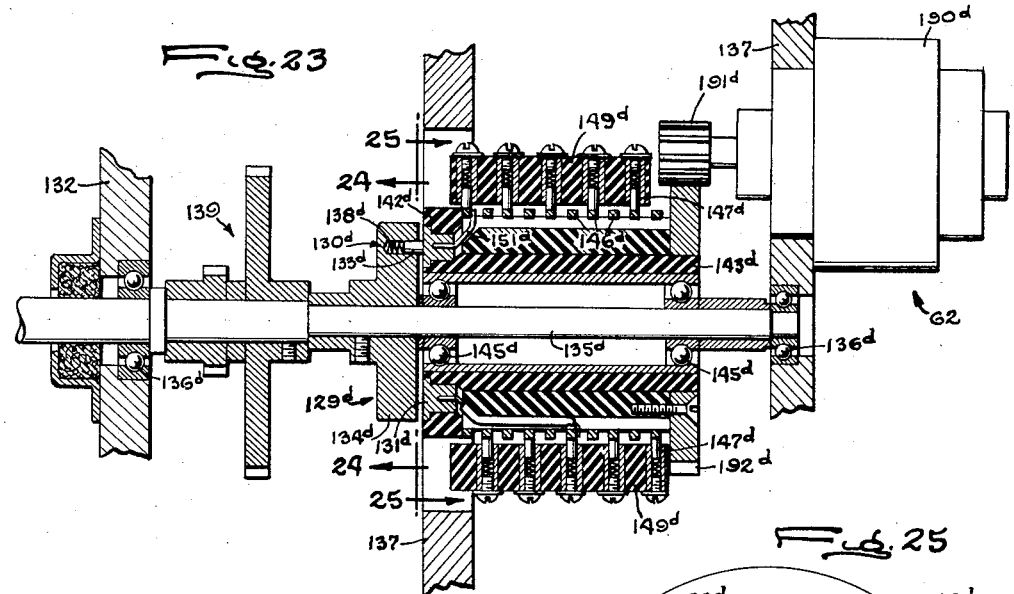
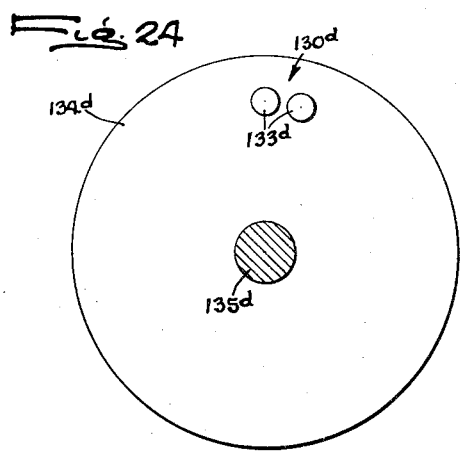
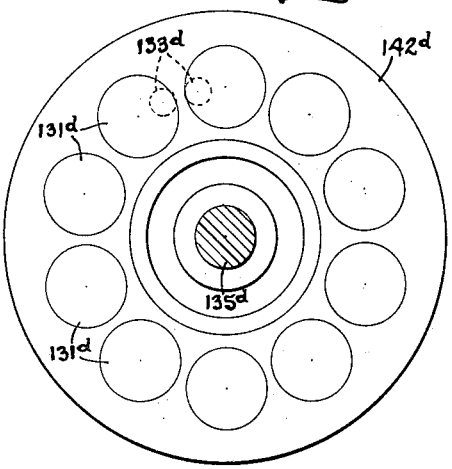
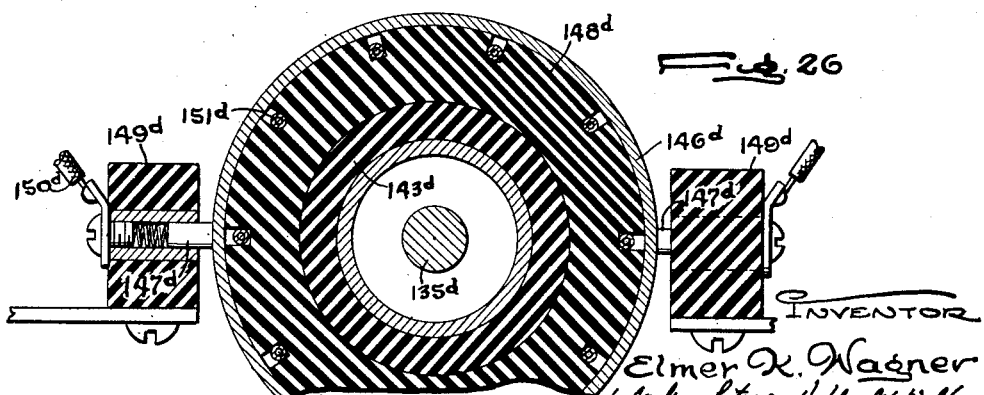

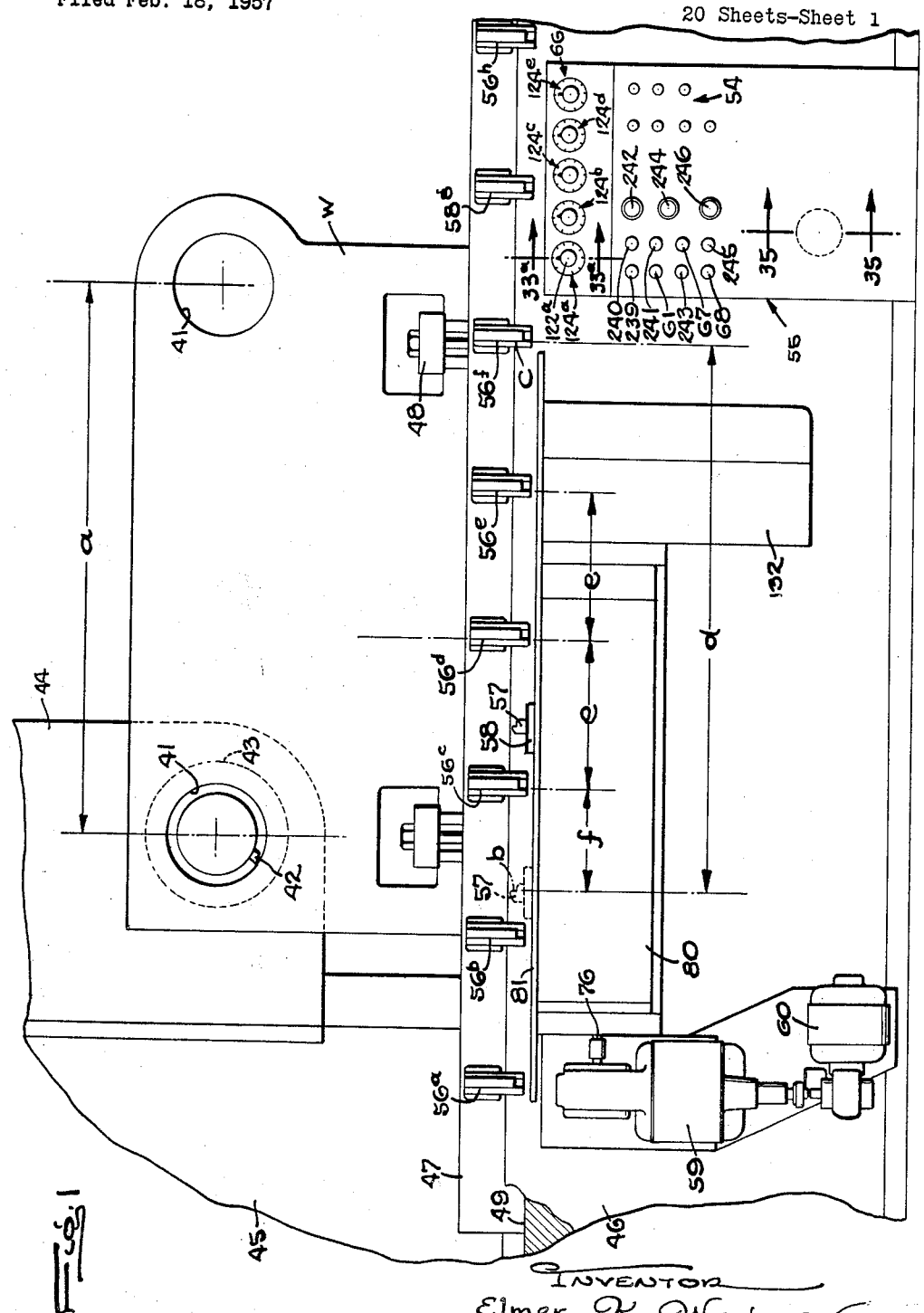

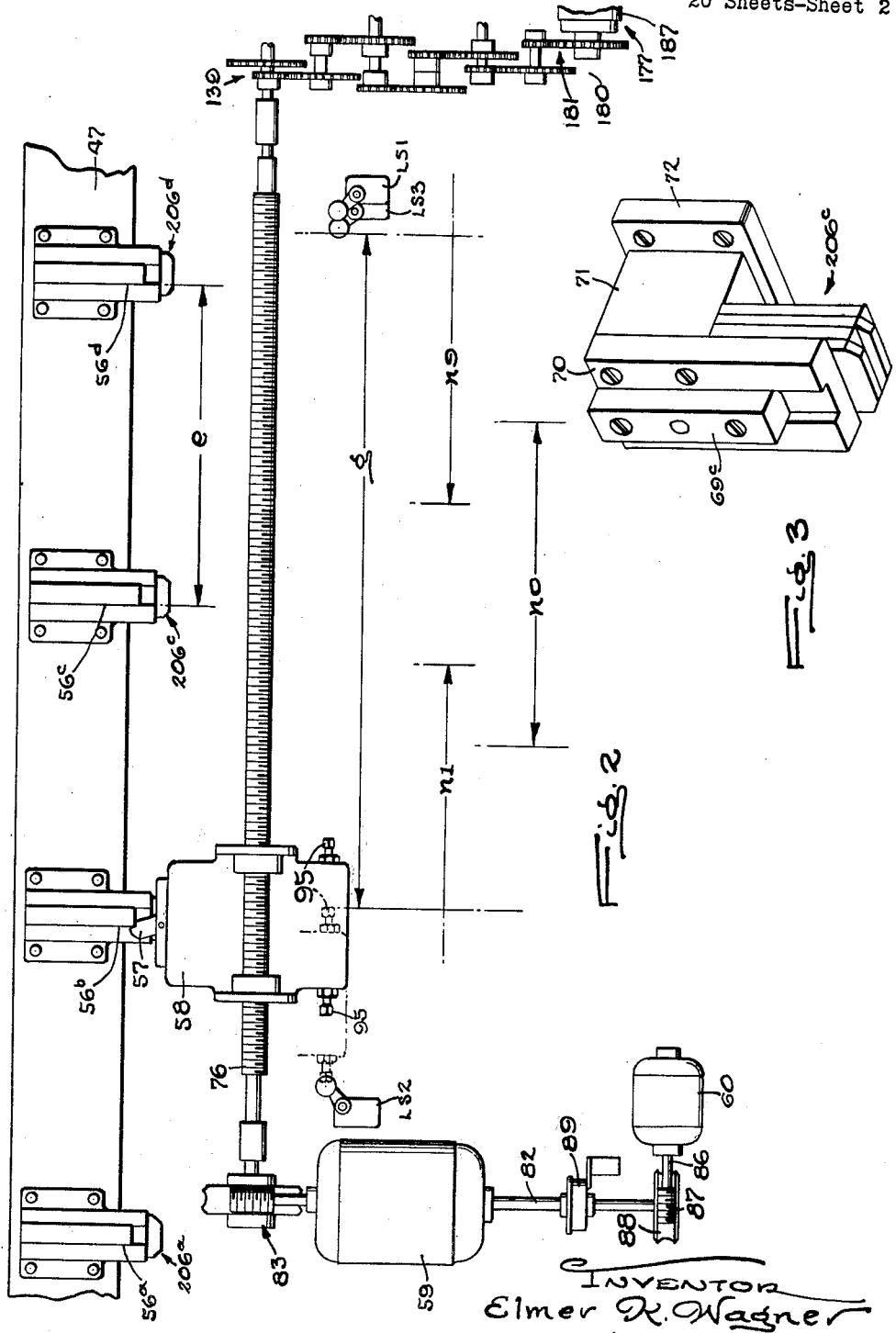

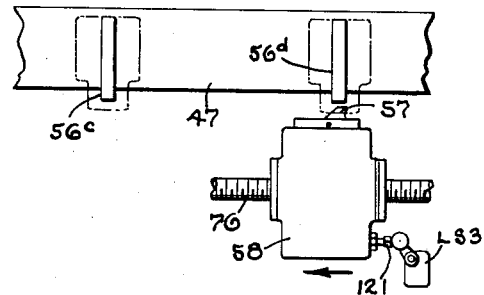
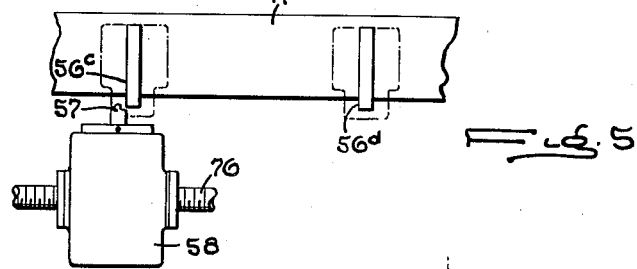
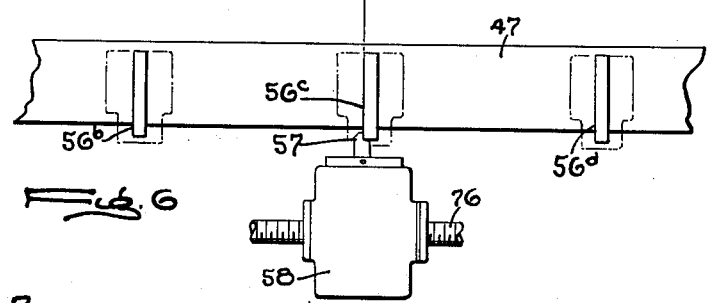
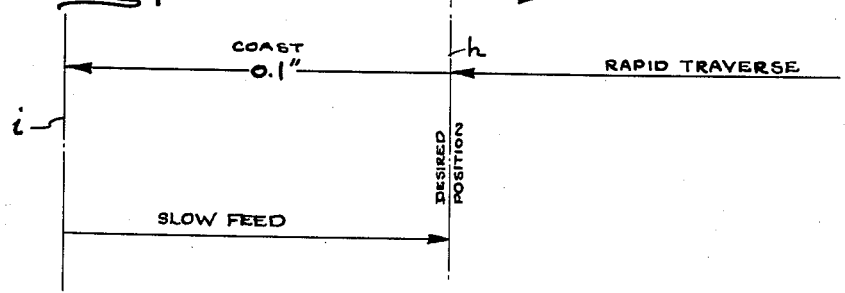

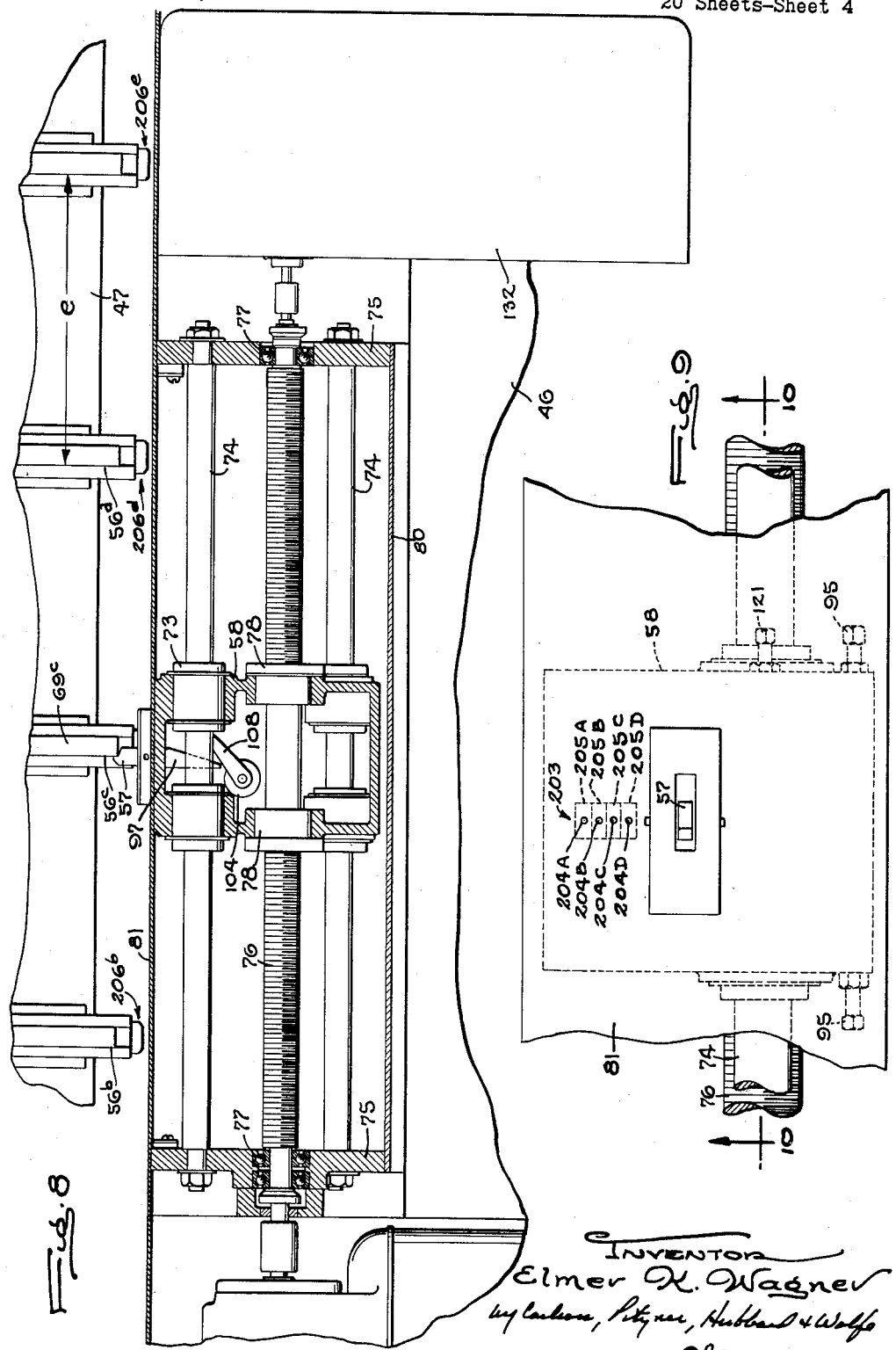

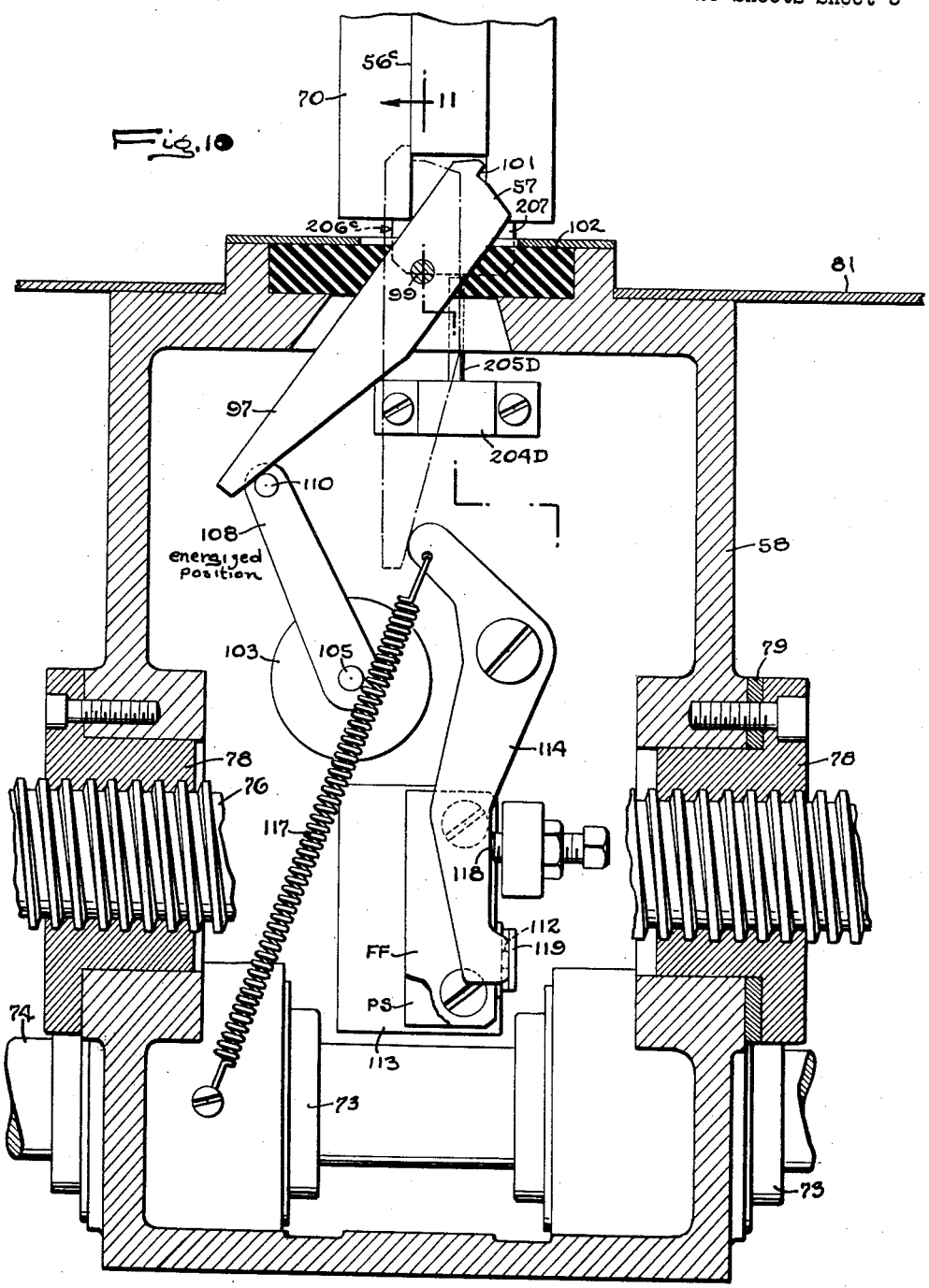

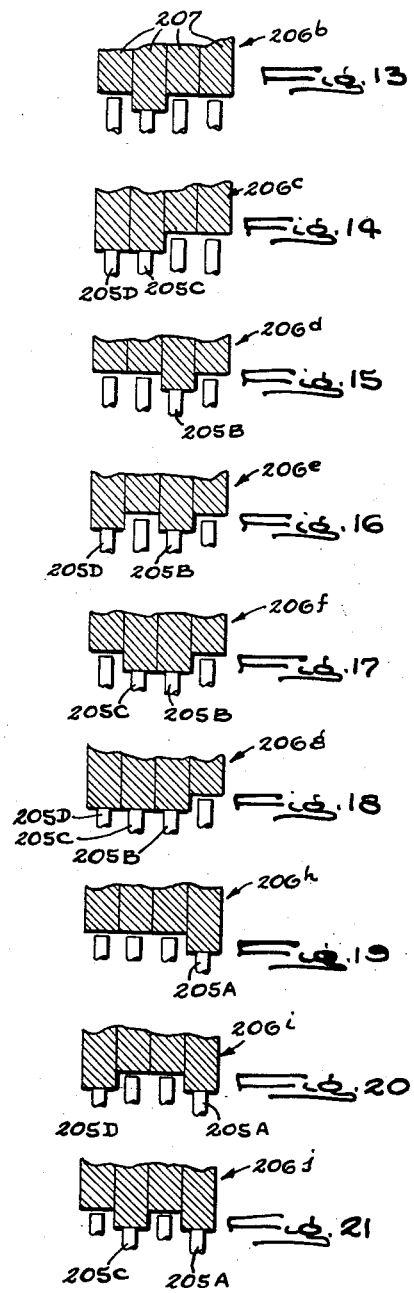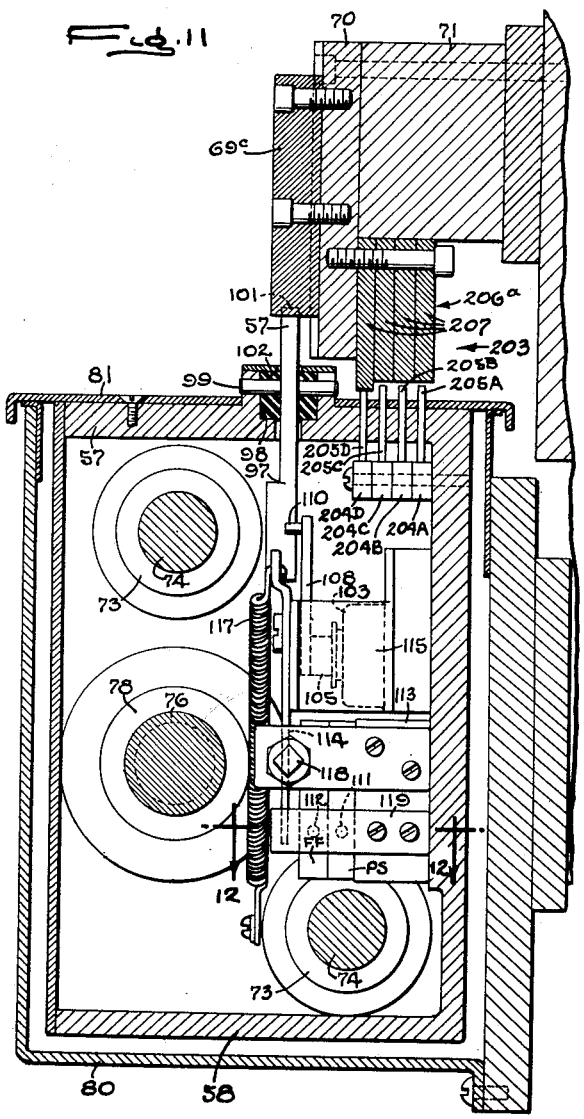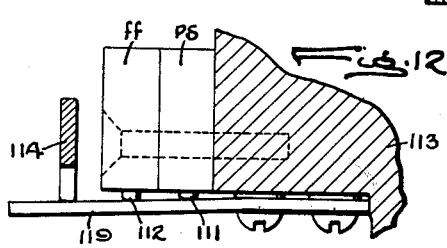

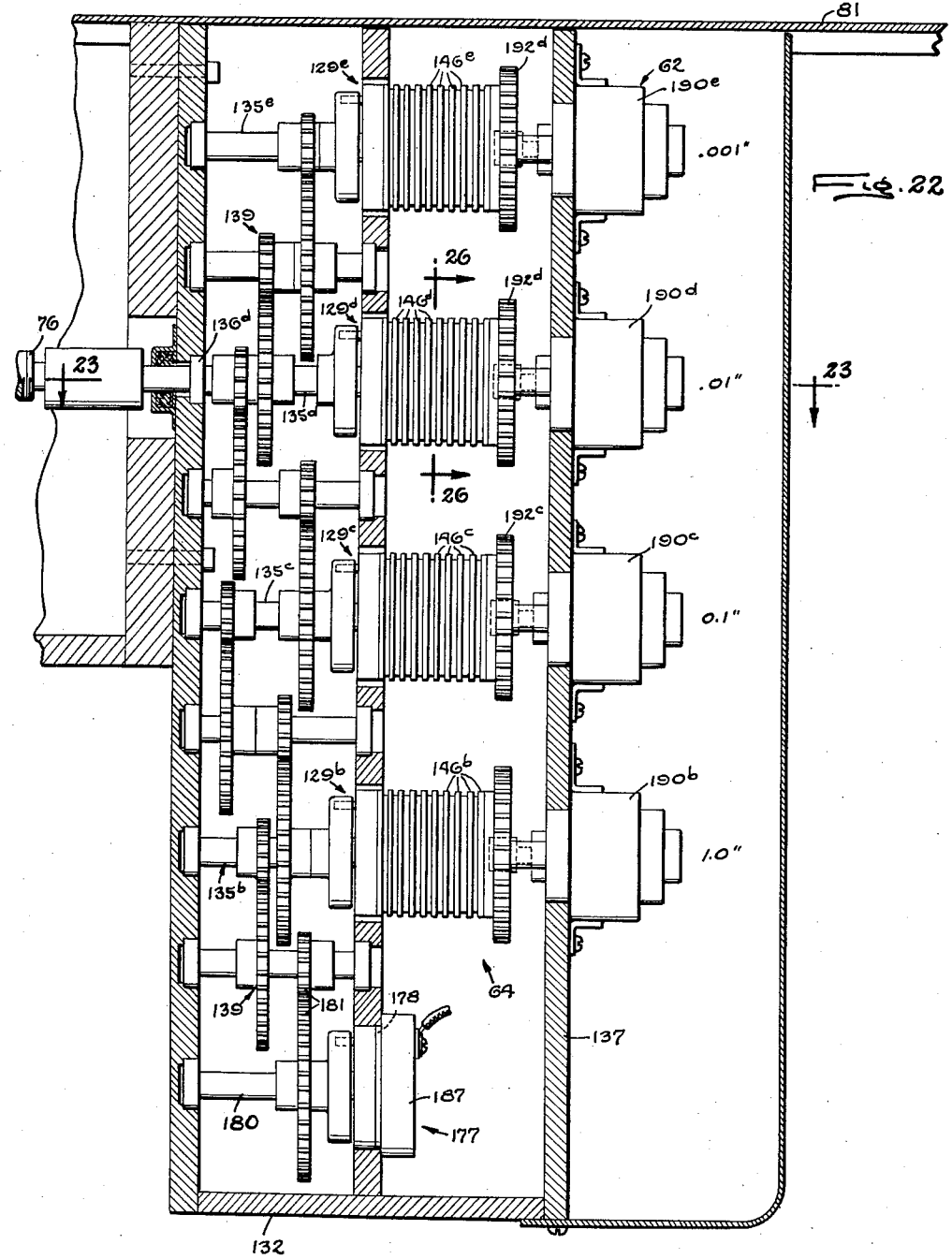

Jan. 1, 1963  E. K. WAGNER  3,071,028
METHOD OF AND APPARATUS FOR POSITIONING MACHINE PARTS
Filed Feb. 18, 1957  20 Sheets-Sheet 9
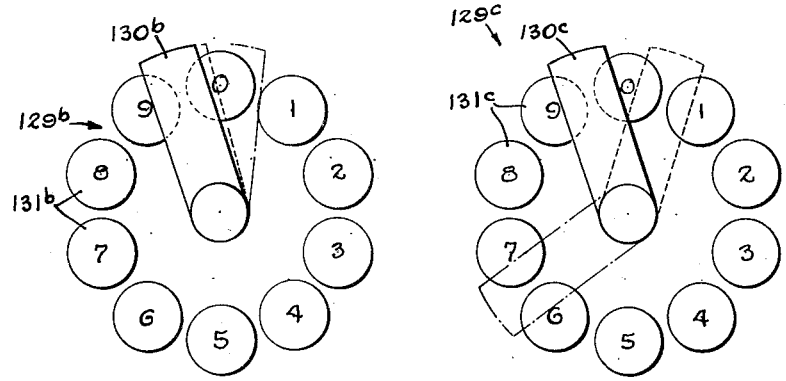
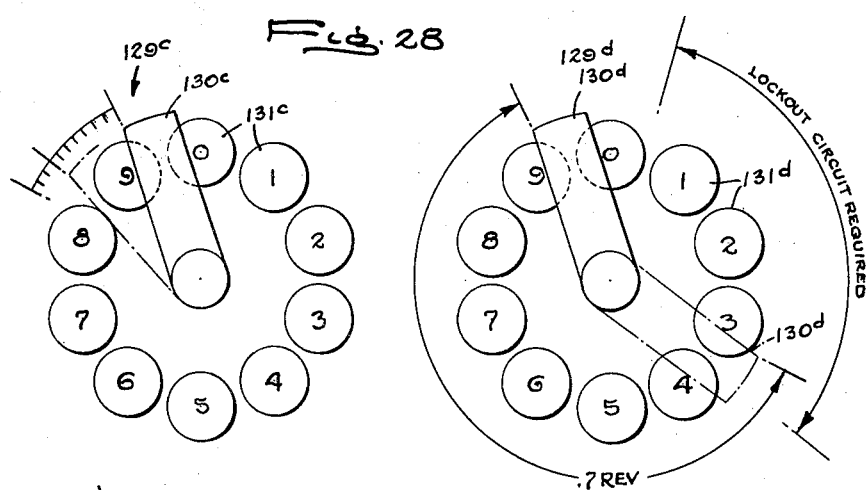
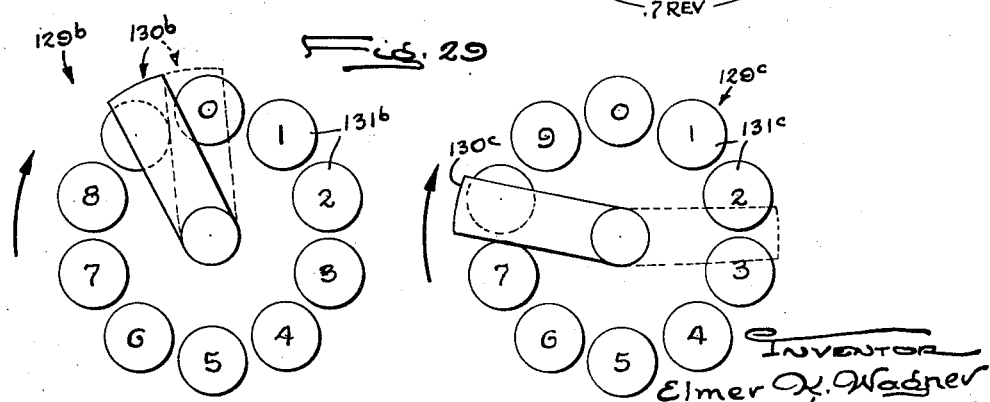
INVENTOR
Elmer K. Wagner
by Carlson, Pitzner, Hubbard & Wolfe
ATTORNEYS

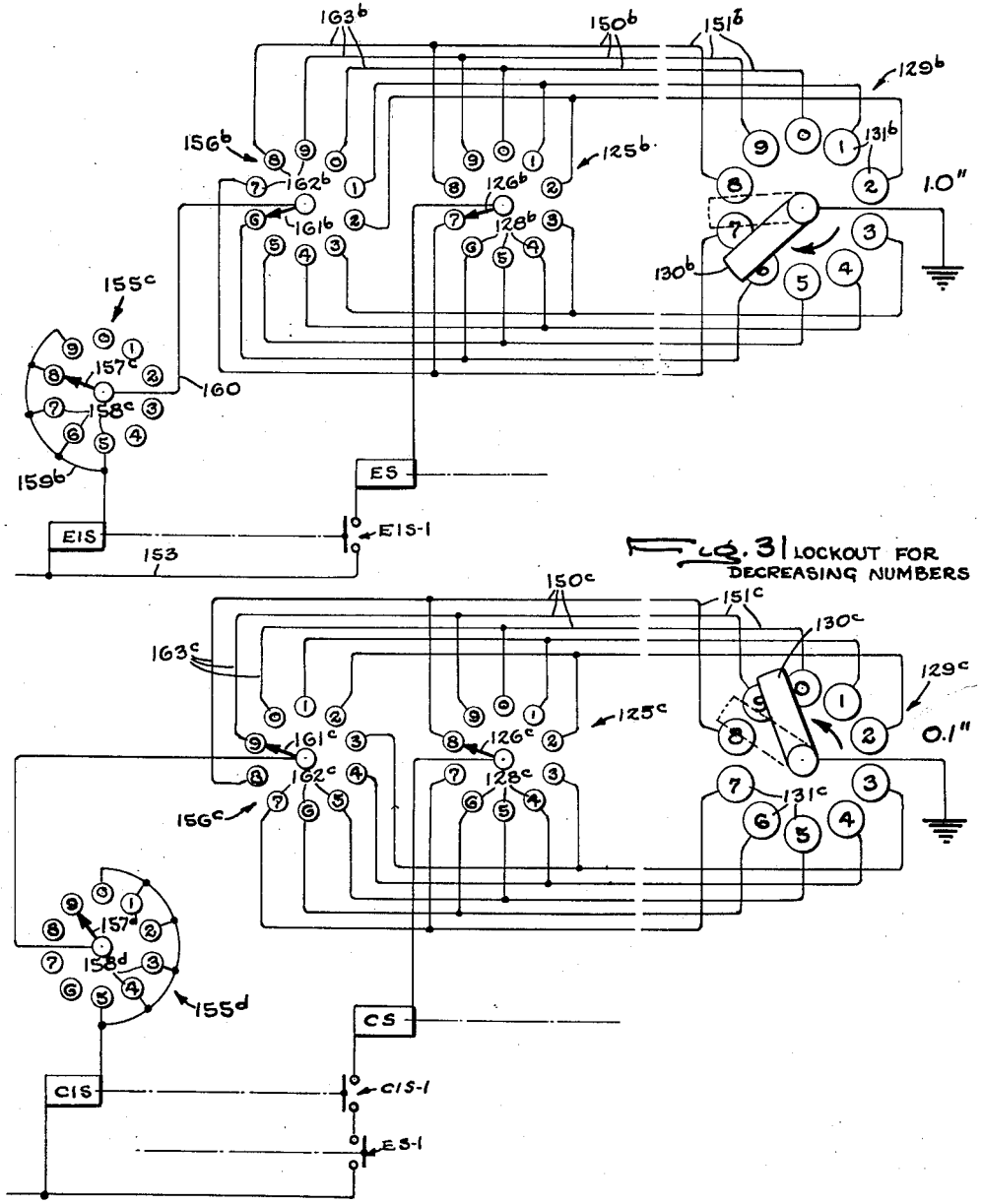

Jan. 1, 1963  E. K. WAGNER  3,071,028
METHOD OF AND APPARATUS FOR POSITIONING MACHINE PARTS
Filed Feb. 18, 1957  20 Sheets-Sheet 11
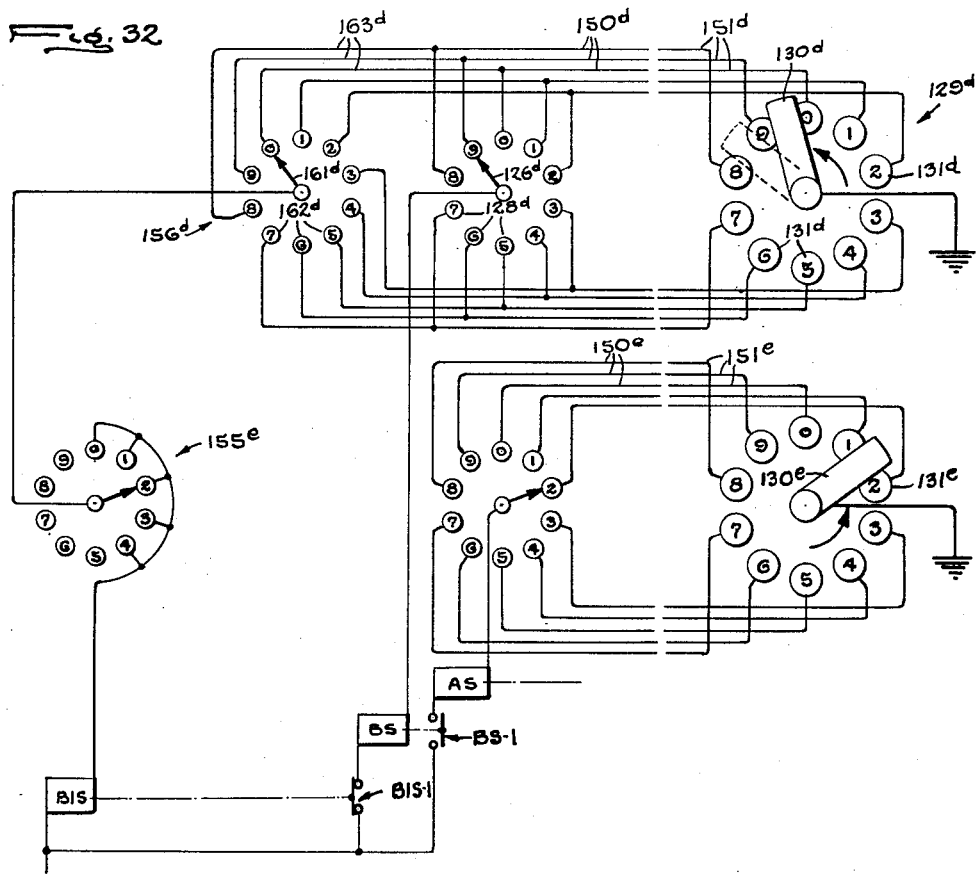
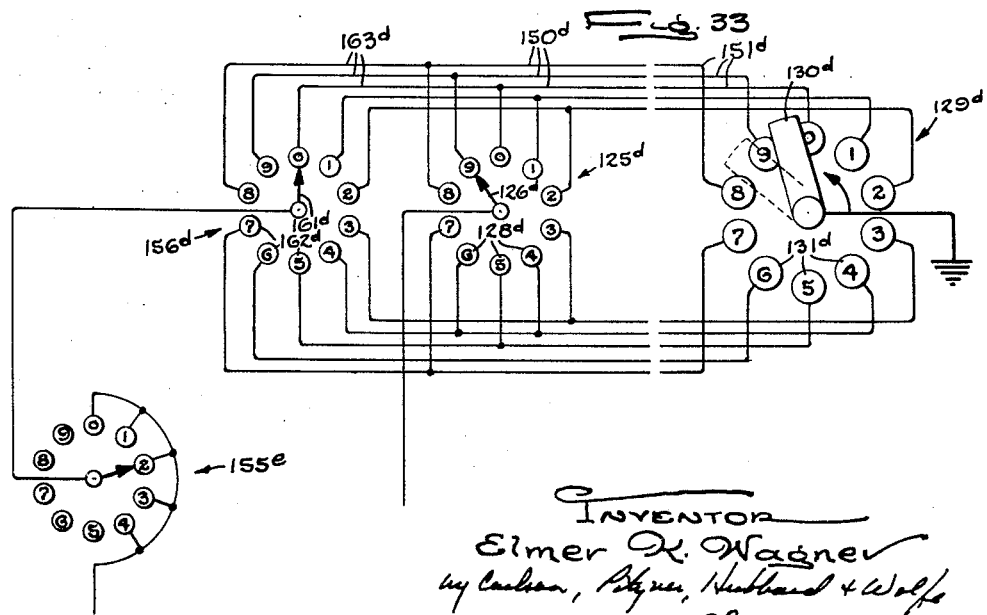
INVENTOR
Elmer K. Wagner
ATTORNEY Jan. 1, 1963 E. K. WAGNER 3,071,028
METHOD OF AND APPARATUS FOR POSITIONING MACHINE PARTS
Filed Feb. 18, 1957 20 Sheets-Sheet 12

INVENTOR
Elmer K. Wagner
by Carlsen, Pitzner, Hubbard & Wolfe
ATTORNEY

Jan. 1, 1963 E. K. WAGNER 3,071,028
METHOD OF AND APPARATUS FOR POSITIONING MACHINE PARTS
Filed Feb. 18, 1957 20 Sheets-Sheet 13

INVENTOR
Elmer K. Wagner
by Carlson, Pitzner, Hubbard & Wolfe
ATTORNEYS

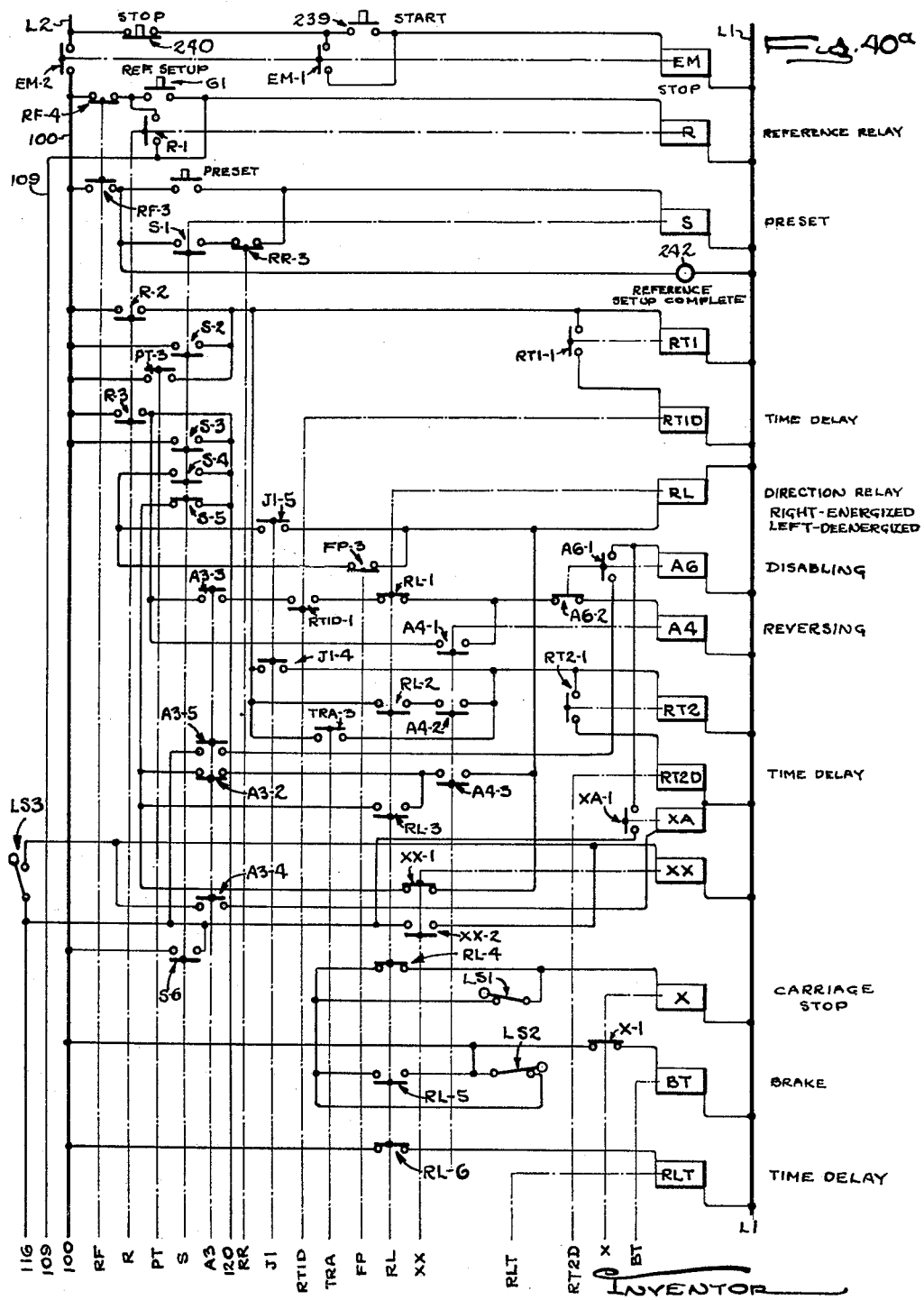

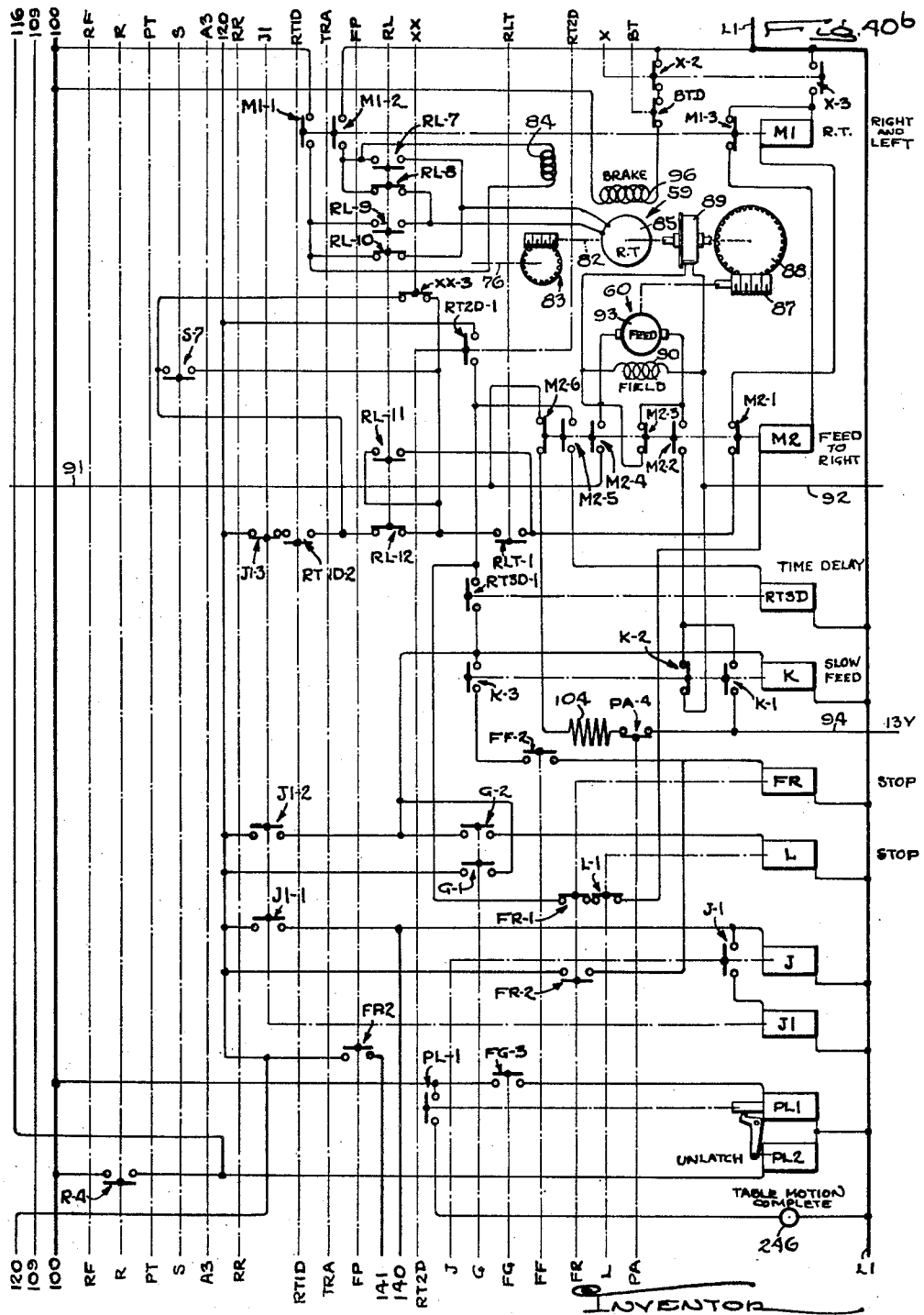

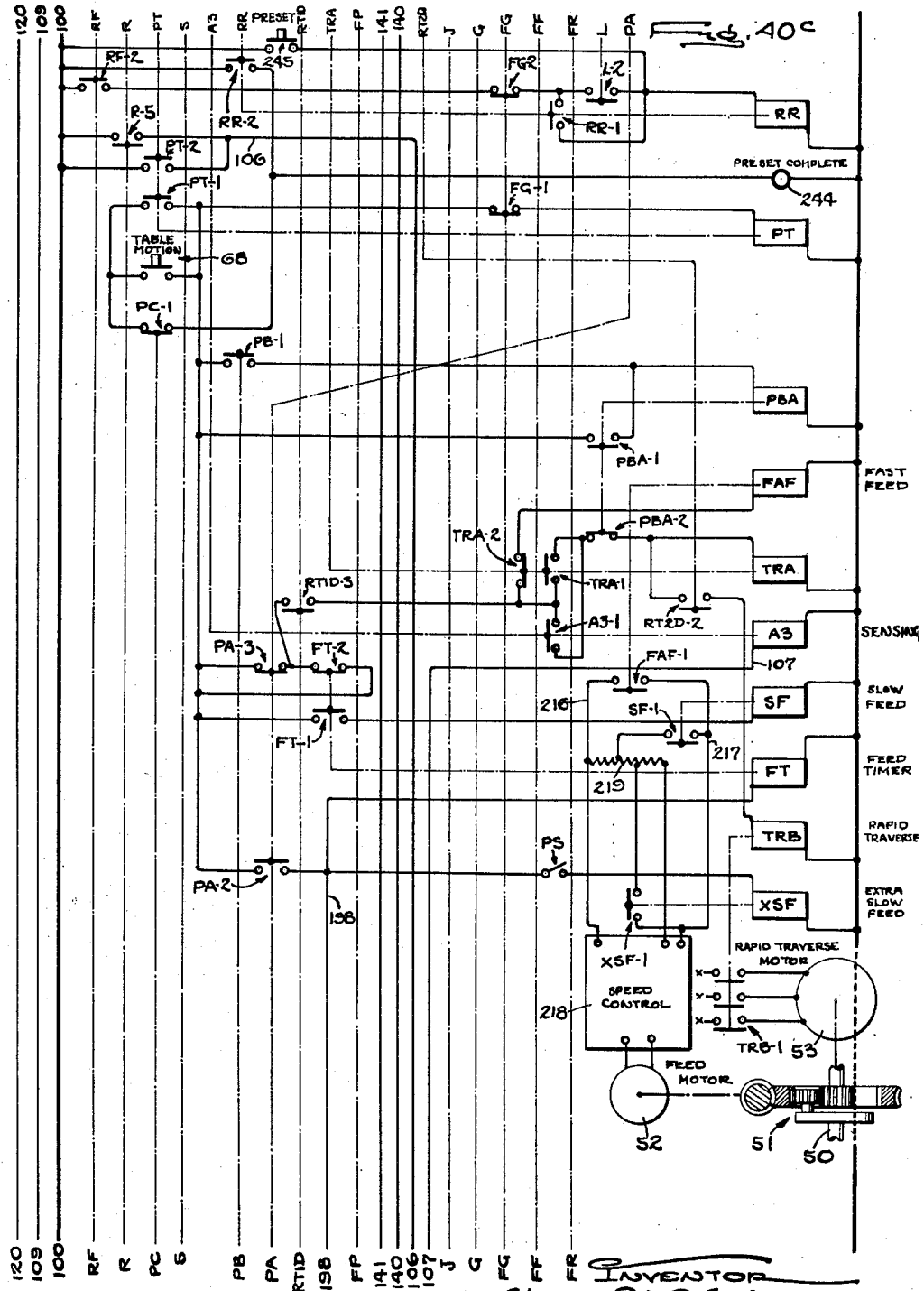

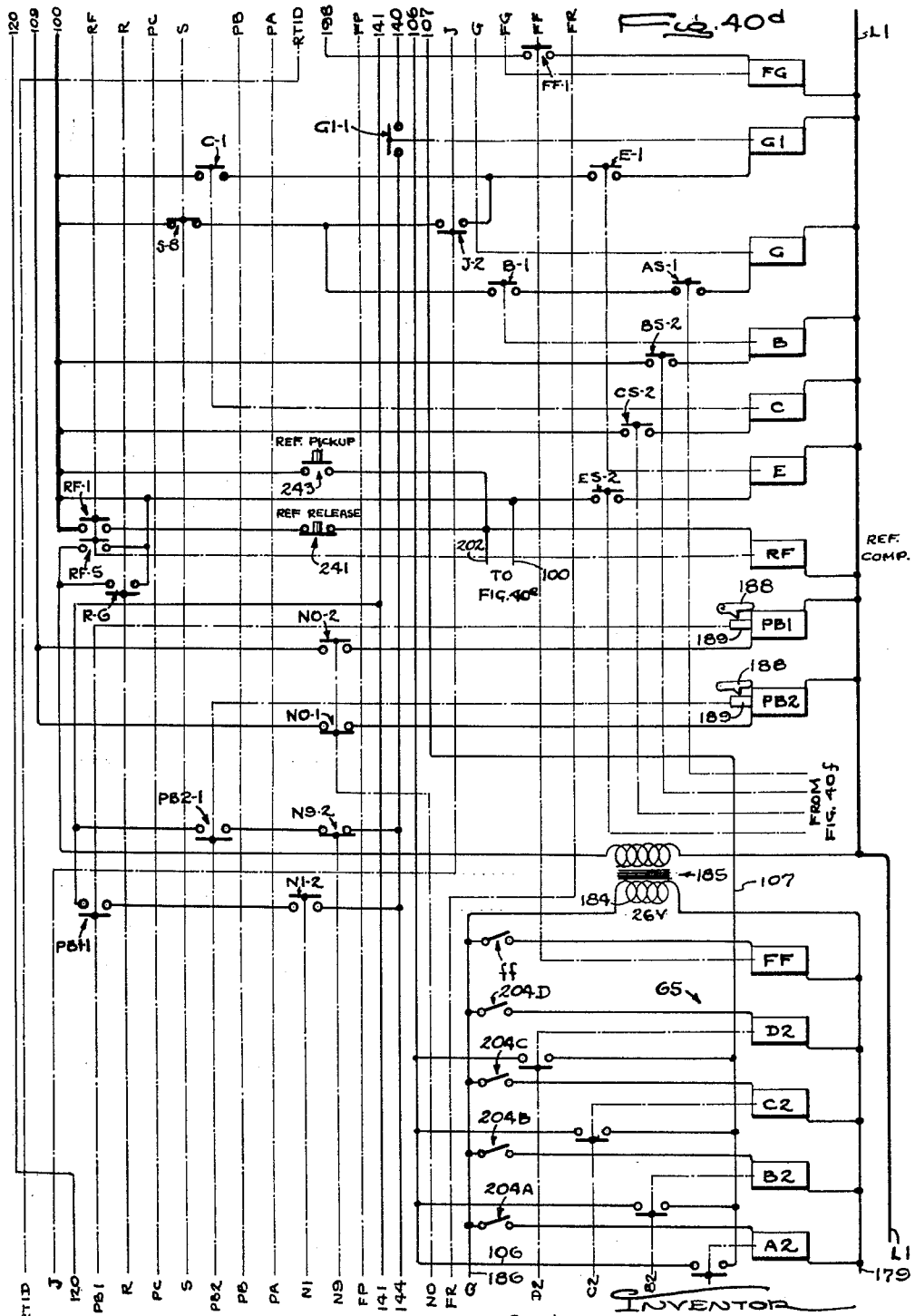

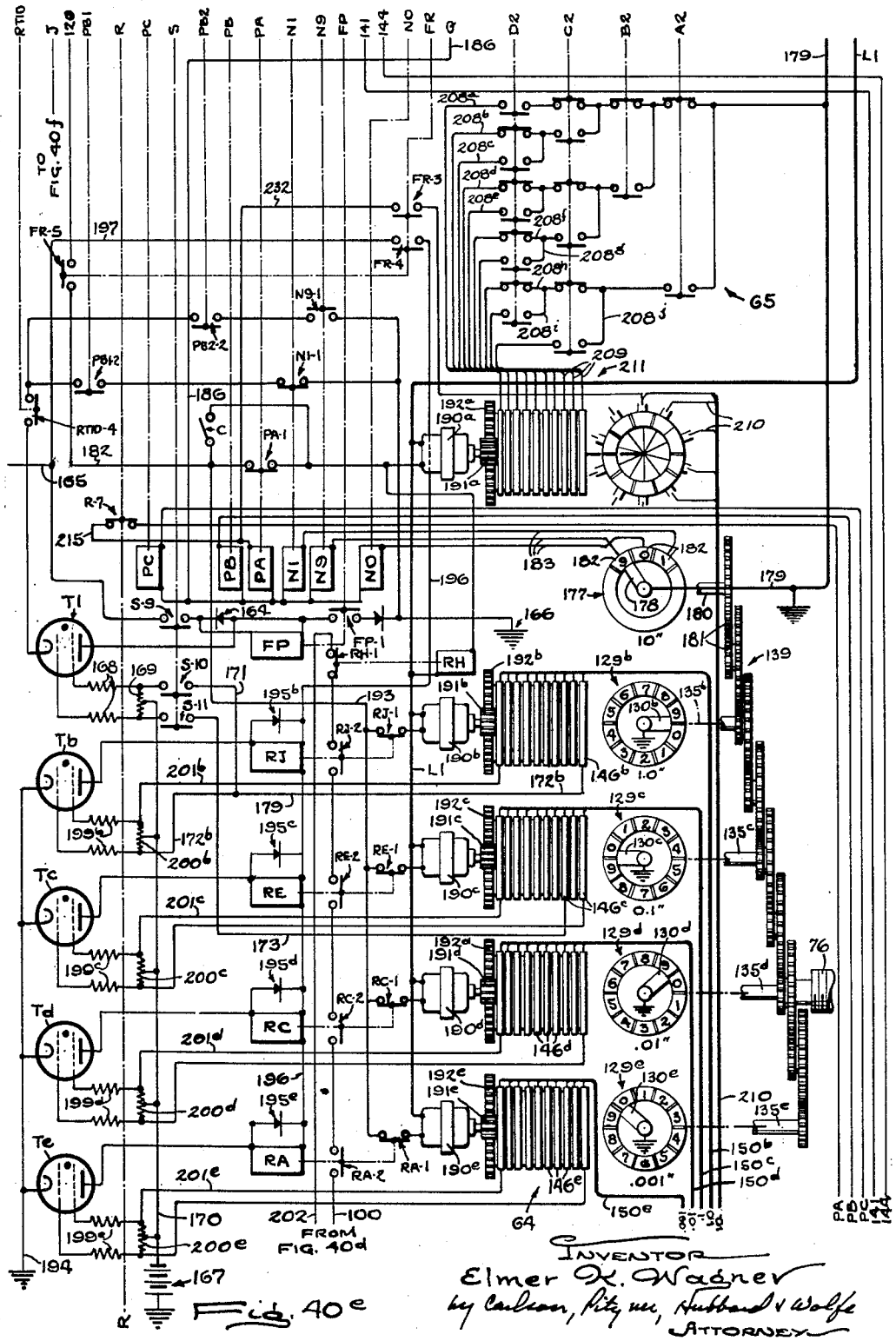

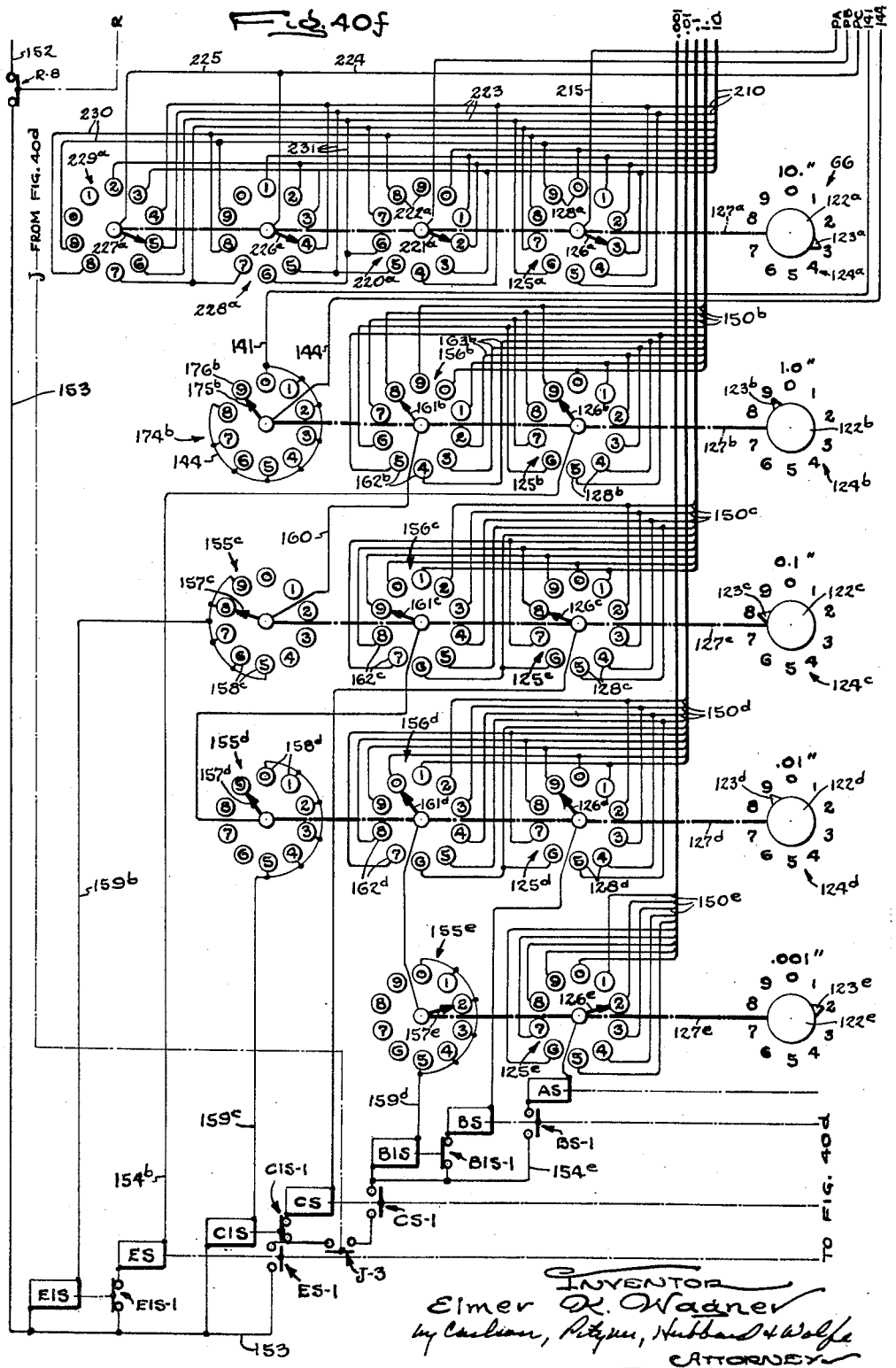

United States Patent Office 3,071,028
Patented Jan. 1, 1963

3,071,028
METHOD OF AND APPARATUS FOR
POSITIONING MACHINE PARTS
Elmer K. Wagner, Rockford, Ill., assignor to The Ingersoll Milling Machine Company, Rockford, Ill., a corporation of Illinois
Filed Feb. 18, 1957, Ser. No. 640,789
27 Claims. (Cl. 77—3)

This invention relates generally to a method of and apparatus for moving a first machine tool part through a desired distance along a predetermined path and locating such part accurately with respect to a second part. More particularly, the invention relates to a method and apparatus in which such positioning is effected by first establishing reference points on the respective parts at a spacing along the path equal to the desired distance the first part is to be moved. Then, this part is shifted along the path to bring the reference point thereon into coincidence with the point on the second part. When this occurs, the first part is in its final desired position and its motion is stopped.

The principal object of the present invention is to provide a novel method and apparatus which insures a high degree of accuracy in the positioning of the first machine part relative to the second part even where the first is to be moved through a relatively long distance and the positioning operations are controlled by unskilled operators.

Another object is to achieve a high degree of accuracy in positioning the first part by establishing the reference points in a novel manner with respect to a plurality of reference elements which divide the range of movement of the part into a plurality of equal whole increments, the desired distance constituting a number of these whole increments plus a part of one increment.

Still another object is to avoid direct measurement of long distances and thus reduce the possibility of error by utilizing the reference elements in a novel manner such that only the part of one increment in the desired distance is measured directly in establishing the reference points.

A more detailed object is to insure accuracy in the spacing of the reference points by selecting one reference element as a zero element and spacing the points in opposite directions therefrom different amounts equal respectively to the whole increments and to the partial increment in the desired distance.

A further detailed object is to identify the reference elements in a numerical succession progressing in one direction from the zero element thereby enabling one reference point to be defined by the element bearing the same number in the succession as the number of whole increments in the desired distance.

A general object is to provide novel apparatus which automatically selects one of the reference elements, establishes such element as the zero element, spaces the reference points in opposite directions therefrom according to the whole increments and the partial increment in the desired distance, and controls movement of the first machine part so as to stop the same accurately in its final position where the reference points coincide.

Another object is to facilitate the spacing of one reference point from the zero reference element in accordance with the partial increment of the desired distance by locating the point on a carriage which is movable longitudinally of the path of the first machine part and is actuated in a novel manner not only to establish the reference point accurately, but also, to facilitate selection of the zero element.

Still another object is to mount the carriage and control the movement thereof in a novel manner to insure a high degree of accuracy in the spacing of the reference point thereon from the zero reference element.

A further object is to identify the reference elements in their numerical succession by mechanism which is constructed in a novel manner to facilitate the location of one reference point on the proper reference element in accordance with the whole increments of the desired distance and to give a signal for stopping the first machine part accurately when this reference point coincides with the other point.

The invention also resides in the novel construction and arrangement of various mechanisms and associated electrical control circuits which make it possible to perform automatically the operations of selecting the zero reference element, establishing the reference points and controlling the motion of the first machine part.

Other objects and advantages of the invention will become apparent from the following detailed description taken in connection with the accompanying drawings, in which FIGURE 1 is a fragmentary side elevational view of a machine tool equipped with positioning apparatus embodying the novel features of the present invention.

FIG. 2 is a schematic view similar to FIG. 1 showing some of the reference elements and the carriage drive mechanism.

FIG. 3 is a perspective view of one reference element and its support.

FIGS. 4 to 6 are schematic views showing successive positions of the carriage during the selection of a "0" reference element.

FIG. 7 is a diagrammatic view illustrating the different motions of the carriage in moving to its final position.

FIG. 8 is an enlarged fragmentary view similar to FIG. 1 with a part of the carriage housing removed and with the carriage in a different position.

FIG. 9 is a fragmentary plan view of the carriage.

FIGS. 10, 11 and 12 are fragmentary sectional views taken respectively along the lines 10—10 of FIG. 9, 11—11 of FIG. 10 and 12—12 of FIG. 11.

FIGS. 13 through 21 are fragmentary views similar to a part of FIG. 11 and showing the identifying cam plates associated with the different reference elements.

FIG. 22 is a vertical sectional view of a part of the counting mechanism.

FIG. 23 is a fragmentary sectional view taken along the line 23—23 of FIG. 22.

FIGS. 24 and 25 are sectional views taken respectively along the lines 24—24 and 25—25 of FIG. 23.

FIG. 26 is a fragmentary sectional view taken along the line 26—26 of FIG. 22.

FIGS. 27, 28 and 29 are schematic views of the units and tenths commutators with the respective brushes in different positions.

FIG. 30 is a schematic view and wiring diagram showing the units commutator and associated lockout circuits.

FIG. 31 is a view similar to FIG. 30 of the tenths commutator and lockout circuits.

FIG. 32 is a view similar to FIG. 30 of the hundredths commutator and lockout circuits.

FIG. 33 is a view similar to FIG. 32 of the hundredths commutator with modified lockout circuits.

Figure 33A:
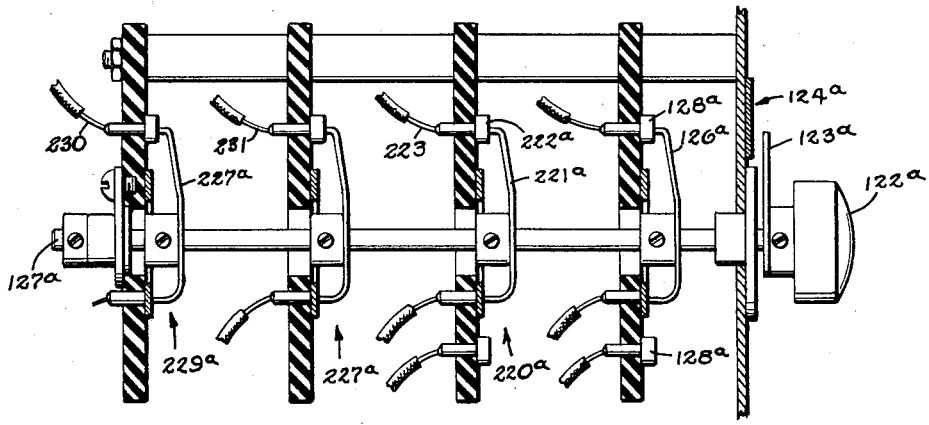

FIG. 33a is a fragmentary sectional view taken along the line 33a—33a of FIG. 1.

Figure 34:
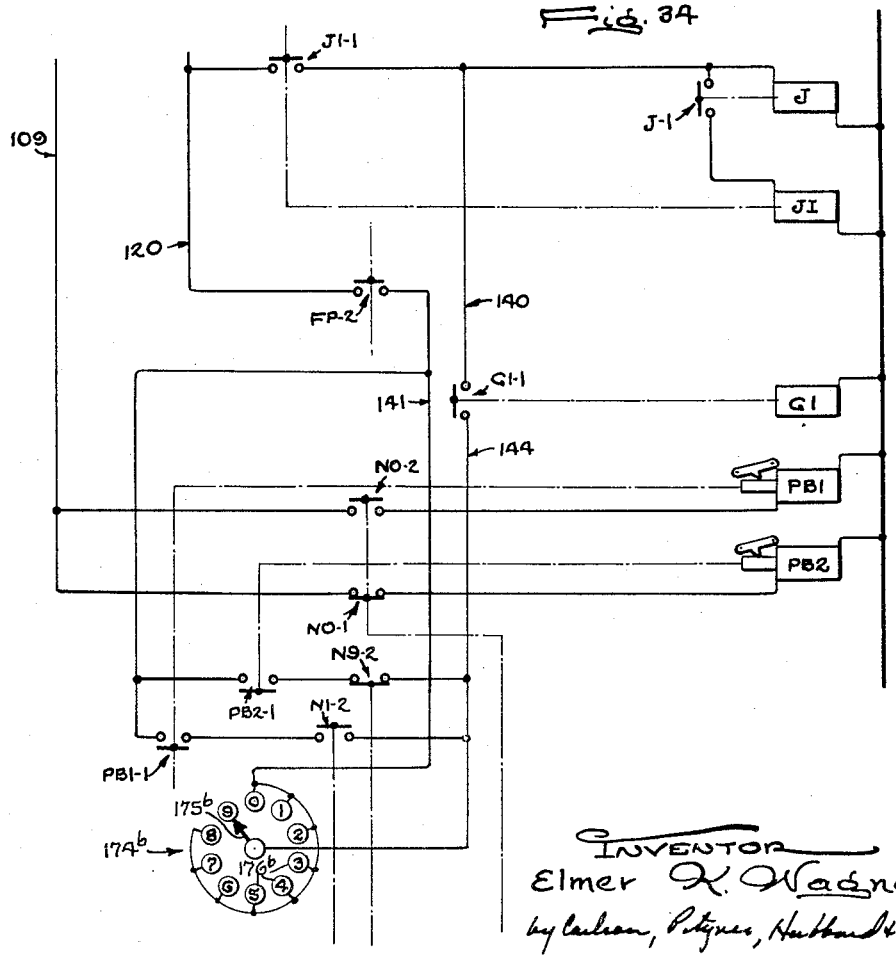

FIG. 34 is a schematic view and wiring diagram of some of the electrical control circuits utilized in positioning the carriage.

Figure 35:
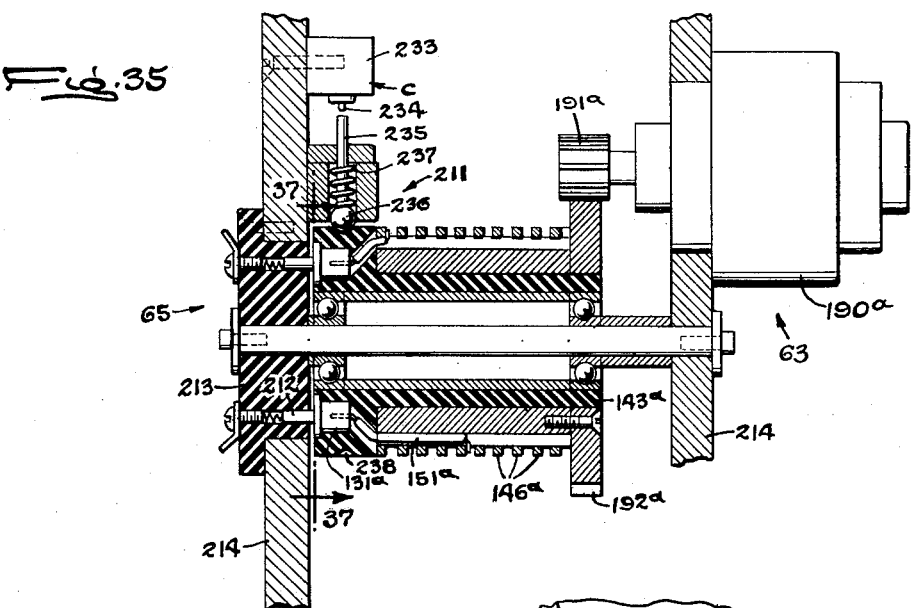

FIG. 35 is a fragmentary sectional view taken along the line 35—35 of FIG. 1 and showing the commutator utilized for identifying the reference elements.

Figure 36:
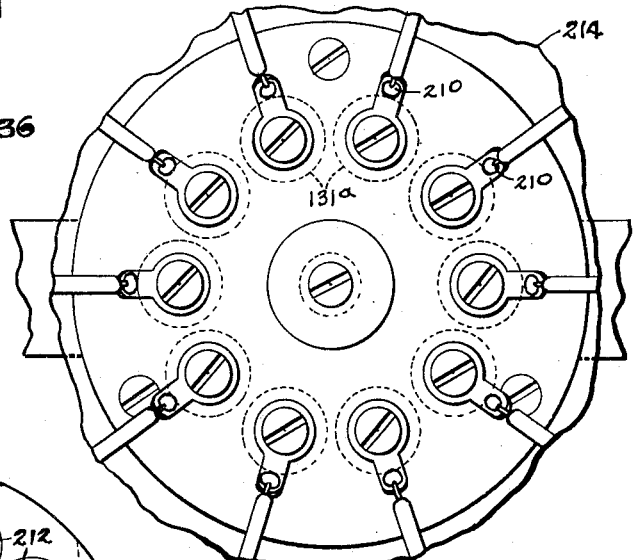

FIG. 36 is a fragmentary end view of the commutator shown in FIG. 35.

Figure 37:
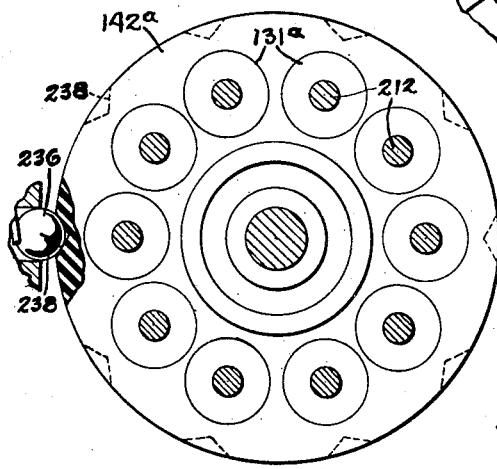

FIG. 37 is a fragmentary sectional view taken along the line 37—37 of FIG. 35.

Figure 38:
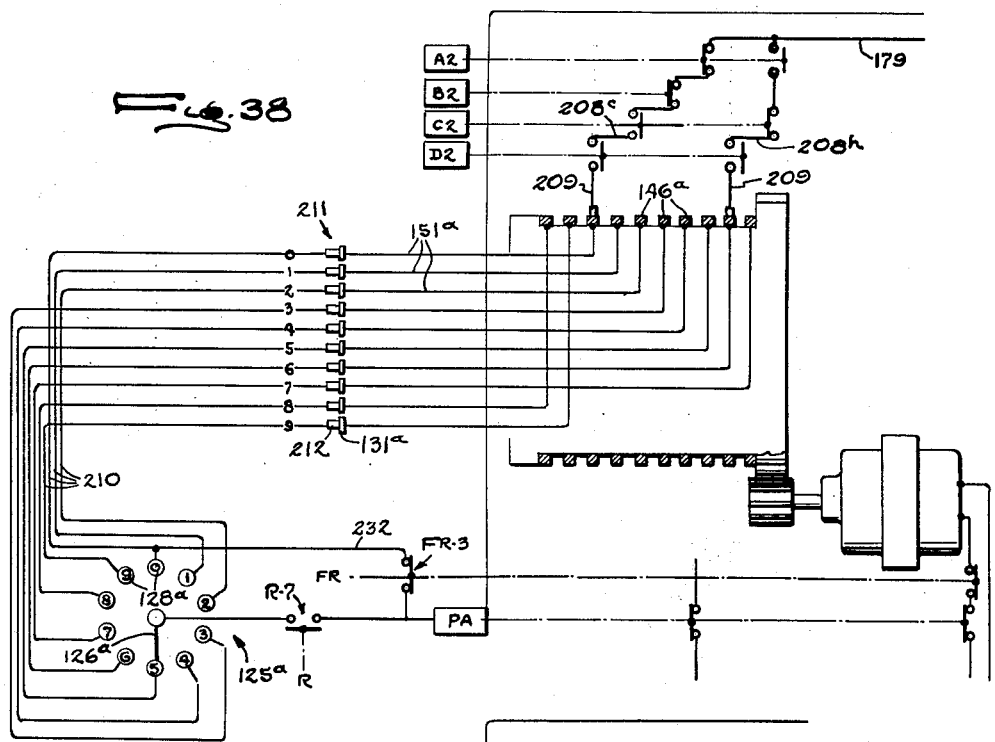
Figure 39:
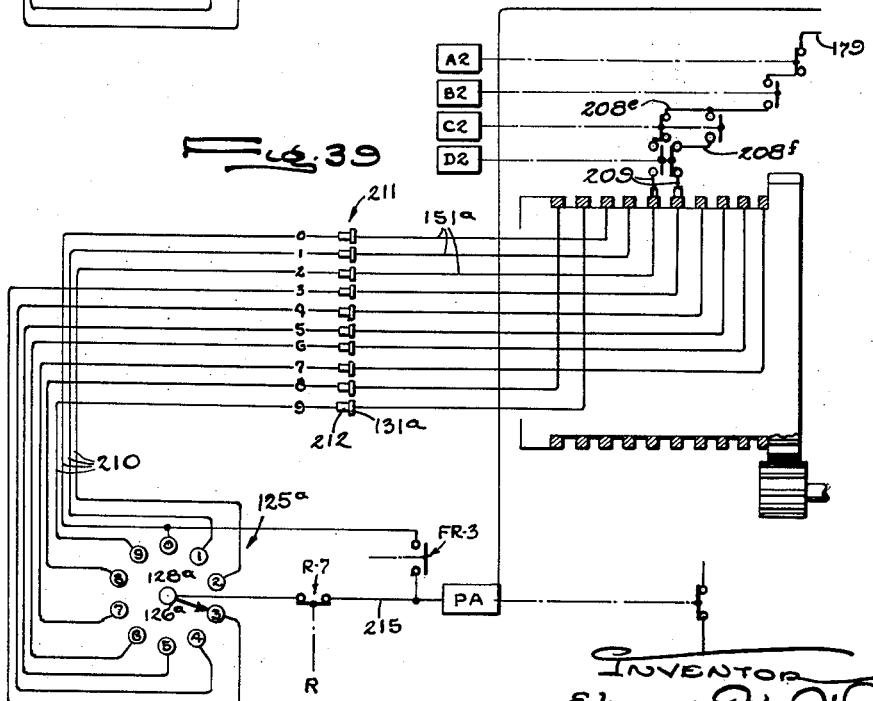

FIGS. 38 and 39 are schematic views and wiring diagrams of some of the circuits used for identifying the reference elements.

FIGS. 40a to 40f, when placed one above the other with FIG. 40a at the top, form a complete schematic view and wiring diagram of the parts and circuits controlling the movements of the table and the carriage.

While the invention is susceptible of various modifications and alternative constructions and may be practiced in various ways, I have illustrated in the drawings and will herein describe the preferred embodiments and manner of carrying out the invention. It is to be understood that I do not thereby intend to limit the invention by such disclosure but aim to cover all modifications, alternative constructions, methods, and uses falling within the spirit and scope of the invention as expressed in the appended claims.

In the drawings, the invention is shown for purposes of illustration in connection with a machine tool for boring holes 41 in a workpiece such as a casting W (FIG. 1). The boring is effected by a cutting tool 42 whose spindle 43 is journaled in a head 44 for rotation about a horizontal axis. The head is mounted on a column 45 upstanding rigidly from a stationary base 46 and extending alongside a table 47 to which the workpiece is secured by suitable clamps 48. Horizontal ways 49 on the base support the table for movement back and forth along a path which is normal to the spindle axis. When the workpiece is first positioned on the table and prior to being clamped thereto, it is oriented with respect to the spindle and the ways 49 to insure that the work holes bear the desired relation to the finished workpiece, for example, to insure that the axes of the finished holes parallel one end surface of the piece.

Generally, the improved method relates to shifting of the table 47 from one position on the base 46 and through a predetermined desired distance to another position. In the illustrated example, it is assumed that a boring operation has been completed on the left one of the two work holes 41 shown in FIG. 1 and that the workpiece is to be shifted to the left from the position of coincidence of the center of the left hole with the spindle axis to a position of coincidence of the desired center of the right hole with the axis. The distance through which the table is to be moved then is the desired spacing of the centers of the holes longitudinally of the ways 49, for example, 39.892 inches as indicated at $a$ in FIG. 1. Shifting of the table is effected in this instance by rotation of a lead screw 50 (FIG. 40c) which is driven through suitable differential gearing 51 either by a feed motor 52 or by a rapid traverse motor 53. When the feed motor is energized through the control circuits shown in FIGS. 40a to 40f, the table is shifted at one of several relatively slow rates to the left as viewed in FIG. 1. Upon energization of the rapid traverse motor through the control circuits shown, the table is shifted in the same direction but at a faster rate. Other suitable circuits (not shown) are provided for energizing the motors to shift the table to the right or to the left at either the rapid traverse rate or the feed rate in response to manual depression of corresponding control buttons 54 at a control station 55 (FIG. 1).

Prior to shifting of the table 47 in the positioning operation, two reference points $b$ and $c$ are established respectively on the base 46 and on the table at a spacing $d$ longitudinally of the ways 49 equal to the predetermined distance $a$ through which the table is to be moved. The positions of the respective points in relation to the spindle axis and the workpiece need not be known. However, once established, the point $b$ on the base is fixed with respect to the spindle axis and the point $c$ on the table is fixed with respect to the workpiece W. After the points have been established, the table is shifted to bring its point either into coincidence with the base point or into alinement therewith in a direction normal to the ways. Herein, the points are brought into coincidence. When this occurs, the table will have traversed the predetermined distance and the workpiece will be in its desired position with the spindle axis extending through the desired center of the finished work hole 41 on the right. The accuracy with which the workpiece is thus located depends on the accuracy of the spacing of the two reference points.

In accordance with the present invention, the reference points $b$ and $c$ are located longitudinally of the ways 49 in a novel manner to insure a high degree of accuracy in their spacing $d$ and therefore in the final location of the workpiece relative to the spindle 43 especially where the work is shifted through a relatively long distance. To this end, the range of movement of the table is divided into a plurality of increments of equal length indicated at $e$ in FIGS. 1, 2 and 8. Such increments are defined by a plurality of reference elements 56a to 56j spaced apart equal distances along the ways and secured to one of the base and table members 46 and 47. The reference point on the member supporting the elements then is defined by one of the elements itself, the other reference point being located on the other member.

In utilizing the reference elements 56a to 56j to establish the reference points $b$ and $c$, the improved method contemplates first selecting one of the elements as a "0" element. Then, the reference points are spaced from this element in opposite directions and at different distances corresponding respectively to the number of whole increments $e$ of the desired distance $a$ of table movement and to the part $f$ (FIG. 1) of one increment that the desired distance exceeds the number of whole increments. For example, taking the length of each whole increment as 10 inches and the desired distance as 39.892 inches, one reference point is located on the reference element which is spaced from the "0" element in one direction a distance of 30 inches equal to the three whole increments in the desired distance. The other reference point then is spaced in the opposite direction from the "0" element a distance equal to the partial increment of 9.892 inches. The spacing $d$ between the points then equals the desired distance $a$.

While the reference elements 56a to 56j may be located on the base 46, it is preferred that they be secured to the table 47 as shown. The table reference point $c$ then is defined by the element which is spaced to the right of the "0" element an amount equal to the whole increments $e$ of the desired distance $a$. In establishing this point, the elements are identified in a numerical succession starting with the "0" element and progressing to the right from this element as indicated by the numerals in FIG. 1. The table reference point $c$ then is located simply by selecting the element, herein the "3" element, whose identifying number is the same as the number of whole increments in the desired number. For example, if the third element 56c is the "0" element and there are three whole increments $e$ in the desired distance $a$, the sixth element 56f is identified by the number 3, in the succession and therefore is selected to define the table reference point $c$ as shown in FIG. 1.

With the table reference point $c$ on the right of the "0" element, the base reference point $b$ is located to the left of the "0" element at a spacing equal to the partial increment $f$ of 9.892 inches. Such spacing may be obtained by measuring to the right from the element next adjacent the "0" element and on the left thereof, herein the "9" element, a distance equal to the complement of the partial increment. However, it is preferred to start with the "0" element and measure the partial increment directly. Once the points are established, one or both of the table motors 52 and 53 are energized and the table is shifted to the left, that is, in the same direction along the ways that the base reference point is spaced from the "0" element, until the table reference point $c$ coincides with the base point. Then, the motors are deenergized to stop the table motion with the workpiece W in its desired final position.

Positioning Apparatus Generally

The novel apparatus provided for practicing the improved method operates automatically to select one of the reference elements 56a to 56j as the "0" element, establish the reference points b and c at their desired spacings from the "0" element, and control the movement of the table 47 so as to stop the same accurately when the reference points coincide. To accomplish such selection and spacing, the base reference point b is defined by a member 57 (FIGS. 1, 2 and 10) located on a carriage 58 which is mounted on the base 46 to reciprocate longitudinally of the table path. Movement of the carriage 58 back and forth within a limited range g (FIG. 2) substantially shorter than the range of table movement is effected by individually energizable power actuators 59 and 60 (FIGS. 1, 2 and 40b).

Assuming that the workpiece W has been oriented relative to the spindle 43 and clamped to the table 47 and the latter is to be shifted through the desired distance a, the carriage 58 first is shifted along the base 46 to select one of the reference elements 56a and 56j in its range g (FIG. 2) and then is stopped accurately in a predetermined zero position with respect to this element as shown in FIG. 6. Such positioning of the carriage is performed automatically by the carriage actuators 59 and 60 and associated control circuits in response to manual depression of a "reference set-up button" 61 which is located at the control station 55 (FIG. 1). When the carriage is stopped in its zero position, a signal is given to initiate operation of two resetting means 62 and 63 (FIGS. 22 and 35). These means individually orient a counting mechanism 64 (FIGS. 22 to 32, 40e and 40f) and an identifying mechanism 65 (FIGS. 35 to 39, 40d and 40e) with respect to the selected reference element and thereby establish the latter as the "0" element from which the partial increment f and the whole increments e of the desired distances are measured.

After the carriage 58 has been stopped in its zero position adjacent the selected reference element and the counting and identifying mechanism 64 and 65 have been oriented relative to this element, a member corresponding to the desired distance a of table movement is set up manually by the operator on a selecting means 66 (FIG. 1) at the control station 55 (FIG. 1). This number may be considered as two numbers one corresponding to the partial increment f and the other corresponding to the whole increments e of the desired distance a. Once the selection is made, the operator presses a "preset" button 67. This initiates operation of the actuators 59 and 60 for shifting the carriage to the left of the "0" element as viewed in FIG. 6. During this movement, the actuators are controlled by the counting mechanism 64 which measures the spacing of the carriage to the left of its zero position. In response to the setting of the partial increment number on the selecting means 66, the counting mechanism is conditioned to give a signal when such carriage spacing equals the partial increment f. This signal is utilized to deenergize the actuators and thereby stop the carriage in a final position in which the base reference point b is established at its desired partial increment spacing from the "0" element as shown in phantom in FIG. 1 and in full in FIG. 2.

To establish the table reference point c in accordance with the number of whole increments e in the desired distance a, the identifying mechanism 65 senses the presence of the various reference elements 56a to 56j adjacent the carriage 58 and identifies the elements individually in a numerical succession. The latter starts with the reference element selected as the "0" element and progresses therefrom to the right as a result of orientation of the mechanism with respect to such element. After such orientation and in response to the setting of the whole increments number on the selecting means 66, the identifying mechanism is conditioned to give a signal when the particular element identified in the succession by the selected number is in a position of coincidence with the base reference point b. The table reference point c thus is established on this particular element.

Following establishment of the reference points b and c, the operator depresses a "table motion" button 68 to initiate operation of the motors 52 and 53 for shifting the table to the left. This table movement continues until the reference element defining the table reference point c reaches its position of coincidence with the base reference point b. The identifying mechanism 65 then gives its signal and, in response thereto, the table is stopped automatically in the final desired position.

Reference Elements

While the reference elements 56a to 56j may take various forms, in this instance they are corresponding sides of rectangular blocks 69a to 69j constructed and mounted on the table 47 in a similar manner. The third block 69c, for example (FIGS. 3, 10 and 11), is bolted to a recessed plate 70 clamped against a spacer member 71 which is rigid with a mounting plate 72 bolted to one side of the table. The side of the block providing the reference element is disposed normal to the path of table movement and faces to the left along the path as viewed in FIGS. 1 and 2. In mounting these parts on the table, the plates and spacer member are secured in place first. Then, the block is bolted to the recessed plate after the reference element side thereof has been spaced accurately from the corresponding side of the next adjacent block a distance equal to the length of the selected whole increment e. Such spacing is obtained by direct measurement and herein is accurate within approximately .0001 of an inch.

The whole increments e defined by the adjacent reference elements 56a to 56j may be of any selected length so long as they are equal. It is preferred, however, that each increment be equal to the product of ten to some power and the desired unit of measure so that, with the decimal system of numbering, one or more of the digits of a number corresponding to a given distance represents the number of whole increments. Thus, where the unit of measure is an inch and each increment equals ten inches as in the present instance, the total number of increments in a given distance is represented by the tens digit of the corresponding number. For example, the number of whole increments contained in a distance of 39.892 inches is three. The number of elements provided herein is ten so that each may be represented by a different tens digit. With this arrangement, the apparatus is capable of controlling movements of the table through any distance within a range of 99.999 inches.

Carriage

In the exemplary machine, the carriage 58 (FIGS. 8, 10 and 11) comprises a hollow casting having spaced bearings 73 slidably receiving parallel horizontal rods 74. The latter are secured to spaced supporting plates 75 rigid with the base 46 and guide the carriage for rectilinear movement along its path paralleling the table ways 49. Herein, this path is disposed directly beneath the reference elements 56a to 56j (FIGS. 8 and 11). Movement of the carriage back and forth is effected by turning a lead screw 76 journaled in bearings 77 on the supporting plates 75 and threaded into nuts 78 which are clamped against opposite outer sides of the carriage and are spaced longitudinally of the screw. To take up the backlash between the nuts and the screw, the axial spacing of the nuts may be varied by inserting a spacer shim 79 of the proper thickness between one nut and the carriage. The carriage and its driving parts are enclosed by a suitable casing (FIGS. 1, 8 and 11) comprising the supporting plates 75, side and bottom sheets 80 secured thereto and a top cover plate 81 secured to and movable with the carriage.

The carriage screw 76 is turned by the power actuators 59 and 60 which, in this instance, are two electric motors, the latter a direct current feed motor and the former an alternating current rapid traverse motor (FIGS. 1, 2 and 40b). The drive shaft 82 of the rapid traverse motor 59 is coupled directly to the screw by a worm and worm wheel 83. Energization and deenergization of the rapid traverse motor is controlled by a relay M1 (FIG. 40b) having normally open contacts M1–1 and M1–2 for connecting the field windings 84 of the motor between a conductor 100 and an alternating current supply line L1. These contacts also are connected in an energizing circuit for the motor armature 85 extending between the supply lines and through other contacts of a directional relay RL. When the latter is deenergized and the main relay M1 is energized, the motor circuits are completed through normally closed contacts RL–8 and RL–10 for driving the screw to shift the carriage to the left at a rapid traverse rate. With both relays energized, the motor is energized through normally open contacts RL–7 and RL–9 and the carriage travels to the right at a rapid traverse rate. The motor is deenergized due to interruption of both of its field and armature circuits at the contacts M1–1 and M1–2 whenever the relay M–1 is deenergized.

The shaft 86 of the feed motor 60 is coupled to the carriage screw 76 through a worm 87 fast on the shaft and meshing with a worm wheel 88 which is connected to the rapid traverse shaft 82 through an electromagnetic clutch 89. To apply and release the clutch simultaneously with energization and deenergization of the feed motor, the clutch winding is connected in parallel with the motor field winding 90 (FIG. 40b).

Energization of the carriage feed motor 60 is controlled by a main relay M–2 and a speed control relay K (FIG. 40b). When only the main relay is energized, contacts M2–4 thereof close to connect the field winding 90 and the clutch 89 between a grounded conductor 91 and a high voltage direct current supply line 92. Contacts M2–2 also close in series with the contacts M2–4 and normally closed contacts K–2 of the then deenergized speed relay K to connect the motor armature 93 between the grounded conductor 91 and the high voltage line 92. The motor then will turn the screw to shift the carriage to the right at a fast feed rate which is slower than the rapid traverse rate. With both relays energized, the high voltage is applied to the field winding and the clutch the same as before. The speed relay contacts K–2, however, now are open to interrupt the high voltage circuit to the armature and contacts K–1 close to connect the armature between the grounded conductor and a low voltage direct current supply line 94 in series with the main relay contacts M2–2 and M2–4. With these motor connections, the screw is turned to shift the carriage to the right at a slow feed rate. Whenever the main relay M2 is deenergized all of the motor energizing circuits are interrupted and contacts M2–3 close to complete a short circuit across the armature to effect a dynamic braking action. To prevent simultaneous energization of the rapid traverse and feed motors, normally closed contacts M1–3 and M2–1 of the main relays M1 and M2 are connected in series with the respective relay coils so that if either relay is energized, the circuit for the other relay cannot be completed.

Movement of the carriage 58 along its screw 76 in opposite directions is limited by two normally closed switches LS1 and LS2 (FIGS. 2 and 40a) which are mounted on the base adjacent opposite ends of the screw for engagement of their actuators individually by adjustable abutments 95 (FIGS. 2 and 9) on opposite sides of the carriage. To stop the carriage when either switch is actuated, the switches are connected in an energizing circuit for a conditioning relay X (FIG. 40a) having normally open contacts X–3 (FIG. 40b) in the energizing circuit for the motor relays M1 and M2 so that the conditioning relay must be energized before either motor relay circuit can be completed. The limit switch LS1 at the right end of the screw is connected in parallel with normally closed contacts RL–4 (FIG. 40a) of the directional relay RL while the left end switch LS2 is in parallel with normally open direction relay contacts RL–5 in the conditioning relay circuit. Thus, if the right end switch LS1 is opened when the directional relay is energized and the carriage is moving to the right, the directional contacts RL–4 are open and the conditioning relay X drops out to open the motor relay circuits for deenergization of both motors 59 and 60. The latter are also deenergized when the left end switch LS2 is opened during carriage movement to the left, the directional relay contacts RL–5 in parallel with the switch then being open so that the conditioning relay again is deenergized.

To stop the carriage abruptly when one of the limit switches LS1 and LS2 is actuated, the conditioning relay X also controls the circuit for a winding 96 (FIG. 40b) of a suitable brake (not shown) adapted to apply a retarding torque to the motor shaft 82 and thus the screw 76 when the winding is energized. The circuit for this winding extends through normally closed conditioning relay contacts X–2 (FIG. 40b) and normally closed, delayed opening contacts BTD of a brake relay BT (FIG. 40a) which is energized through normally closed conditioning contacts X–1. When the conditioning relay X is energized, the brake winding and brake relay circuits are open at the normally closed conditioning contacts X–1 and X–2. Upon deenergization of the conditioning relay, these contacts are closed and the winding and the brake relay are energized. Then, after a short time delay sufficient for the screw to be brought to a stop, the brake relay pulls in and its contacts BTD open to interrupt the winding circuit.

*Base Reference Member*

The member 57 defining the base reference point $b$ may take various forms depending on the form of the reference elements 56a to 56j with which it cooperates both during location of the carriage 58 in its zero position with respect to the "0" element and during final positioning of the table 47. In the illustrated machine where the reference elements are the sides of the rectangular blocks 69a to 69j, the member projects upwardly from the carriage for direct physical engagement with the respective elements. To permit the member and the elements to move past each other during some positioning operations and into engagement during other operations, the member is mounted on the carriage for selective shifting back and forth between an inactive position out of the path traversed by the elements and an active position in which the member is disposed in such path to engage one of the elements.

In the present instance, the base reference member 57 is the upper end portion of an elongated lever 97 (FIGS. 10 and 11) extending upwardly through an aperture 98 in the top of the carriage 58. A horizontal pin 99 spanning the aperture and secured to the carriage extends through an intermediate portion of the lever between the ends thereof and provides a fulcrum which extends transversely of the carriage path. The portion of the reference member engageable with the reference elements 56a to 56j is a shoulder 101 which, when the lever is in an upright or active position, is disposed above the lower ends of the reference elements so as to engage one of the elements as shown in full in FIG. 8 and in phantom in FIG. 10. When the lever is swung about the fulcrum and away from its upright position, the shoulder is disposed in its inactive position below the path of the elements so that the elements may pass freely above the member as shown in FIG. 4 and in full in FIG. 10.

Normally, the lever 97 is urged into its upright active position by a body 102 of resilient material such as rubber surrounding the lever within the aperture 98 in the carriage (FIGS. 10 and 11). Also, the lower end portion of the lever below the fulcrum 99 is longer and heavier than the upper end portion so that the force of gravity tends to dispose the lever vertically. Swinging of the lever to its inactive position is effected by a so-called rotary solenoid 103 having a coil 104 (FIGS. 10, 11 and 40b) mounted on the carriage 58 and a core 105 (FIGS. 10 and 11) which rotates back and forth in a limited range in response to energization and deenergization of the coil. An arm 108 projecting radially from the core is spaced from the reference lever 97 so that the lever swings to its active vertical position as shown in FIG. 8 when the coil is deenergized. However, when the coil is energized, the arm swings counterclockwise as show and a lug 110 thereon engages the lower end portion of the lever to swing the same into its inactive position as shown in FIG. 10.

Energization of the rotary solenoid 103 is under the control of two relays. One of these is the main relay M-2 for the carriage feed motor 60 and the other is a relay PA. The energizing circuit for the solenoid coil 104 (FIG. 40b) extends in series from ground to the low voltage supply line 94 through normally closed contacts M2-6 and PA-4 of these relays. The coil then is energized to swing the solenoid arm 108 and shift the reference lever to its inactive position when both of these relays are deenergized. Upon energization of either relay, the solenoid is deenergized to permit the lever to swing into its active upright position. The feed motor relay M-2 is energized whenever the feed motor is energized to shift to the right at one of its feed rates. As will be described later in connection with the identifying mechanism 65, the relay PA is energized during the movment of the table 47 to the left and when the reference element selected to define the table reference point c approaches the reference member 57. The reference lever then is in its active position when the carriage is moving to the right at a feed rate or is adjacent the table reference point b during movement of the table to the left.

Upon engagement of the shoulder 101 with one of the reference blocks 69a to 69j during relative shifting of the table 47 to the left and the carriage 58 to the right, the lever 97 is swung in a counterclockwise direction as viewed in FIGS. 8 and 10. Such swinging is utilized to actuate two switches PS and ff (FIGS. 10, 11, 12, 40c and 40d) and thereby provide two signals which control subsequent movements of the carriage and table. Herein, the switches are of the self-contained type having actuator pins 111 and 112 normally urged outwardly to switch open positions but shiftable inwardly of the casings to close the switches. The casings are disposed side by side and are bolted to each other and to a boss 113 on the carriage with the pins projecting to the right as viewed in FIG. 10 and longitudinally of the guide rods 74.

The motion of the reference lever 97 is transmitted to the switch actuator pins 111 and 112 through a motion multiplying linkage which includes an intermediate lever 114 (FIGS. 10 and 11) fulcrumed on a bracket 115 on the carriage 58 to swing about an axis paralleling the fulcrum of the reference lever. A spring 117 acting between the carriage and a short upper end portion of the intermediate lever urges the same in a counterclockwise direction as viewed in FIG. 10 and into a switch open position in which the longer lower end portion of the lever abuts an adjustable stop 118 on the carriage. The lower end of the lever bears against the free end portions of a spring arm 119 which is bolted at its other end to the carriage boss 113 (FIG. 12) and projects therefrom in cantilever fashion and across the actuator pins. The free end portion of the spring arm is stressed to press against the pins and shift the same inwardly but, when the intermediate lever 114 abuts its stop 118, is held by this lever in a switch open position as shown in FIG. 10.

When the reference lever 97 is in its active upright position as shown in phantom in FIG. 10 but before it contacts one of the reference elements 56a to 56j, its lower end engages the upper end of the intermediate lever 114 while the latter is in its switch open position of abutment with the stop 118. Upon contact of the reference shoulder 101 by a reference element, the reference lever is swung counterclockwise and the intermediate lever is swung clockwise away from its stop and against the action of its spring 117. This movement permits the free end portion of the spring arm 119 to swing inwardly and shift the actuator pins 111 and 112 to their switch closed positions.

The actuator pins 111 and 112 are spaced apart longitudinally of the spring arm so that the pin of one switch PS is disposed closer than the pin of the other switch ff to the anchored end of the arm (FIG. 12). Due to this arrangement, the closer switch PS is actuated before the farther switch ff as the spring arm 119 moves inwardly when the reference lever is swung away from its active position after engagement with one of the reference blocks. The signals provided by actuation of the switches thus occur in succession. In the present instance, the last switch ff is closed in response to relative movement of the carriage 58 and the table 47 through approximately .008 of an inch after the first switch PS is closed.

In a manner to be described later in connection with the identifying mechanism 65, closure of the last switch ff is utilized to complete a circuit previously conditioned by the identifying mechanism 65 for stopping the table 47 when it reaches its final desired position, that is, when the reference points b and c coincide. At this time, the shoulder 101 on the reference lever 97 is engaging the reference element which defines the table reference point c. The location of the base reference point b with respect to the carriage 58 then is the position of the shoulder when the switch ff is closed. Although the shoulder may move relative to the carriage, it always is in the same location when the switch is closed. Therefore, the base reference point is fixed with respect to the carriage.

*Reference Set-Up Mechanism*

In the selection of one of the reference elements 56a to 56j as the "0" element, the carriage 58 follows a cycle of motion which enables the normal range g (FIG. 2) of carriage movement to be substantially shorter than the range of table movement and therefore makes it possible to utilize a screw of correspondingly short length to position the carriage accurately. This cycle is initiated in response to depression of the "reference setup" button 61 and starts with a shift of the carriage to the right end of its normal range. Then, the direction is reversed and the carriage shifts to the left until it reaches the first reference element spaced to the left from the right end of the range and moves a short distance beyond this element as shown in FIG. 5. Finally, the carriage is reversed again and moves back to the right and into its final position with respect to the element as shown in FIG. 6.

At the start of its cycle, the carriage 58 may be located anywhere within its range, for example, near the left end as shown in FIG. 2 or closer to the center as shown in FIG. 8. To start the cycle, the circuit for a reference setup relay R (FIG. 40a) is completed in response to depression of the "reference setup button" 61. Energization of this relay is followed by energization of the directional relay RL and the rapid traverse motor relay M1 (FIG. 40b) so that the carriage moves to the right at the rapid traverse rate from its starting position. Such movement continues until an adjustable abutment 121 on the carriage (FIG. 4) engages the actuator of a normally open inner limit switch LS3 (FIGS. 2 and 40a) supported adjacent but spaced to the left of the right end limit switch LS1 a short distance, herein, approximately .625 of an inch. This inner switch LS3 and the left end limit switch LS2 define the range $g$ of normal carriage movement, the right end switch LS1 limiting rightward movement under abnormal conditions.

Upon closure of the inner limit switch LS3, a circuit is completed for a reversing relay XX (FIG. 40a) and the latter pulls in to open its contacts XX–1 (FIG. 40a) and XX–3 (FIG. 40b) in the circuits for the directional relay RL and the rapid traverse motor relay M1. Before the carriage 58 advances far enough to actuate the right end limit switch LS1 (FIG. 40a), the rapid traverse motor 59 is deenergized and normally closed directional relay contacts RL–6 (FIG. 40a) close to complete a circuit for a timer relay RLT. After a short interval, contacts RLT–1 (FIG. 40b) of the latter close to complete another energizing circuit for the motor relay M1 and the latter pulls in for rapid traverse movement of the carriage to the left. This motion continues until the carriage reaches the first of the reference elements 56a to 56j to the left beyond the position where the inner limit switch LS3 is actuated. When this element is reached, a sensing relay A3 (FIG. 40c) and a reversing relay A4 (FIG. 40a) are energized and their contacts A3–2 and A4–3 (FIG. 40a) close to complete a circuit for reenergizing the directional relay RL and interrupting the circuit for the rapid traverse motor relay M1 at the contacts RL–12 (FIG. 40b). The motor then is deenergized and the carriage coasts to a stop at a position past the reference element a short distance as shown in FIG. 5.

Simultaneous energization of the directional relay RL and the sensing relay A3 when the carriage 58 reaches the first reference element in moving to the left results in energization of a relay RT2 (FIG. 40a) and an associated time delay relay RT2D for completing a circuit at contacts RT2D–1 (FIG. 40b) to the feed motor relay M2. When the latter pulls in, the feed motor 60 is energized through the contacts M2–2 and M2–4 (FIG. 40b) from the high voltage direct current line 92 and the circuit for the rotary solenoid coil 104 is interrupted at the contacts M2–6. The carriage then shifts to the right at the fast feed rate and the reference member 57 swings into its upper active position. Also, motor relay contacts M2–5 close to complete the circuit for a time delay relay RT3D (FIG. 40b) which, at the end of a short interval closes its contacts RT3D–1 (FIG. 40b) for energization of the slow feed relay K and decrease of the carriage speed to the slow feed rate. This movement continues until the reference member 57 engages the reference element as shown in FIG. 6 and the final carriage switch $ff$ (FIGS. 12 and 40d) is closed thereby. Closure of this switch is followed by completion of a circuit through contacts RT3D–1 and K–3 for a relay FR (FIG. 40b) which pulls in to open its contacts FR–1 and interrupt the circuit to the feed motor relay M2. The latter then drops out and the feed motor is stopped with the carriage in its zero position with respect to the selected reference element.

In a manner to be described later in connection with the identifying mechanism 65, the sensing relay A3 (FIG. 40c) is energized whenever the carriage 58 is disposed adjacent any one of the reference elements 56a to 56j and is within a limited range on either side of a position in which the reference member 57 engages the element as shown in FIG. 6. To energize the reversing relay A4 (FIG. 40a) when the carriage reaches the first reference element in its rapid traverse movement to the left away from the right end of its normal range $g$, normally open sensing relay contacts A3–3 (FIG. 40a) are connected in an energizing circuit for the reversing relay.

In the event that a reference element initially is disposed adjacent the inner carriage range $g$ as shown in FIG. 4 so that the sensing relay A3 is energized at the same time the limit switch is closed, it is desirable that the carriage move beyond this element for selection of the next element to the left as the "0" element. In other words, it is desirable to energize the reversing relay A4 in response to energization of the sensing relay A3 only after the carriage has moved to the left beyond the element at the right end of the carriage range.

To avoid undersired energization of the reversing relay A4 if a reference element is disposed close enough to the inner limit switch LS3 that the latter is closed and the sensing relay A3 are energized simultaneously, the reversing relay circuit includes normally closed contacts A6–2 (FIG. 40a) of a disabling relay A6. This relay pulls in upon simultaneous energization of the sensing relay and closure of the limit switch and remains energized until the carriage 58 leaves the undesired reference element and the sensing relay is deenergized. Such operation is obtained by extending a holding circuit for the disabling relay A6 through its own normally open contacts A6–1 and normally open contacts A3–5 of the sensing relay A3. The disabling relay then is energized through contacts XA–1 of a relay XA (FIG. 40a) whose energizing circuit extends in series through the limit switch LS3 and normally open sensing contacts A3–4.

With the above arrangement, the disabling relay A6 pulls in to interrupt the circuit for the reversing relay A4 upon simultaneous closure of the switch LS3 and the sensing contacts A3–3 and remains energized until the sensing relay A3 is deenergized upon movement of the carriage 58 beyond the reference element adjacent the right end of the carriage range $g$. The reversing relay A4 then remains deenergized until the carriage reaches the next element to the left and the sensing relay again is energized. Energization of the reversing relay A4 during the initial carriage movement to the right toward the inner limit switch LS3 is avoided by extending the circuit for this relay through normally closed contacts RL–1 of the directional relay RL which is energized during the rightward carriage movement.

Due to movement of the carriage 58 initially toward the inner limit switch LS3 at the right end of its normal range, the reference element selected as the "0" element always will be located in the right end portion of the range. If no element is close enough to the limit switch that the latter and the sensing contacts A3–3 close simultaneously, the zero position of the carriage adjacent the selected element will be within one whole increment $e$ of the right end of the range. If an element is disposed adjacent the limit switch as shown in FIG. 4, the zero position of the carriage will be disposed slightly more than ten inches from the right end of the range. Since the carriage never is moved to the left of its zero position more than one whole increment in establishing the base reference point $b$, the normal range $g$ may be only slightly larger than two of the whole increments $e$. Herein, this range is approximately 21 inches.

*Selecting Means*

The selection of numbers corresponding to the whole increments $e$ and the partial increment $f$ of the desired distance $a$ is made manually at the control station 55 by turning a plurality of knobs 122a to 122e having pointers 123a to 123e movable relative to associated dials 124a to 124e. Each dial (FIGS. 1 and 40f) corresponds to one of the digits of the number representing the desired distance and is graduated in a decade of integers arranged in an annular series which progresses in a clockwise direction as viewed in FIG. 40f from 0 to 9. The dials are spaced apart in a horizontal row on the panel with the dial 124e on the right end of the row as viewed in FIG. 1 representing the lowest order digit. In this instance where the unit of measure is an inch, the integer selected on this dial represents thousandths of an inch and the integers selected on the other dials progressing to the left respectively represent hundredths of an inch, tenths of an inch, whole inches and the whole increments $e$ of ten inches each. The selection of the number of whole increments $e$ then is made on the tens dial 124a and the selection of the number corresponding to the partial increment $f$ is made on the other four dials 124b to 124e.

Cooperating with the dials 124a to 124e to form the selecting means 66 are a corresponding number of multiple selector switches 125a to 125e (FIGS. 38 and 40f) having the same construction and associated individually with the respective dials in a similar manner. The tens switch 125a, for example, is one of a bank of similar switches and comprises a wiper 126a (FIGS. 33a and 40f) of conducting material secured to but insulated from a shaft 127a which carries the tens knob 122a and is rotatably mounted in a suitable manner (not shown) at the control station 55. As the tens knob is turned, the wiper moves into engagement with successive ones of an annular series of ten contacts 128a encircling the shaft and insulated from each other. These contacts are numbered in accordance with the graduations on the tens dial 124a so that the pointer 123a is set at any one of the numbers on the dial, for example, the "3," the wiper engages the correspondingly numbered "3" contact as shown in FIG. 40f.

Counting Mechanism

*Commutator construction and control circuits generally.*—The counting mechanism 64 (FIGS. 22 to 34, 40e and 40f) operates to measure the spacing of the carriage 58 from its zero position with respect to the previously selected "0" reference element and, in response to selection on the units, tenths, hundredths and thousandths dials 124b to 124e of the number corresponding to the partial increment $f$, the counting mechanism is preset to give its signal for stopping the carriage when the spacing of the latter to the left of the "0" element equals the partial increment. To this end, the mechanism is coupled to the carriage drive screw 76 and measures the angular movement thereof during shifting of the carriage along its guides 74, the mechanism effecting such measurement by counting the revolutions of the screw.

With the spacing of the carriage 58 to the left from the previously selected "0" reference element measured by counting the revolutions of the carriage screw 76, accuracy in such spacing is obtained by moving the carriage into its final position in the same direction that it is moved into its zero position with respect to the "0" element. This movement eliminates any error which might otherwise result from backlash in the connections between the screw and the carriage and between the screw and the counting mechanism. Herein, the carriage is shifted to the right as viewed in FIG. 6 as it approaches and is stopped in its zero position of abutment of the reference shoulder 101 with the "0" reference element. Then, it also is moved to the right as it approaches and is stopped in its final position which is spaced from the zero position by the partial increment $f$ as shown in FIG. 2.

Since its zero position is to the right of its final position, the carriage 58 is moved away from the zero position to the left and past the final position. Then, its direction is reversed for movement to the right into the final position. In controlling these movements, the counting mechanism 64 not only provides a signal for terminating the final positioning movement to the right, but also, gives another signal which is utilized to stop the carriage and condition the motor circuits for reversing the carriage after it has passed the final position in moving to the left. To enable the carriage to be shifted to the left at a rapid rate and still insure that the signal for stopping such movement will be given at the desired position of the carriage, the counting mechansim is conditioned to give the reversing signal in response to the selection of only higher order digits, herein the units and tenths digits of the number corresponding to the partial increment $f$. The selection of all four digits of the number is utilized to condition the mechanism to give the final signal.

In the exemplary machine, the counting mechanism 64 comprises a plurality of commutators 129b to 129e (FIGS. 22, 23 and 40e) corresponding in number to the partial increment dials 125b to 125e and having brushes 130b to 130e movable in unison across individual sets of ten segments 131b to 131e as an incident to rotation of the carriage screw 76. Each commutator corresponds to a different one of the digits of the partial increment $f$ and its brush moves ten times as far as the brush of the next higher digit during angular movement of the screw. For example, the thousandths brush 130e revolves through ten revolutions for every revolution of the hundredths brush 130d. With such proportional movements, the brushes occupy different positions relative to each other and their segments in every position of the carriage represented by the different numbers which may be selected on the dials.

To provide different electrical signals corresponding to the different relative positions of the brushes 130b to 130e, the ten segments on each of the commutators 129b to 129e are connected individually to the respective contacts of the corresponding one of the selector switches 125b to 125e. Thus, a circuit is established through the commutator brush and the corresponding switch wiper when the brush engages the segment which is connected to the contact engaged by the wiper. In other words, the circuit through each brush is established by contact of the brush with the segment selected on the associated dial. Thus, for every number which may be selected on the dials, there is a different combination of circuits through the brushes corresponding to a different position of the carriage.

The commutators 129b to 129e are mounted within a housing 132 secured to the base 46 (FIGS. 1 and 22) and are of identical construction. In the hundredths commutator 129d for example (FIGS. 23, 24 and 25), the brush 130d comprises two cylindrical inserts 133d of conducting material such as carbon slidable axially in circumferentially spaced recesses in a supporting conductive disk 134d. The disk is spaced axially from the hundredths segments 131d and is secured adjustably to a shaft 135d which is journaled in spaced bearings 136d on horizontally spaced plates 137 secured to the base 46 and disposed within the housing. Springs 138d seated in the recesses in the disk act against the inner ends of the inserts to urge the same axially and outwardly against axially facing contact surfaces on the segments.

Proportional movement of the brushes 130b to 130e in the ratios of ten to one during rotation of the carriage screw 76 is effected by connecting the brush shafts 135b to 135e to each other and to the screw through suitable gearing 139. In this instance, the hundredths brush 130d is connected directly to and forms an axial extension of the screw. With this arrangement, the pitch of the screw is selected to produce movement of the carriage .1 of an inch along the guides 74 for every revolution of the screw. The direction of rotation of the brushes is clockwise as viewed in FIGS. 27 to 29 and 40e when the screw is rotated to shift the carriage to the left.

The ten segments 131d of the hundredths commutator 120d (FIG. 25) are spaced apart equal distances in an annular series centered on the brush shaft 135d and are formed as cylindrical plugs which are seated in recesses in an outturned flange 142d of an insulating supporting sleeve 143d, the outer axially facing contact surfaces on the segments lying in the same plane as the end of the flange and the sleeve. With the relative movement between the brush 130d and the segments obtained by rotating the brush, the segments are stationary during shifting of the carriage 58. However, in resetting the commutator to a zero condition in accordance with a different prevailing zero position of the carriage, the segments are adjusted angularly about the shaft. For this purpose, the supporting sleeve is journaled on bearings 145d carried by the shaft.

To connect each of the hundredths segments 131d individually to the corresponding contacts 128d of the hundredths selector switch 125d and still permit angular adjustment of the segment with the insulating sleeve 143d, the connection is made through a separate slip-ring 146d and a brush 147d. Herein, the ten slip rings are spaced apart axially on the outer periphery of an insulating cylinder 148d telescoping with and pressed onto the sleeve. The brushes are mounted on rigid supporting plates 149d (FIG. 26) on diametrically opposite sides of the slip rings. Each brush is connected to a different one of the switch contacts by a conductor 150d and each segment is connected to its slip ring through a conductor 151d so that each segment is always connected to the same switch contact regardless of the angular position of the segment about the brush shaft 135d.

The signals for stopping the movement of the carriage 58 to the left after it has passed the final position and to the right in the final position are given in response to establishment of the circuits through the respective brushes 130b to 130e and the associated selector switches 125b to 125e upon engagement of the brushes with the segments 131b to 131e selected on the dials 124b to 124e. The signal for stopping the carriage after it has passed its final position in moving to the left, is energization of a relay J1 (FIGS. 34 and 40b) having normally closed contacts J1–3 in the energizing circuit for the rapid traverse motor relay M1 so that the latter is deenergized to open its contacts M1–1 and M1–2 in the circuit for the rapid traverse motor 59 when the stopping relay J1 is energized. The stopping relay is connected in parallel with another stopping relay J upon energization of the latter and closure of normally open contacts J–1 thereof. After being properly conditioned as will be described subsequently, the common energizing circuit of the stopping relays J and J–1 is completed between two conductors 140 and 144 (FIG. 40d) by closure of normally open contacts G1–1 of a commutator signal relay G1 (FIG. 40d).

To utilize the selection of only the units and tenths digits of the partial increment number to condition the counting mechanism 64 to energize the commutator signal relay G1 and thereby complete the energizing circuits for the stopping relays J and J–1, the signal relay is energized in response to establishment of the circuits through only the units and tenths commutators 129b and 129c and their selector switches 125b and 125c. While such energization may be effected by extending the relay circuits in series through these commutators and switches, it is preferred to energize separate relays Es and Cs (FIG. 40f) in response to engagement of the individual brushes 130b and 130c with their respective selected segments 131b and 131c and to energize the signal relay G1 in response to simultaneous energization of the separate relays. With this arrangement, the brushes may be grounded so as to avoid slip rings and each commutator may be utilized in the performance of different functions while its brush carries only enough current for the associated relay.

In the present instance, the circuit for the units relay Es extends from a suitable direct current supply conductor 152 (FIG. 40f) through normally closed contacts R–8 of the previously mentioned reference set-up relay R and a common commutator relay conductor 153 to the relay coil, from the latter through a conductor 154b to the wiper 126b of the units selector switch 125b and to the grounded units brush 130b through the selected segment conductors 150b and 151b and slip-ring 146b. The circuit for the tenths relay Cs extends from the supply conductor 152 to its brush 130c in a similar manner but also includes normally open contacts Es–1 of the units relay. With these contacts in its circuit, the tenths relay cannot pull in until the units relay is energized. This arrangement avoids intermittent energization and deenergization of the tenths relay as the tens brush wipes across the selected tens segment 131c before the units brush reaches its selected segment. To energize the signal relay G1 in response to energization of the separate units and tenths relays Es and Cs, the signal relay circuit extends through normally open contacts E–1 and C–1 of two relays E and C (FIG. 40d) whose respective energizing circuits are completed by closure of normally open contacts Es–2 of the units relay Es and normally open contacts Cs–2 of the tenths relay Cs. It is noted that simultaneous energization of the units and tenths relays Es and Cs always results in energization of the signal relay G1.

The signal provided by the counting mechanism 64 for stopping the final positioning movement of the carriage 58 to the right is given in response to simultaneous engagement of all of the brushes 130b to 130e with the segments 131b to 131e selected on the partial increment dials 124b to 124e. Herein, this signal is energization of a carriage stopping relay L (FIG. 40b) having normally closed contacts L–1 which are connected in series with the carriage feed motor relay M2 (FIG. 40b). When the stopping relay L pulls in, the motor relay is deenergized to interrupt the circuits to the carriage feed motor 60 at the contacts M2–2 and M2–4 while completing the motor braking circuit at the contacts M2–3. The energizing circuit for the stopping relay L includes normally open contacts J1–2 of the leftward motion stopping relay J1 and, after these contacts are closed, is completed by closure of normally open contacts G–2 of another commutator signal relay G. The circuit for this relay extends through all four commutators and is completed in response to contact of all four brushes with their selected segments.

As in the case of the units and tenths commutators 129b and 129c, separate relays Bs and As (FIG. 40f) are provided for the respective hundredths and thousandths commutators 129d and 129e. The circuits for these relays extend from the direct current supply conductor 152 to their individual brushes 130d and 130e in a manner similar to the circuits for the units and tens relays Es and Cs. To prevent completion of the hundredths relay circuit until after energization of the tenths relay Cs, normally open contacts Cs–1 of the latter are connected in series with the hundredths relay coil. Normally open hundredths relay contacts Bs–1 similarly are connected in the circuit for the thousandths relay As. The circuit for the commutator signal relay G (FIG. 40d) extends through normally open contacts As–1 of the thousandths relay and normally open contacts B–1 of a relay B (FIG. 40d) whose energizing circuit is completed by closure of normally open hundredths relay contacts Bs–2. Since the relay B cannot pull in until the hundredths relay pulls in and the latter cannot pull in until the units and tenths relays are energized, the signal relay circuit is completed only when all of the four commutator relays As, Bs, Cs and Es and their associated relays E, C and B are energized.

To enable the units and tenths relays Es and Cs and thus the signal relay G1 to be energized in all positions of the carriage corresponding to the number 0.1 to 9.9 which may be selected on the units and tenths dials 124b and 124c, the units brush 130b, in the rotation of the carriage screw 76 to shift the carriage to the different positions, should remain in continuous contact with each of its segments 131b while the tenths brush 130c progresses from its "0" segment 131c through substantially a full revolution and again is contacting the "0" segment. Similarly, to enable the other signal relay G to be energized in all positions of the carriage corresponding to the numbers from 0.001 to 9.999 which may be selected on all four of the dials, each of the brushes 130b to 130*d* other than the thousandths brush 130*e* should remain in continuous contact with each of its segments while the next adjacent lower digit brush progresses through a full revolution from its "0" segment.

To obtain the desired continuous contact of each brush other than the thousandths brush with each of its segments during a full revolution of the next lower digit brush and, at the same time, adapt the commutators 129*b* to 129*e* for high speed operation without high precision in the manufacture of the brushes and segments or in the mechanical connection of the brushes, each brush is made wider circumferentially than the spacing between adjacent ones of the associated segments. With this construction, the brush overlaps or contacts the adjacent segments in moving from one to the next and also contacts each segment during movement of the carriage through a distance greater than that corresponding to one integer on the associated dial. To obtain the desired contact, not only should each brush overlap adjacent segments in moving from one to the next, but also, in its zero or starting position which corresponds to the zero setting of the associated dial, each brush should contact two of its segments. These two preferably are the "9" and "0" segments as shown in full in FIGS. 27 and 28. Starting from such a zero position, each brush will contact each of its segments continuously as desired during movement of the next lower digit brush through a full revolution from its "0" segment.

In the present instance where each brush, for example, the hundredths brush 130*d*, comprises the two inserts 133*d* (FIGS. 24 and 25), the spacing between the inserts along their arc of movement is slightly greater than the circumferential spacing of the segments. Thus, when the brush is in centered position with respect to adjacent segments as in its zero position shown in phantom in FIG. 25, the inserts are in full overlapping engagement with the respective "9" and "0" segments. Herein, the spacing of the inserts is equal to approximately 3.6 degrees along the arc of brush movement, the radius of this arc equalling the spacing of the centers of the inserts from the axis of the brush shaft 135*d*. The width of each insert along such arc is equal to approximately 10.8 degrees. This is equal to three times the angle of 3.6 degrees through which the hundredths brush moves while the thousandths brush moves through one-tenth of a revolution, that is, the distance corresponding to a whole integer on its dial 124*e*.

Although overlap of the brushes with their respective segments is desirable to achieve high speed and accuracy in the counting operations while avoiding high precision in the manufacture of the commutators 129*b* to 129*e*, it gives rise to difficulties of erroneous energization of the signal relays G and G1 due to premature contact of the brushes with the respective segments which have been selected on the dials 124*b* to 124*e*. Such difficulties are encountered while the carriage 58 is in or adjacent its zero position and during movement of the carriage both to the left away from the "0" one of the reference elements 56*a* to 56*j* and to the right toward the "0" element. Different compensating means are provided for overcoming the difficulties arising during each of these three times. The difficulty occurring while the carriage is moving to the left and the compensating means therefor will be described first.

*Compensating means active during leftward carriage movement.*—Assuming that the units and tenths brushes 130*b* and 130*c* are in their zero positions of engagement with both their "0" and "9" segments 131*b* and 131*c* as shown in full in FIG. 27 and that the screw 76 is turned to shift the carriage 58 to the left, the brushes will shift angularly away from such positions. The direction of their movement is clockwise, that is, the same direction in which the segments are numbered, so that the units and tenths commutators 129*b* and 129*c* may be said to be counting increasing numbers. The units brush moves one-tenth as far and as fast as the tenths brush. Thus, during shifting of the tenths brush clockwise through .1 of a revolution to the dash line position shown in FIG. 27, the units brush shifts clockwise through .01 of a revolution to its dash line position. Each of these movements of the different brushes corresponds to one integer on the tenths dial 124*b* and is accompanied by shifting of the carriage through .1 of an inch.

As noted above, the units brush 130*b*, in its zero position (FIG. 27) overlaps the "0" units segment 131*b* an amount corresponding to angular movement of the brush through 10.8 degrees or .03 of a revolution, the edge of the brush on the "0" segment constituting the leading edge when the brush moves clockwise. The ten units segments being spaced angularly equal distances, the spacing of corresponding edges of adjacent segments is equal to .10 of a revolution. The spacing of the leading edge of the units brush from the adjacent edge of the "1" segment in the zero position of the brush is equal to .10 minus .03, that is, .07, of a revolution so that the brush will move onto the "1" segment as indicated by the dot-dash line in FIG. 27 after the brush has advanced clockwise through only .07 of a revolution. At this same time, the tenths brush 130*c* will overlap its "6" and "7" segments 131*c* as indicated by the dot-dash line after having advanced through only .7 of a revolution. Since, to count the revolutions of the screw 76, engagement of the units brush with the "1" segment corresponds to movement of the tenths brush through a whole revolution from its zero position, the engagement of the units brush with its "1" segment is premature during the time when the tenths brush is moving from its dot-dash position at .7 of a revolution and into its full line or zero position. During this movement, the tenths brush contacts its "6," "7," "8" and "9" segments.

If any of the numbers from 0.1 to 1.5 is selected on the units and tenths dials 124*b* and 124*c*, there is no problem due to premature contact of the units brush 130*b* with the selected units segment 131*b*. For example, assuming that 0.5 has been selected when the brushes are in their zero positions, the units brush already is contacting its selected "0" segment and the tenths brush 130*c* will move onto its "5" segment for simultaneousl engagement of the brushes and the selected segments only after shifting of the units brush through approximately the .5 of a revolution corresponding to the selected number. The operation is similar when any of the numbers from 0.1 to 0.4 and 0.6 to 0.9 is selected. When the numbers from 1.0 to 1.5 are selected, the units brush will engage the selected "1" segment prematurely. However, when such engagement first occurs as indicated by the dot-dash lines in FIG. 27, the tenths brush already will have passed the tenths segments from the "0" segment through the "5" segment. Thus, simultaneous engagement of the units brush with its "1" segment and of the tenths brush with any of its "0" to "5" segments occurs, not in the first revolution of the tenths brush, but in its second revolution when such simultaneous engagement should occur.

The smallest number giving rise to difficulties due to the overlap of the brushes with adjacent segments in the zero positions of the brushes is 1.6. With this number selected on the dials 124*b* and 124*c*, simultaneous contact of the brushes 130*b* and 130*c* with the selected "1" units segment 131*b* and "6" tenths segment 131*c* occurs as described above and as shown in FIG. 27 after the tenths brush has moved through only .7 of a revolution rather than the desired 1.6 revolutions. Thus, if the units and tenths relays E*s* and C*s* are energized upon simultaneous contact of their respective brushes with the selected segments, such energization and the accompanying energization of the signal relay G1 occur to stop movement of the carriage 58 to the left before it reaches the position corresponding to the setting of the dials. A similar erroneous response would take place whenever the selected number is larger than 1.5 and its tenths digit corresponds to any one of the "6," "7," "8" and "9" segments engaged by the tenths brush during premature contact of the units brush with its selected segment.

To overcome the above difficulty of premature stopping of the carriage movement to the left while still permitting the brushes to overlap adjacent segments, the circuit through the units brush 130b and the units relay Es is disabled during premature contact of the brush with the selected units segment 131b. Then, after the tenth brush 130c has completed the correct number of revolutions corresponding to the selected units segment, the circuit again is conditioned for completion through the units brush and the selected units segment. Such operation is accomplished by extending the units relay circuit through normally closed contacts Els–1 of a units lockout relay Els which is energized when any one of the troublesome "6," "7," "8" and "9" tenths segments 131c is selected on the tenths dial 124c and during contact of the units brush with the units segment next preceding the selected segment.

The circuit for the units lockout relay Els (FIGS. 30 and 40f) extends from the common conductor 153 in series through a conditioning switch 155c, a lockout switch 156b and the units commutator 129b. The conditioning switch 155c is closed in response to selection of the troublesome "6," "7," "8" and "9" tenths segments 131c on the tenths dial 124c and, when closed, conditions the lockout relay circuit for completion upon contact of the units brush 130b with the units segment 131b preceding the selected segment. In this instance, the conditioning switch (FIGS. 30 and 40f) is similar in construction to the tenths selector switch 125c and comprises a contact arm 157c secured to and movable with the switch shaft 127c. Angularly spaced around the latter are a series of contacts 158c which correspond to the respective tenths segments 131c and are engaged individually by the contact arm when the tenths wiper 126c engages the corresponding selector switch contacts 128c. Five of the conditioning contacts 158c corresponding to the "5" to "9" tenths segments 131c are connected to the lockout relay Els by a conductor 159b and the contact arm is connected to the lockout switch by a conductor 160. With this arrangement, the conditioning switch is closed in the lockout circuit upon selection of any tenths digit from 5 to 9 on the tenths dial 124c and is open when any other tenths digit is selected. Although only the digits from 6 to 9 are troublesome, the "5" conditioning switch contact also is included in the lockout circuit as a precautionary measure.

The units lockout switch 156b (FIGS. 30 and 40f) is similar to the units selector switch 125b and comprises a contact arm 161b secured to the switch shaft 127b and engageable individually with ten contacts 162b arranged in an annular series about the shaft. The arm 161b of the lockout switch is connected to the conditioning switch arm 157c through the conductor 160 and the lockout contacts are connected individually by conductors 163b to the conductors 150b which connect the selector contacts 128b through the brushes 147b, and the slip rings 146b to the individual units segments 131b. To extend the lockout circuit through the units segment preceding the one selected on the units dial, the angular position of the lockout arm 161b on the shaft 127b and the connection between the lockout contacts and the selector conductors 150b are such that, when the wiper 126b engages a contact connected to one segment, for example, the "9" segment as shown in FIG. 40f, the contact arm engages the lockout contact which is connected to the next preceding or "8" segment.

With the units lockout circuit described above, the lockout relay Els is energized to prevent completion of the circuit through the units relay Es when the conditioning switch 155c is closed by selection of a tenths digit from 5 to 9 on the tenths dial 124c and while the units brush 130b contacts the segment 131b preceding the segment selected on the units dial 124b. The lockout relay remains energized and the relay G1 remains deenergized for continued energization of the rapid traverse motor 59 as long as the units brush contacts the preceding segment. By the time the units brush moves off of the preceding segment, the tenths brush 130c will have completed the number of revolutions corresponding to the selected units segment but will not yet have reached the selected tenths segment. At this same time, the units brush is contacting its selected segment so that, when the lockout relay Els is deenergized, the circuit for the units relay Es is completed and the latter pulls in to close its contacts Es–1 in the circuit for the tenths relay Cs. The latter then pulls in and the signal relay G1 is energized for stopping the carriage movement to the left as soon as the tenths brush contacts its selected segment. Whenever any tenths digit from 0 to 4 is selected on the tenths dial 124b, the lockout circuit remains open at the conditioning switch 155c and the lockout contacts Els–1 are closed in the units relay circuit.

*Compensating means active during rightward carriage movement.*—The difficulty of premature contact of the brushes with the selected segments during movement of the carriage 58 to the right or toward the "0" reference element 56 in the final positioning operation is similar to that just described in connection with the leftward movement. However, different commutators are involved and the digits giving rise to the difficulty are different because, during movement of the carriage to the right, the brushes move counterclockwise as viewed in FIG. 28, that is, in the direction of decreasing numbers.

To insure that the carriage 58 progresses to the left beyond its final position before reversing directions to approach such position from the left, its leftward movement is continued for at least .1 of an inch after the units and tenths relays Es and Cs are energized in response to simultaneous engagement of the units and tenths brushes 130b and 130c with the selected units and tenths segments 131b and 131c. During this continued carriage movement to the left, it is likely that the tenths and hundredths brushes 130c and 130e will shift far enough past their final positions to give rise to the difficulties of premature contact of these brushes with their selected segments in the rightward approaching of the carriage to the final position. Such continued leftward movement, however, is not far enough that there is any difficulty of premature contact of the units brush 130b with its selected segment.

Considering first the difficulty of premature contact of the tenths brush with its selected segment, let it be assumed that the tenths and hundredths brushes 130c and 130d are shifted in a counterclockwise direction from their zero positions of equal amounts of overlap with their "9" and "0" segments 131c and 131d as shown in full lines in FIG. 28. In this movement, the tenths brush will contact its "8" segment as shown by the dot-dash line after shifting through a distance of only .07 of a revolution. At the same time, the hundredths brush 130d will advance only .7 of a revolution and into overlapping engagement with its "4" and "3" segments 131d as indicated by the dot-dash line. Now, if any of the numbers from .84 to .80 were selected on the tenths and hundredths dials 124c and 124d, both brushes would engage their selected segments simultaneously during the first revolution of the hundredths brush rather than in the second revolution as should be the case when the brushes start at zero and advance in a decreasing number direction. Such premature contact of the tenths brush occurs when the selected number on the tenths and hundredths dials 124d and 124e is less than 85 and includes a hundredths digit of 4, 3, 2 or 1. These digits in the case of decreasing numbers correspond to the tenths digits 6, 7, 8 and 9, which are troublesome when counting increasing numbers as discussed above.

To avoid premature energization of the tenths relay Cs during approach of the carried 58 into its final position from the left, the circuit for this relay extends through normally closed contacts Cls–1 of a tenths lockout relay Cls whose circuit includes lockout and conditioning switches 156c and 155d (FIGS. 31 and 40f) corresponding to the switches 156b and 155c in the units lockout circuit. The conditioning switch 155d comprises a contact arm 157d secured to the hundreds switch shaft 127d and movable angularly therewith and across an annular series of contacts 158d whose numbering corresponds to that of the hundredths selector switch contacts 128d. The conditioning contacts numbered from 1 to 4, and also the "0" and "5" contacts as a precautionary measure, are connected together and to the coil of the tenths lockout relay through a conductor 159c. Thus, when any of the numbers from 0 to 5 is selected on the hundredths dial 124d, the hundredths conditioning switch is closed in the circuit for the lockout relay.

The tenths lockout switch 156c (FIGS. 31 and 40f) comprises a contact arm 161c secured to the tenths switch shaft 127c and engageable individually with ten contacts 162c. The latter are connected by conductors 163c to the conductors 150c which connect the selector switch contacts 128c to the brushes 147c of the respective tenths segments 131c. To complete the tenths lockout relay circuit when the tenths brush 130c engages the selected segment 131c prematurely during the final positioning movement of the carriage, the relative positions of the lockout contacts 162c and the contact arm 161c with respect to the shaft 127c are such that the arm engages the contact which is connected to the segment numerically succeeding the segment selected on the tenths dial 124c. For example, the lockout arm will engage the "9" contact 162c which is connected to the "9" segment 131c when the wiper 126c engages the "8" selector switch contact 128c as shown in FIG. 31. Although the segment selected on the lockout switch numerically succeeds the segment selected on the tenths dial, it actually precedes or is engaged by the tenths brush before the segment selected on the dial is contacted by the brush as the latter revolves counterclockwise in its number decreasing direction.

It will be apparent that, upon the selection of a hundredths digit from 0 to 5 and during engagement of the tenths brush 130c with the tenths segment 131c numerically succeeding the segment selected on the tenths dial 124c, the tenths lockout relay Cls will be energized through the tenths lockout switch 156c and the hundredths conditioning switch 155d. When any hundredths digit other than those from 0 to 5 is selected, the conditioning switch will be open so as to interrupt the circuit for the tenths lockout relay.

Premature energization of the hundredths relay Bs during the final carriage movement toward the "0" one of the reference elements 56a to 56j is avoided by energization of a hundredths lockout relay Bls (FIGS. 32, 33 and 40f) having normally closed contacts Bls–1 in the energizing circuit for the hundredths relay. The energizing circuit for this lockout relay is similar to that of the tenths lockout relay Cls and extends through a hundredths lockout switch 156d and a thousandths conditioning switch 155e. These switches correspond to the tenths lockout switch 156c and the hundredths conditioning switch 155d and operate in a similar manner to complete the hundredths lockout relay circuit through the hundredths brush 130d and the hundredths segment 130d numerically succeeding the segment selected on the hundredths dial 124d when any digit from 0 to 5 is selected on the thousandths dial 124e.

In connecting the hundredths segment 131d succeeding the selected segment into the hundredths lockout circuit, the contact arm 161d of the hunredths lockout switch 156d may be alined axially with the wiper 126d of the selector switch 125d as shown in FIG. 32. Each lockout switch contact 162d then is displaced angularly through one-tenth of a revolution in a counterclockwise direction about the shaft 127d from the correspondingly numbered selector switch 128d. For example, as shown in FIG. 32, the "0" lockout contact 162d is spaced angularly from the "0" selector contact 128d. Or, if desired, the correspondingly numbered lockout and selector contacts may have the same angular disposition about the shaft as shown in a modified construction in FIG. 33. In this case, the lockout contact arm 161d is displaced angularly onetenth of a revolution in a clockwise direction from the hundredths wiper 126d. The desired angular relation of the contacts 162b and 162c and the arms 161b and 161c of the units and tenths lockout switches 156b and 156c with respect to the contacts 128b and 128c and the wipers 126b and 126c of the units and tenths selector switches 125b and 125c similarly may be obtained by angular adjustment of either the lockout contacts or the lockout contact arms with respect to the selector contacts or wipers.

*Compensating means active while carriage is in or adjacent zero position.*—If the partial increment f of the desired distance a of table movement is less than .1 of an inch, that is, if the number selected on the partial increment dials 124b to 124e is 0.099 or smaller, simultaneous energization of the units and tenths commutator relays Es and Cs occurs when the carriage is in its zero position, shown in FIGS. 6 and 8. This is because the units and tenths brushes 130b and 130c then are contacting the selected "0" units and tenths segments 131b and 131c as shown in FIG. 27. Since the signal relay G1 is always energized during simultaneous energization of the units and tenths relays, it also is energized in the zero position of the carriage.

To utilize the signal relay G1 to complete the common circuit for the stopping relays J and J1 and still enable the carriage 58 to be shifted to the left through and beyond the final position even when the partial increment f is .099 of an inch or less, the movements of the carriage in traveling from its zero position to the final position include an intial shift to the right from the zero position before the start of the leftward movement in which the carriage passes the final position. As an incident to such rightward shift, the tenths brush 130c revolves in a counterclockwise direction as viewed in FIG. 28 and out of contact with its "0" segment 131c so that the circuit for the tenths relay Cs through this segment is interrupted. The amount of the shift is sufficient to move the tenths brush off of the "0" segment and to enable the carriage to accelerate enough in its leftward movement that, when the tenths brush reaches the "0" segment and the rapid traverse motor is stopped, the carriage will coast beyond the final position. Herein, the rightward shift is slightly less than .2 of an inch. While the purpose of this shift is to accommodate a number of 0.099 or smaller, the shift is made everytime the carriage is moved to the final position from the zero position regardless of the size of the partial increment f.

The rightward carriage shift is initiated by energizing the rapid traverse relay motor M1 (FIG. 40b) and the directional relay RL (FIG. 40a) in response to depression of the "preset" button 67. When these relays pull in, their contacts M1–1, M1–2, RL–7, RL–9 and RL–11 close to complete the circuit for the rapid traverse motor 59 (FIG. 40b). Deenergization of the latter for stopping the rightward carriage shift is effected by energization of a relay FP (FIG. 40e) having normally closed contacts FP–3 (FIG. 40a) in the circuit for the directional relay RL. When the relay FP pulls in, the relay RL drops out and normally open contacts RL–11 (FIG. 40b) thereof open in the circuit of the motor relay M1 so that the latter and the motor 59 are deenergized.

In this instance, the relay FP is energized for stopping the initial rightward shift of the carriage 58 in response to simultaneous contact of the units and tenths brushes 130b and 130c with their respective "9" and "7" segments 131b and 131c as shown in full in FIG. 29. For this purpose, the relay FP is connected in parallel with a rectifier 164 in a connection between the plate of a double grid thyratron tube T1 (FIG. 40e) and an alternating potential supply conductor 165. This connection also includes normally open contacts S–9 of a preset conditioning relay S (FIG. 40a) which is energized upon manual closure of the "preset" button 67 (FIG. 40a) and remains energized until the carriage 58 reaches its final position. The cathode of the tube is connected to ground at 166 (FIG. 40e) through normally open contacts RT1D–4 of a time delay relay RT1D (FIG. 40a) which is energized at the start of the carriage positioning cycle. The cathode-ground connection also includes parallel conditioning circuits, one of which extends in series through normally open contacts PB1–2 of a first latch relay PB1 (FIGS. 34 and 40d) and normally closed contacts N1–1 of a third range relay N1 (FIG. 40e). The other parallel circuit extends in series through normally open contacts PB2–2 of a second lath relay PB2 (FIG. 40d) and normally open contacts N9–1 of a first range relay N9 (FIG. 40e).

Normally, the thyratron T1 is biased to nonconduction by a suitable source 167 (FIG. 40e) of negative unidirectional potential which is applied to the grids of the tube through series current limiting resistors 168, a voltage dividing resistor 169 and a conductor 170 (FIG. 40e) extending between the source and the midpoint of the dividing resistor. One end terminal of the latter is connected to the "9" units segments 131b through the "9" units slip ring 146b, conductors 171 and 172b and normally open contacts S–10 (FIG. 40e) of the preset conditioning relay S. The other end terminal is connected to the "7" tenths segment 131c through the "7" tenths slip ring 146c, a conductor 173 and normally open conditioning relay contacts S–11. With this arrangement, the tube fires for energization of the stopping relay FP when its plate to cathode circuit is completed and the units and tenths commutators brushes 130b and 130c engage their respective "9" and "7" segments 131b and 131c to connect both grids to the cathode through ground. At the time of such engagement, the carriage will be to the right of its zero position and the brushes will have moved counterclockwise from their zero positions with the tenths brush just engaging the "7" segment as shown in full in FIG. 29.

Upon energization of the stopping relay FP, contacts FP–1 (FIG. 40e) thereof close in a sealing circuit around the tube T1 and its contacts FP–3 (FIG. 40a) open for deenergization of the directional relay RL and interruption of the circuit of the motor relay M1 at the contacts RL–11 (FIG. 40b). Drop out of the directional relay also is accompanied by closure of its contacts RL–12 in a circuit paralleling the contacts RL–11 and by closure of contacts RL–6 (FIG. 40a) to complete a circuit for energizing the previously mentioned time delay relay RLT. After a short interval, the latter pulls in to complete the circuit for the motor relay M1 through contacts RLT–1 and the directional contacts RL–12 (FIG. 40b). The motor relay then pulls in and the motor is energized through then closed directional contacts RL–8 and RL–10 to drive the carriage to the left at a rapid traverse rate. Such motion continues until the leftward motion stopping relays J and J1 are energized.

As noted above, the signal relay G1 is energized every time the units and tenths brushes 130b and 130c engage the segments 131b and 131c selected on the dials 124b and 124c. To utilize such energization to complete the common circuit for the stopping relays J and J1 (FIGS. 34 and 40b) at the contacts G1–1 (FIGS. 34 and 40d) and still avoid energization of these relays until the carriage 58 has completed its initial rightward shift, the common circuit for the stopping relays is interrupted both before and during the rightward shift. This is accomplished simply by including normally open contacts FP–2 (FIGS. 34 and 40b) of the relay FP in series with the signal relay contacts G1–1 in the common circuit. Thus, the common circuit for the relays J and J1 cannot be conditioned for completion by closure of the signal contacts F1–1 until the relay FP is energized to terminate the initial rightward shift of the carriage.

As the carriage 58 moves to the left from the position into which it initially shifted to the right of the zero position, the units and tenths brushes 130b and 130c revolve clockwise from their positions of overlap of the units brush with its "9" and "0" segments 131b and overlap of the tenths brush with its "7" and "8" segments 131c as shown in full in FIG. 29. During this clockwise movement and until the tenths brush 130c has progressed slightly more than .3 of a revolution past its zero position and overlaps its "2" and "3" segments as shown in phantom in FIG. 29, the units brush remains in contact with both of its "9" and "0" segments. Beyond this position, the units brush leaves it "9" segment. The different combinations of pairs of segments contacted simultaneously by the brushes before the units brush progresses off of its "9" segment correspond to the numbers from 0.7 to 0.9, 0.0 to 0.3, 9.7 to 9.9 and 9.0 to 9.3 which may be selected on the units and tenths dials 124b and 124c.

Selection of the numbers from 0.0 to 0.3 gives rise to no difficulty because, by the time the brushes engage the different pairs of selected segments corresponding to these numbers, the carriage 58 has reached the corresponding positions at or to the left of its zero position. In the case of the numbers from 0.7 to 0.9 there is no difficulty because the units lockout relay Els is energized to disable the units relays Es until the units brush leaves the "9" segment 131b, the latter having been selected on the lockout switch 156b as preceding the "0" segment selected on the units selector switch 125b.

Whenever any of the numbers from 9.7 to 9.9 and from 9.0 to 9.3 is selected on the units and tenths dials 124b and 124c, the units and tenths brushes 130b and 130c engage their selected segments 131b and 131c simultaneously for energization of the units and tenths relays Es and Cs and thus the signal relay G1 while the carriage is just starting its leftward shift and is still adjacent its zero position rather than being spaced at least 9 inches to the left of the zero position. To avoid energization of the stopping relays J and J1 during such premature energization of the signal relay, the common circuit for the stopping relays is disabled whenever a 9 is selected on the units dial 124b and until the units brush 130b progresses off of its "9" segment as shown in phantom in FIG. 29 during the initial part of the shift of the carriage to the left through the zero position. After the units brush leaves its "9" segment, the stopping relay circuit is conditioned for completion at the contacts G1–1 when the signal relay G1 is energized.

To disable the common circuit for the stopping relays J and J1 when the "9" units segment 131b is selected on the units dial 124b, the circuit includes a disabling switch 174b (FIGS. 34 and 40f) in series with the normally open contacts G1–1 of the signal relay G1 (FIG. 40d) and the contacts FP–2 of the rightward motion stopping relay FP. This switch is similar in construction to the units selector and lockout switches 125b and 156b and comprises a contact arm 175b secured to the units switch shaft 127b and engageable individually with ten contacts 176b angularly spaced about the shaft. Of these ten contacts, the nine which are engaged by the arm when the units segments 131b from "0" to "8" are selected on the units dial 124b are connected to each other and to the conductor 144 in series with the signal relay contacts G1–1. The remaining contact is an open one engaged by the arm when the "9" segment is selected on the units dial. A conductor 141 connects the arm 175b to the relay contacts FP–2 of the relay FP. Thus, when any number other than 9 is selected on the units dial, the disabling switch is closed and the common circuit for the stopping relays J and J1 is conditioned for completion in response to simultaneous energization of the signal relay G1 and the relay FP. If the selected units digit is 9, the disabling switch is open between the conductors 141 and 144.

When a 9 is selected on the units dial 124b and the disabling switch 174b is open in the common circuit for the stopping relays J and J1, one of two shunt circuits is completely around the disabling switch and between the conductors 141 and 144 in the common stopping relay circuit to condition the latter for completion in response to energization of the signal relay G1 after the units brush 130b leaves the "9" units segment 131b in the leftward movement of the carriage 58 away from its zero position. The condition of the respective shunt circuits, that is, their individual completion or interruption, is controlled by the previously mentioned latch relays PB1 and PB2 (FIG. 40d) and the range relays N9 and N1 (FIG. 40e) in accordance with the location of the zero position of the carriage in the range g and with the displacement of the carriage to the left of the zero position. One shunt circuit (FIGS. 34 and 40d) extends through normally open contacts PB1–1 of the first latch relay PB1 and normally open contacts N1–2 of the third range relay N1 and is completed when both of these relays are pulled in. The other circuit extends through normally open contacts PB2–1 of the second latch relay PB2 and normally closed contacts N9–2 of the first range relay N9 and is completed when the latch relay is pulled in and the range relay is deenergized.

Energization and deenergization of the respective range relays N9, N0 and N1 are varied in accordance with the prevailing position of the carriage 58 by extending their energizing circuits through a commutator switch 177 (FIGS 2, 22 and 40e). This switch comprises a brush 178 connected to a ground conductor 179 (FIG. 40e) and secured to a shaft 180 which is journaled in the commutator supporting plates 137 and is driven from the units shaft 135b through gears 181 (FIG. 22) providing a reduction ratio of approximately 6.25 to one. Three segments 182 (FIG. 40e) stationarily mounted for successive engagement by the brush are connected by individual conductors 183 to the respective range relays. The brush 178 is similar to the other commutator brushes 130b to 130e. The segments 182, although of the same shape and spacing as the other segments 131b to 131e, are stationarily mounted in an insulating member 187 (FIG. 22) rather than on a rotary part. To energize each relay when the brush engages the corresponding segment, the secondary 184 of a step-down supply transformer 185 (FIG. 40d) is connected between the grounded brush conductor 179 and a conductor 186 common to the relays.

The brush 178 is secured to its shaft 180 in such a position relative to the segments 182 that it engages the "9" segment to complete the circuit for the first range relay N9 when the carriage is within a first partial range n9. The latter extends approximately 8.5 inches to the left as viewed in FIG. 2 from the right hand limit of the normal range g of carriage movement. With this brush position and the 6.25 ratio provided by the gears 181, contact of the brush with the second or "0" segment 182 takes place to complete the circuit through the second range relay N0 when the carriage is in an intermediate partial range n0 (FIG. 2) which overlaps approximately 2.5 inches of the left end portion of the first range n9 and extends approximately 7.5 inches to the left beyond the first range. Also, the brush engages the third or "1" segment 182 for energization of the third range relay N1 when the carriage is in a third partial range n1 having approximately 2.5 inches of overlap with the left end portion of the intermediate range n0 and extending from the latter of the left approximately five inches to the left end limit of the normal carriage range g. Each of the range relays thus is energized when the carriage is located in the corresponding one of the partial ranges and is deenergized when the carriage is outside of such range.

The latch relays PB1 and PB2 (FIG. 40d) cooperate with the second range relay N0 to control the shunt circuits around the disabling switch 174b in accordance with the location of the zero position of the carriage 58 in relation to the ranges n0, n9 and n1. To this end, the energizing circuit for the first latch relay PB1 extends through normally open contacts N0–2 (FIG. 40d) of the range relay N0 and the circuit for the second latch relay PB2 extends through normally closed contacts N0–1 of the range relay. With this arrangement, the first latch relay PB1 can be energized only when the carriage is inside of the second range N0 so that the second range relay N0 is energized. Also, the second latch relay PB2 can be energized only when the carriage is outside the second range.

Each of the latch relays PB1 and PB2 is of the type having a latch 188 (FIG. 40d) adapted to hold the relay armature 189 in its actuated or "pulled in" position to which it shifts whenever the relay coil is energized. Through suitable mechanical connections (not shown) between the latches and the armatures of the two relays, the latch of each relay is released to permit movement of the associated armature to a "dropped out" position only in response to energization of the coil of the other relay. In other words, if both coils are deenergized while the armature of one of the relays is latched in its actuated position, it will remain in such position until the coil of the other relay is energized.

To utilize the latch relays PB1 and PB2 to indicate or remember electrically whether the zero position of the carriage 58 is inside or outside of the second partial range n0, the energizing circuits for these relays are conditioned for closure by the respective N0–1 and N0–2 contacts of the second range relay N0 while the zero carriage position is being established, but are interrupted to deenergize both latch relays after the zero position is established and during movement of the carriage to the final position set on the dials 124b to 124e. This is accomplished by extending the circuits for the latch relays through a conductor 109 (FIGS. 40a to 40d) and normally open contacts R–1 (FIG. 40a) of the reference set-up relay R. During the carriage movement to establish the zero position, this relay is energized and either the first latch relay PB1 or the second relay PB2 is energized depending on whether the carriage is outside or inside of the second range n0. After the zero position is established, the set-up relay R is deenergized and both latch relay circuits are interrupted, the armature 189 of the latch relay which was last energized remaining in its actuated or "pulled in" position.

As was described earlier in connection with the reference set-up mechanism, the farthest that the zero position of the carriage 58 can be spaced from its right end of its normal range g is slightly more than 10 inches. Thus, with the right end of the third partial range n1 (FIG. 2) spaced approximately 13.5 inches from the right hand limit position of the carriage, the zero position always is spaced at least 3 inches to the right and outside of the third range and is located either within the second range n0 or to the right of the latter and within the first range n9.

Assuming that the zero position of the carriage 58 is located to the right of the second rang n0 and within the first range n9, the second latch relay PB2 will be latched in and the first relay PB1 will be dropped out so that the first shunt circuit around the disabling switch 174b will remain open at the first relay contacts PB1–1 (FIG. 34). Also, the second relay contacts PB2–1 will be closed in the second shunt circuit throughout the movement of the carriage to its final position. Now, if the latter is spaced 9 inches or more to the left of the zero position as determined by selection of a 9 on the units dial 124b, the disabling switch 174b is open and the circuit for the stopping relays J and J1 can be completed in response to energization of the signal relay G1 only after the second shunt circuit is completed by deenergization of the first range relay N9 and closure of its contacts N9–2 in series with the now closed second latch relay contacts PB2–1. In other words, the carriage must move to the left and beyond the first range n9. Since the zero position is to the right of the second range n0 and the latter overlaps the first range approximately 2.5 inches, the carriage must move to the left from its zero position at least this 2.5 inches before the stopping relays can be energized. This movement is more than sufficient to insure that the units brush 130b has moved out of contact with its selected "9" segment 131b so as avoid premature energization of the stopping relays.

If the zero position of the carriage 58 is located within the n0 range, the first latch relay contacts PB1–1 in the first shunt circuit around the disabling switch 174b (FIG. 34) will be closed and the second latch relay contacts PB2–1 in the second shunt circuit will remain open throughout the movement of the carriage from the zero to the final position. Assuming that a 9 has been selected on the units dial 124b so that the disabling switch is open, the carriage must move into the third range n1 for energization of the third range relay N1 and closure of its contacts N1–2 in series with the then closed latch relay contacts PB2–1 in order to condition the stopping relays J and J1 for energization when the signal relay G1 pulls in. Since the third range is spaced from the right end of the normal range g approximately 13.5 inches and the zero carriage position always is established within slightly more than 10 inches from the right end of the normal range, the carriage must move to the left from the zero pisition at least approximately 3.5 inches before the second shunt circuit around the disabling switch 174b is completed. In this movement of the carriage, the units brush 130b advances in a clockwise direction well beyond its "9" segment 131b and premature energization of the stopping relays J and J1 again is avoided.

After the carriage 58 has been located in its final position in accordance with one number selected on the dials 124b to 124e, it sometimes is shifted to another final position according to a different setting on the dials. In this case, as when shifting the carriage to the first position from the zero position, it is shifted first to the right until the units and tenths brushes 130b and 130c engage their "9" and "7" segments and the thyratron T1 fires to complete the energizing circuit for the rightward motion stopping relay FP. If the final position is 9.7 inches or more to the left of the zero position, the units and tenths brushes 130b and 130c will engage their "9" and "7" segments to ground both grids of the thyratron before rather than after the carriage reaches its zero position in this rightward shift. The purpose of the latch relay contacts PB1–2 and PB2–2 and the range relay contacts N1–1 and N9–1 in the parallel circuits between the plate and cathode of the thyratron (FIG. 40e) is to maintain the thyratron plate circuit open and thus avoid energization of the stopping relay FP during such premature grounding of the grids. This insures that the carriage travels beyond the zero position in the event that the first final position was spaced to the left of the zero position 9.7 inches or farther.

Assuming that the zero position of the carriage 58 is to the right of the second range n0 and that the first final position is spaced to the left of the zero position 9.7 inches or more, the final position is spaced to the left beyond the left end of the first range n9 a distance greater than 1 inch. Also, with the zero position outside of the second range, the second latch relay contacts PB2—2 remain closed in series with the normally open contacts N0–1 (FIG. 40e) of the first range relay N9 in the first parallel circuit between the plate and cathode of the thyratron. Also, the first relay contacts PB1–2 remain open in the second parallel circuit. Firing of the thyratron and energization of the rightward motion stopping relay FP then can take place only after the carriage has moved through a distance of at least one inch to the right from the first final position and back into the first range n9. During this movement, the units and tenths brushes 130b and 130c will have passed beyond their "9" and "7" segments so that premature firing of the thyratron is avoided.

If the zero position is within the second range n0, a final position spaced 9.7 inches or more to the left will be located in the third range n1 and at least two inches to the left of the right end of this range. The zero position being in the second range, the second latch relay contacts Pb2–1 remain open in the first parallel circuit between the plate and the cathode of the thyratron T1 (FIG. 40e) and the first latch relay contacts PP1–2 are closed in series with the normally closed third range relay contacts N1–1 in the second parallel circuit. Thus, the plate to cathode circuit of the thyratron and therefore the energizing circuit for the relay FP can be completed only when the carriage is to the right of the third range n1 and well beyond the position where the units and tenths brushes 130b and 130c move out of engagement with their "9" and "7" segments adjacent the final position.

*Resetting Means for Counting Mechanism*

After the carriage 58 has been moved into its zero position with respect to one of the reference elements 56a to 56j, the counting mechanism 64 is placed in a zero condition so that measurement of the partial increment f set on the dials 124b to 124e is made directly from this position of the carriage. In the exemplary counting mechanism comprising the four commutators 129b to 129e, the zero condition is one in which each of the brushes 130b to 130e overlaps both of the associated "9" and "0" segments as shown in FIG. 27. Where, as in this instance, the brushes are geared permanently to the carriage screw 76 so as to project from their shafts 127b to 127e in different directions in the various locations available for the zero position of the carriage, each brush is located in its zero position by rotating the associated segments to bring the "9" and "0" segments into overlapping engagement with the brush. Such rotation is permitted while retaining permanent connections of the individual segments 131b to 131e to the corresponding contacts 128b to 128e of the selector switches 125b to 125e by making such connections through the slip rings 146b to 146e and their associated brushes 147b to 147e.

Rotation of the segments 131b to 131e relative to the commutator brushes 130b to 130d is effected herein by individual electric motors 190b to 190e (FIGS. 22, 23 and 40e) which are of similar construction and are controlled in a similar manner. The hundredths motor 190d, for example (FIG. 23) is mounted on one of the stationary supporting plates 137 within the commutator housing 132. The shaft of this motor carries a pinion 191d which meshes with a gear 192d bolted to the hundredths segment supporting sleeve 148d to provide a direct drive between the latter and the motor.

The energizing circuits for the commutator motors 190b to 190e are completed in response to closure of the final carriage switch ff (FIGS. 10 and 40e) upon movement of the reference lever 97 (FIG. 10) when the carriage reaches its zero position initially as shown in FIG. 6. For this purpose, one terminal of each motor (FIG. 40e) is connected permanently to the alternating supply line L1 and the other motor terminals are connected to a conductor 120 through two common conductors 182 and 193 and normally open contacts FR–5 (FIG. 40e) of the relay FR (FIG. 40b). The conductor 120 is connected to the alternating current supply conductor 100 either through normally open contacts S–3 (FIG. 40a) of the preset conditioning relay S or through normally open contacts R-3 of the reference setup relay R. The circuit for the relay FR (FIG. 40b) is completed by closure of normally open contacts ff-2 of a relay FF (FIG. 40d) which is connected across the transformer secondary 184 (FIG. 40d) upon closure of the carriage switch ff.

To stop the respective commutator motors 190b to 190e when the individual brushes 130b to 130e overlap the associated "9" and "0" segments 131b to 131e, the connections between the motors and the common conductors 192 and 193 (FIG. 40e) are made through normally closed contacts of separate relays RJ, RE, RC and RA. The energizing circuits of the latter extend through individual thyratron tubes Tb to Te each of which controls a different motor and is fired in response to contact of both the "9" and "0" segments with the brush of the associated commutator. Taking the units relay RJ and thyratron Tb, for example, the cathode of the tube is connected to a grounded conductor 194 and the relay coil is connected in parallel with a rectifier 195b between the plate of the tube and a common relay conductor 196 which is connected to the alternating current supply conductor 165 through normally open contacts FR-4 of the relay FR and a conductor 197.

Normally, the units thyratron tube Tb is biased to cut-off in the same way as the tube T1 for the relay FP by connecting its two grids through individual series resistors 199b to opposite ends of a voltage divider resistor 200b whose midpoint is connected to ground through the direct current bias source 167. To overcome this bias and fire the tube when both the "9" and "0" units segments 131b are contacted by the units brush 130b, opposite ends of the divider resistor are connected by conductors 172b and 201b to the "9" and "0" slip rings 146b of the units commutator 129b. Thus, both grids are grounded through the brush when the latter contacts both of the "9" and "0" slip rings. As soon as the tube fires, the relay RJ is energized and normally closed contacts RJ-1 thereof open to interrupt the circuit for the units motor 190b. Although the tube fires as soon as the brush engages both the "9" and "0" segments simultaneously, the speed of rotation of the segment sleeve 143d and its coast after the tube fires are such that the brush overlaps the two segments substantially equal amounts as in the case of the hundredths brush 130d shown in FIG. 25 when the sleeve stops.

The other tubes Tc to Te operate in a similar manner to stop their motors 190c to 190e after the brushes 130c to 130e engage the associated "9" and "0" segments 131c to 131e simultaneously. To restore all four of the tubes to their nonconductive states, normally open contacts RJ-2, RE-2, RC-2 and RA-2 of the motor relays are connected in series with normally closed contacts RH-1 of a relay RH (FIG. 40e) between two conductors 100 and 202 (FIGS. 40d and 40e) in the energizing circuit of a relay RF (FIG. 40d). When all of these contacts are closed, the relay RF is energized and normally closed contacts RF-4 (FIG. 40a) thereof open to interrupt the energizing circuit for the reference setup relay R. The latter then drops out and its contacts R-3 open to disconnect the conductor 120 from the alternating current supply conductor 100 thereby interrupting the power supply to the tubes.

*Identifying Mechanism*

After the carriage 58 reaches its zero position, the identifying mechanism 65 operates to establish the table reference point c on one of the reference elements 56a to 56j in accordance with the number of whole increments e selected on the tens dial 124a. Then, after the carriage has been moved into its final position and while the table 47 is moving to the left, the mechanism gives the signal for stopping the table in its final position where the table reference point coincides with the base point b. To perform other functions such as varying the speed at which the table travels and controlling the carriage movement during the selection of the "0" reference element, the identifying mechanism also senses the presence of the carriage adjacent each reference element and identifies the elements in a numerical succession starting from the "0" element and progressing therefrom to the right, that is, in the direction opposite to the direction of spacing of the final position of the carriage from the "0" element. The presence of the carriage adjacent the respective elements is sensed by a feeler means 203 which distinguishes the elements one from another in order that each element may be identified by a different signal.

While the feeler means 203 may take various forms, herein it comprises four normally open switches 204A to 204D (FIGS. 11 and 40d) mounted on the carriage 58 and having actuator pins 205A to 205D projecting therefrom for engagement with different sets 206a to 206j of four identifying cam plates 207 secured to the respective reference elements 56a to 56j. The presence of the carriage adjacent each element is sensed mechanically but the different signals identifying the elements are electrical. The switches are arranged side by side transversely of the path of table movement and their casings are bolted to the upper edge portion of the back wall of the carriage (FIG. 11) with the actuator pins projecting through and beyond the top carriage cover plate 81.

The four cam plates 207 of each of the sets 206a to 206j associated with the respective reference elements 56a to 56j are bolted to the corresponding recessed plate 70 (FIG. 11) and are disposed side by side in vertical planes paralleling the path of table movement and each including a different one of the actuator pins 205A to 205D. Each plate either extends downwardly into the path of one of the actuator pins as in the case of the leftmost plate shown in FIG. 11 to engage and depress the pin for closure of the associated switch or, as in the case of the other plates in this figure, is disposed above the path of the pin so that the switch remains open. The active plates of each set, that is, the ones which extend into the paths of the actuator pins, are arranged in a different combination from the active plates of each of the other sets so that the switches 204A to 204D likewise are actuated in different combinations corresponding to the respective refernce elements. Referring to FIGS. 13 to 21, it will be seen that the active plates are arranged to actuate the four switches in ten different combinations, each set of plates bearing the same one of the subscript letters a to j as the corresponding reference element.

To obtain a different electrical signal in response to actuation of the four switches 204A and 204D in each of the available ten combinations, the switches are connected individually in series with the coils of four relays A2, B2, C2 and D2 (FIG. 40d) across the transformer secondary 184. Each relay then is energized and de-energized respectively in response to closure and opening of the associated switch. The contacts of these relays (FIG. 40e) are connected in ten separate identifying circuits 208a to 208j extending from the grounded conductor 179 (FIGS. 40d and 40e) and through individual conductors 209 (FIG. 40e) to conductors 210 (FIGS. 40e and 40f) which are connected permanently to the respective contacts 128a of the tens selector switch 125a (FIG. 40f). The arrangement of the contacts of the four relays is correlated with the different combinations in which the switches are actuated to energize the relays so that each identifying circuit corresponds to a different reference element and is completed when the relays are energized in accordance with the combination determined by the cam plates 207 associated with that element. The subscript letter identifying each circuit is the same as that of the associated reference element.

The identifying circuit 208a corresponding to the farthest reference element 56a at the left end of the table as viewed in FIG. 1, for example, extends through normally open contacts of the fourth relay D2 and normally closed contacts of the other three relays A2, B2 and C2 as shown in FIG. 40e. The set 206a of cam plates 207 rigid with the extreme left element are arranged to close only the fourth switch 204D and to leave the other switches open as shown in FIG. 11. Thus, when the carriage 58 is close enough to this element that the fourth cam plate 207 engages and depresses the actuator 205D of the fourth switch 204D, the latter is closed and the fourth relay D2 is energized to close its normally open contacts and complete the circuit 208a through the normally closed contacts of the other three then deenergized relays. At this same time, each of the other nine circuits 208b to 208j is interrupted because it contains either normally closed contacts of the fourth relay D2 or normally open contacts of one or more of the other three relays. Each of the other identifying circuits similarly is the only one completed when the cam plates of the corresponding reference element actuate the switches.

To enable any one of the reference elements 56a and 56j to be selected as the "0" element and the other elements to be identified in their numerical succession progressing to the right from the "0" element, a multiple identifying switch 211 (FIGS. 35 to 39 and 40e) is interposed between the conductors 210 which are connected individually to the tens selector switch contacts 128a and the conductors 209 which are individual to the identifying circuits 208a to 208j. This switch enables the connections between the selector switch contacts and the identifying circuits to be changed so that the circuit corresponding to the reference element selected as the "0" element is connected to the "0" contact and the circuits for the elements to the right of the "0" element are connected individually in succession to the other contacts which increase numerically from the "0" contact. For example, if the third reference element 56c from the left end of the table 47 is selected as the "0" element, the third identifying circuit 208c will be connected to the "0" selector switch contact 128a as shown in FIG. 38, the fourth circuit 208d will be connected to the "1" contact and so on.

In the present instance, the identifying switch 211 is a commutator having ten brushes 212 arranged in an annular series and mounted for yieldable axial movement in an insulating plate 213 which is bolted to one of two parallel supporting plates 214 (FIG. 35) in a housing at the control station 55. Ten segments 131a cooperating with the brushes are constructed and mounted on a flange 142a of a rotatable insulating sleeve 143a in the same manner as the hundredths segments 131d (FIG 23). Individual conductors 151a connect the segments 131a to slip rings 146a rigid with the sleeve. The selector conductors 210 are connected individually and in succession to the respective tens brushes 212. Other brushes 147a (FIG. 35) similar in construction and mounting to the hundredths slip ring brushes 147d (FIG. 26) engage the respective tens slip rings 146a and are connected in succession to the indiivdual identifying circuit conductors 209. The order of connection of the contacts 128a to their brushes 212 is the same as the order of connection of the identifying circuits 208a to 208j through the brushes 147a to the segments. Thus, when the segment 131a of the third identifying circuit 208c is engaging the brush 212 of the "0" contact, for example, the segment of the fourth circuit 208d engages the brush for the "1" contact and so on around the series of segments and brushes as shown in FIG. 38.

With the above arrangement of the tens commutator 211 and the identifying circuits 208a and 208j, a different identifying circuit is connected to the tens wiper 126a when the latter engages each of its contacts 128a. The particular circuit selected depends not only on the setting of the tens dial 124a and thus the number of the active contact, but also, on the number of the identifying circuit whose segment is engaged by the "0" brush 212, that is, the brush connected by one of the conductors 210 to the "0" switch contact. For example, assuming that the segment sleeve 143a has been rotated to bring the segment 131a of the third circuit 208c into engagement with the "0" brush as shown in FIG. 38, the third reference element 56c becomes the "0" element. Now, if a 5 is selected on the tens dial so that the wiper engages the "5" contact 128a as shown in this figure, the identifying circuit 208i for the ninth reference element 56i becomes the selected circuit which is connected to the tens wiper. The spacing in whole increments e of this selected reference element to the right of the "0" element is equal to 5, the number selected on the tens dial.

To utilize the selection of a number on the tens dial 124a to condition the identifying mechanism 65 to give its signal for stopping the table 47 in its final position, a previously mentioned relay PA (FIG. 40d) which may be referred to as the tens conditioning relay is energized in response to completion of the one of the identifying circuits 208a to 208j corresponding to the selected number. Such energization is effected herein by connecting the relay and a conductor 215 (FIGS. 38, 39, 40e and 40f) in series with the tens switch wiper 126a (FIGS. 38, 39 and 40f) between the conductor 186 leading to the secondary 184 of the step-down transformer 185 (FIG. 40d). The energizing circuit for the conditioning relay then is completed through the tens selector switch 125a when the reference element corresponding to the identifying circuit selected on the tens dial 124a is close enough to the carriage 58 that the associated cam plates 207 actuate the switches 204A to 204D for energizing the relays A2 to D2 in the proper combination to complete the identifying circuit.

The signal given by the identifying mechanism 65 for termination of the final table positioning movement in this instance is energization of a stopping relay FG (FIG. 40d). The energizing circuit for this relay extends through a conductor 198 (FIGS. 40c and 40d), normally open contacts PA–2 (FIG. 40c) of the tens conditioning relay PA (FIG. 40e) and normally open contacts FF–1 (FIG. 40d) of the relay FF (FIG. 40d) which is energized upon closure of the last carriage switch ff (FIGS. 10 and 40d). Thus, the conditioning relay must be energized before the circuit for the stopping relay FG can be completed in response to closure of the carriage switch. To terminate the table motion in response to energization of the stopping relay FG, normally closed contacts FG–1 thereof (FIG. 40c) are connected in series with a table motion conditioning relay PT (FIG. 40c). When the stopping relay pulls in, this conditioning relay drops out and its contacts PT–2 (FIG. 40c) and PT–3 (FIG. 40a) open in the circuits for all of the relays which are active during the table positioning movement to the left.

In addition to conditioning the stopping relay circuit for completion upon closure of the last carriage switch ff, the tens conditioning relay PA also controls the position of the reference lever 97 during the table positioning movement. This is accomplished by connecting the normally open contacts PA–4 of this relay in series with the carriage motor relay contacts M2–6 (FIG. 40b) in the energizing circuit for the rotary solenoid 104 as described above. The solenoid then remains energized to hold the base reference number 57 in its lower inactive position until the conditioning relay PA is energized. In other words, the member remains below the path of the reference elements 56a to 56j until the element selected on the tens dial 124a approaches close enough to the carriage for actuation of the identifying switches 204A to 204D by the associated cam plates 207. As soon as the conditioning relay pulls in, the solenoid 104 is deenergized and the reference member swings counterclockwise from its lower position shown in full in FIG. 10 and into its upper position shown in phantom for engagement with the selected reference element.

To provide clearance for the reference member 57 to swing past the lower end of the reference element selected on the tens dial 124a, the associated cam plates 207 extend to the left beyond the element as shown in FIG. 10 and actuate the switches 204A to 204D to complete the selected identifying circuit and energize the conditioning relay PA before the table reaches the final position. In this instance, each cam plate extends to the left beyond the reference element far enough to engage the switch actuator pins 205A to 205D and close the switches 204A to 204D when the table is spaced approximately one inch to the right of its final position. Also, the length of the lower end portions of the active cam plates is approximately two inches. Thus, when the carriage is in its zero position with respect to each reference element, the actuator pins are centered on the associated cam plates and the latter extend approximately one inch to the left and to the right of the pins as shown in FIG. 10.

Energization of the conditioning relay PA when the selected one of the reference elements 56a to 56j approaches the carriage 58 but before the table 47 reaches its final position is utilized to reduce the table speed from a fast feed rate to a slow feed rate. For this purpose, normally open contacts PA–2 of the relay are connected in the energizing circuit of a feed timer relay FT (FIG. 40c) having contacts FT–1 in a circuit for a slow feed relay SF (FIG. 40c) and normally closed contacts FT–2 in parallel with normally closed contacts PA–3 of the conditioning relay in the energizing circuit for a fast feed relay FAF (FIG. 40c).

When the conditioning relay PA and the timer relay FT are deenergized and the fast feed relay is energized, normally open fast feed relay contacts FAF–1 are closed between two conductors 216 and 217 to complete a circuit through a suitable speed controller 218 (FIG. 40c) and thereby energize the table feed motor 52 to advance the table to the left at a fast feed rate. Upon energization of the conditioning relay PA, its contacts PA–2 close for energization of the timer relay FT and the contacts PA–3 open in parallel with the timer contacts FT–2. The timer relay then pulls in after a short interval to open its contacts FT–2 in the circuit for the fast feed relay FAF and the latter drops out to interrupt the fast feed circuit between the conductors 216 and 217. At the same time, the timer contacts FT–1 close to energize the slow feed relay SF and close normally open contacts SF–1 thereof. The latter complete a circuit between one speed controller conductor 217 and an intermediate tap on a speed control resistor 219 to effect energization of the feed motor for advancing the carriage at a slow feed rate slower than the fast feed rate.

Closure of the conditioning relay contacts PA–2 also conditions an extra slow feed relay XSF (FIG. 40c) for completion in response to closure of the first carriage switch PS when the table is approximately .008 of an inch from its final position. Upon energization of this feed relay, its contacts XSF–1 close to complete a circuit between one speed control conductor 217 and another tap on the divider resistor 219. This results in a further decrease of the motor speed so that the table is shifted into its final position at a very slow rate slower even than the slow feed rate. In one machine tool equipped with the novel positioning apparatus described herein, the rates of travel of the table 47 were 38 to 40 feet per minute for the rapid traverse rate, 30 inches per minute for the fast feed rate, 5 inches per minute for the slow feed rate and .25 of an inch for the extra slow feed rate.

To insure that the table 47 may be slowed down to the slow and extra slow rates after energization of the conditioning relay PA, it is desirable that the reference element selected on the tens dial 124a approach the carriage at the fast feed rate. The individual identification of the reference elements resulting from completion of their respective circuits 208a to 208j in succession is utilized to obtain such approach of the selected element while making it possible to shift the table at the rapid traverse rate over at least a part of the total distance $a$ where the latter exceeds two whole increments $e$. To this end, a speed control relay PB is energized in response to completion of the identifying circuit of the reference element which immediately precedes the selected element, that is, the element to the left of the selected element as viewed in FIG. 1. In response to energization of this relay, the table motor control circuits are conditioned for advance of the table through the last whole increment only at one of the feed rates. With such conditioning, the table may be moved to bring the preceding element up to the carriage at the rapid traverse rate and still shift the selected element up to the carriage at the desired fast feed rate. Thus, if the desired distance $a$ contains three whole increments $e$, for example, the table may be moved through the first two of these increments at the rapid traverse rate thereby shortening the total traverse time for the table.

The energizing circuit for the speed control relay PB extends through a second tens switch 220a (FIGS. 30a and 40f) having a contact arm 221a secured to and movable angularly with the tens switch shaft 127a and engageable individually with ten contacts 222a arranged in an annular series about the shaft. The contacts are connected by conductors 223 individually to the respective slip ring brushes 146a through the conductors 210 in such a manner that the contact engaged by the arm is connected to the brush numerically preceding the brush which is connected to the tens wiper 126a. With the coil of the relay PB (FIG. 40e) connected between the contact arm and the conductor 186 (FIG. 40e) leading the transformer secondary 184 (FIG. 40d), the relay is energized whenever power is available at the transformer and the cam plates 207 of the reference element preceding the selected element engage the actuators of the identifying switches 204A to 204D.

To condition the motor circuits for effecting advance of the table 47 only at a feed rate, normally open contacts PB–1 (FIG. 40c) are closed upon energization of the speed control relay PB (FIG. 40e) to complete the circuit for a second speed control relay PBA (FIG. 40c) having normally open contacts PBA–1 in its own holding circuit and normally closed contacts PBA–2 in the energizing circuits of two rapid traverse relays TRA and TRB. The circuit for the first of the latter is completed through the contacts PBA–2 and contacts A3–1 upon energization of a relay A3 (FIG. 30e) mentioned earlier in the discussion of the reference setup mechanism. The circuit for this relay extends through conductors 106 and 107 (FIGS. 40c and 40d) and is completed in response to energization of any one of the identifying relays A2 to D2 and closure of their normally open contacts between the conductors. In other words, the relay A3 is energized if any one of the reference elements 56a to 56j is close enough to the carriage 58 for closure of the identifying switches 204A to 204D by the associated cam plates 207.

Upon energization of the first rapid traverse relay TRA (FIG. 40c), holding contacts TRA–1 thereof close in a shunt around the contacts A3–1, normally closed contacts TRA–2 open in the circuit for the fast feed relay FAF and normally open contacts TRA–3 (FIG. 40a) close in the circuit of a timer control relay RT2. When the latter pulls in, its contacts RT2–1 close to complete the circuit through a time delay relay RT2D (FIG. 40a). After a short interval, this relay pulls in and its contacts RT2D–2 (FIG. 40c) close to complete the circuit for the second rapid traverse relay TRB whose normally open contacts TRB–1 close to connect the rapid traverse motor 53 to a suitable power source (not shown). Since the circuit for both rapid traverse relays extends through the normally closed contacts PBA–2 of the second speed control relay PBA, the rapid traverse relays and thus the rapid traverse motor cannot be energized whenever the speed control relay is energized.

When its positioning movement to the left is first initiated, the table 47 travels at the fast feed rate until the "0" reference element reaches the carriage 58. If this element is the one selected on the tens dial 124a, the conditioning relay PA is energized to effect slowing down and stopping of the table. If the "0" element immediately precedes the selected one, the speed control relays PB and PBA are energized to maintain the fast feed rate and prevent energization of the rapid traverse relays TRA and TRB and the rapid traverse motor 53. Should the table distance a include two or more whole increments e, neither of the conditioning and speed control relays PA and PB is energized as the "0" element reaches and passes the carriage. The relay A3 (FIG. 40c) is energized however and the circuit for the first rapid traverse relay TRA is completed at the contacts A3–1 (FIG. 40c). After a short time interval, the second relay TRB pulls in to energize the rapid traverse motor 53 and the table speed increases to the rapid traverse rate where it remains until the element preceding the selected one reaches the carriage 58. Then, the speed control relay PB is energized and the table speed is reduced to fast feed through the last whole increment and until the relay PA is energized for slowing down and stopping the table.

For a purpose to appear in the description of the operation, the identifying circuits 208a to 208b are utilized to complete an energizing circuit to a relay PC (FIG. 40e) if, after a number has been selected on the dials 124a to 124e and the carriage has been located in its final position, the table is shifted either one or two whole increments e to the left of the final position. This relay is connected between the conductor 186 (FIG. 40e) leading to the transformer secondary winding 184 (FIG. 40d) and conductors 224 and 225 (FIGS. 40e and 40f) which extend to contact arms 226a and 227a of third and fourth tens selector switches 228a and 229a (FIGS. 33a and 40f) similar in construction to the second switch 220a and actuated in unison with the latter and the first switch 125a. The contacts of the third and fourth switches are connected through conductors 230 and 231 and the conductors 210 and 213 to the tens slip ring brushes 147a in such a manner that their contact arms are connected to the identifying circuits 208a to 208j of the reference elements located respectively one whole increment and two whole increments to the right of the element selected on the tens dial 124a. Thus, if the table is shifted ten inches to the right of the final position, the relay PC is energized through the third tens switch 228a. Upon a shift twenty inches to the right of the final position, the relay is energized through the fourth switch 229a.

*Resetting Means for Identifying Mechanism*

As in the case of the counting mechanism 64, the identifying mechanism 65 is reset by the associated means 63 to a zero condition after one of the reference elements 56a to 56j has been selected as the "0" element and the carriage 58 is located in a zero position with respect to this element. Such resetting of the identifying mechanism involves changing the relative angular positions of the tens commutator brushes 212 and segments 131a to connect to the "0" contact 128a of the first tens switch 125a the one of the identifying circuits 208a to 208j which corresponds to the reference element selected as the "0" element. When this is done, the elements are identified in a numerical succession corresponding to the numbers selectable on the tens dial 124a and progressing to the right from the "0" element. The resetting of both the identifying and counting mechanisms makes it possible for any of the reference elements to be selected as the "0" element when such element is the one located within the carriage ranges n9 and n0 (FIG. 2) where the zero position of the carriage may be selected.

Relative angular adjustment of the tens commutator brushes 212 and segments 131a is effected herein by an electric motor 190a (FIGS. 35 and 40e) mounted on one of the tens commutator support plates 214 and driving the tens segment sleeve 143a through a pinion 191a which meshes with a gear 192a on the sleeve. The energizing circuit of the motor is completed through normally closed contacts PA–1 and the conductor 180 (FIG. 40e) of the tens conditioning relay PA in response to closure of the contacts FR–5 which also complete the circuits to the counter reset motors 190b to 190e.

The tens reset motor 190a is stopped in response to the combined opening of the tens conditioning contacts PA–1 and a switch C (FIGS. 35 and 40e) connected in parallel with the conditioning contacts. To energize the conditioning relay to open its contacts PA–1 when the segment 131a of the identifying circuit corresponding to the selected "0" reference element engages the "0" brush 212, the connection between the relay and tens wiper 126a is interrupted by opening of normally closed contacts R–7 (FIGS. 38, 39 and 40e) of the reference setup relay R (FIG. 40a) which is energized throughout the reference setup operations. Also, the conditioning relay PA is connected directly to the "0" tens contact 128a and thus the "0" brush 212 through conductors 232 and normally open contacts FR–3 (FIGS. 38, 39 and 40e) of the commutator motor starting relay FR (FIG. 40b). With this arrangement, the circuit through the tens wiper 126a and the conditioning relay PA interrupted at the reference relay contacts R–7 and the conditioning relay is energized only when the segment of the identifying circuit of the selected "0" reference element reaches and engages the "0" tens brush 212.

The switch C (FIGS. 35 and 40e) in parallel with the conditioning relay contacts PA–1 in the circuit for the tens reset motor 190a is provided to insure that the segment 131a corresponding to the selected "0" reference element is centered with respect to the "0" brush 212 when the motor is deenergized. For this purpose, the switch is actuated in accordance with the relative angular positions of the brushes and segments, the switch remaining closed as long as the centers of the segments are displaced angularly from the centers of the brushes but opening wherever the centers are coincident. Herein, the switch is of the self-contained type having a casing 233 (FIG. 35) secured to one of the supporting plates 214 and an actuator 234 engageable with the upper end of a vertical rod 235. The latter is mounted on the supporting plate for vertical reciprocation and, at its lower end, carries a ball 236 which is urged by a spring 237 against the periphery of the flange 142a on the segment supporting sleeve 143a. Conical recesses 238 (FIGS. 35 and 37) open outwardly from the flange and are alined radially with the centers of the respective segments. When the ball is seated in the bottom of any one of the recesses, the switch C is open and, when the ball is displaced angularly from the bottom of a recess, the rod 235 is cammed upwardly to engage the switch actuator pin and close the switch.

With the centering switch C and the tens conditioning contacts PA–1 connected in parallel in the circuit for the tens reset motor 190a, the latter remains energized until both the switch and the contacts are open simultaneously. The contacts open when the segment 131a for the selected "0" reference element first engages the "0" brush 212. At this time, however, the centering switch is closed because the segment is not centered with respect to the brush. The burden of deenergizing the motor then falls on the switch and the motor continues to run until the switch opens. This occurs when the ball 236 reaches the bottom of the recess 238 and the centers of the segment and the brush coincide.

Upon deenergization of the tens motor 190a, as previously mentioned relay RH (FIG. 40e) connected in parallel therewith also is deenergized for closure of its normally closed contacts RH–1 in series with the normally open contacts RF-2, RE-2, RC-2 and RA-2 of the relays RJ, RE, RC and RA for the reset motors 190b to 190e of the counting mechanism 64. As noted above, closure of all of these contacts completes a circuit between conductors 100 and 202 for the relay RF (FIG. 40d) whose energization provides a signal that resetting of the counting and identifying mechanisms is complete.

Operation

*Reference setup cycle.*—During the reference setup cycle, the carriage 58 is moved into a zero position with respect to one of the reference elements 56a to 56j in the right end portion of its normal range g (FIG. 2). Also, the element thus selected is established as the "0" element from which the measurements of the partial increment f and the whole increments e of the desired distance a are made to establish the base and table reference points b and c at their accurate spacing d equal to the desired distance a. Before this cycle is begun, the table 47 may occupy any position with respect to the base 46 so long as it is spaced from the left limit of its range of movement a distance at least as large as the desired distance a.

Prior to initiation of the reference setup cycle, let it be assumed that the workpiece W has been clamped to the table 47 after having been oriented with respect to the spindle 43 and that it is desired to move the table through the distance a of 39.892 inches. Further, let it be assumed that the line L1 (FIGS. 40a to 40e) and another line L2 (FIG. 40a) are connected to a suitable alternating current source (not shown), the conductors 92 and 94 (FIG. 40b) are connected to ground through suitable high and low voltage direct current sources (not shown) and that the supply conductor 165 (FIG. 40e) is connected to ground through a suitable alternating current source (not shown). At this time, all of the various control circuit elements are in their deenergized conditions shown in FIGS. 40a to 40f.

Power is made available to the supply conductor 100 (FIGS. 40a to 40d) in response to depression of a "start" button 239 (FIG. 40a). This completes a circuit through a normally closed "emergency stop" push-button switch 240 (FIG. 40a) to an emergency relay EM and the latter pulls in to close normally open contacts EM-1 in a holding circuit around the start button. Also, normally open contacts EM-2 close between the line L1 and the supply conductor 100. The relay is deenergized either by depressing the "emergency stop" button or by disconnecting the lines L1 and L2 from their source. When the conductor 100 is energized, the carriage stopping relay X (FIG. 40b) also is energized through the limit switches LS1 and LS2.

The reference setup cycle is started by depressing the "reference setup" button 61 (FIGS. 1 and 40a). This completes the circuit for the reference setup relay R (FIG. 40a) through normally closed contacts RF-4 of the setup complete relay RF (FIG. 40d). Upon energization of the setup relay, contacts R-1 thereof close in a holding circuit around the "reference setup" button and connect the supply conductor 109 (FIGS. 40a to 40d) to the conductor 100. The latter also is connected to another supply conductor 120 (FIGS. 40a and 40b) at contacts R-3, a conductor 116 (FIGS. 40a and 40b) at contacts R-4 (FIG. 40b), the conductor 106 at contacts R-5 (FIG. 40c) and the primary winding of the transformer 185 (FIG. 40d) at contacts R-6 (FIG. 40d). To disable the counting and identifying mechanisms 64 and 65, the contacts R-7 open between the tens wiper 126a and the tens conditioning relay PA (FIGS. 38 and 40e) and contacts R-8 open in the supply line 153 (FIG. 40f) for the commutator relays Es, Cs, Bs and As.

Upon energization of the conductor 120 at the contacts R-3, a circuit for the directional relay RL (FIG. 40a) is completed from the conductor and through the then closed contacts S-5 of the preset conditioning relay S and contacts XX-1 of the reversing relay XX. Directional relay contacts RL-1 then open to interrupt the circuit for the reversing relay A4 (FIG. 40a), contacts RL-4 open in parallel with the extreme right end limit switch LS1 in the circuit for the carriage stopping relay X (FIG. 40a), contacts RL-5 close in parallel with the left end limit switch LS2 and contacts RL-7 and RL-9 close in the circuits for the rapid traverse motor 59 (FIG. 40b) to condition the same for rightward carriage motion.

Energization of the reference setup relay R also is accompanied by completion of the circuit for a relay RT1 (FIG. 40a) at contacts R-2. This relay then pulls in to close its contacts RT1-1 for energization of the time delay relay RT1D (FIG. 40a). After an interval long enough to permit the directional relay RL to pull in, the time delay relay pulls in to close its contacts RT1D-1 in the circuit for the reversing relay A4 (FIG. 40a) and close contacts RT1D-2 to complete the circuit for the rapid traverse carriage motor relay M1 (FIG. 40b) through the then closed contacts J1-3, XX-3, RL-11, M2-1 and X-3. Also, the contacts RT1D-3 close in the circuits for the table feed motor 52 (FIG. 40c) and contacts RT1d-4 close in the plate circuit of the thyratron T1 (FIG. 40e).

When the motor relay M1 pulls in, the circuit for the rapid traverse motor 59 (FIG. 40b) is completed through the motor relay contacts M1-1 and M1-2 and contacts RL-7 and RL-9 of the then energized directional relay RL (FIG. 40a). At this time, the carriage 58 shifts to the right at its rapid traverse rate, the circuit for the brake winding 96 (FIG. 40b) being open at the contacts X-2.

The initial shift of the carriage 58 to the right continues until its reaches the right end of the normal carriage range g (FIG. 2) and the limit switch LS3 (FIG. 40a) is closed as shown in FIG. 4. During this shift, the rotary solenoid 104 (FIG. 40b) remains energized through the then closed feed relay contacts M2-6 and the conditioning relay contacts PA-9 so that the reference member 57 is held in its lower inactive position. Upon closure of the switch LS3, the reversing relay XX (FIG. 40a) is energized through the conductor 116 and its contacts XX-1 open for deenergization of the directional relay RL. Other reversing contacts XX-3 open to interrupt the circuit for the motor relay M1 and contacts XX-2 also close in a holding circuit around the limit switch LS3 (FIG. 40a). The carriage then stops and the circuit for the time delay relay RLT is completed by closure of the directional contacts RL-6 (FIG. 40a). After a short interval, the time delay relay pulls in to close its contacts RLT-1 (FIG. 40b) to energize the rapid traverse relay M-1 through the then closed contacts J1-3, RT1D-2, RL-12, M2-1 and X-3. When this motor relay pulls in, the motor 59 is energized through the then closed directional contacts RL-8 and RL-10 to shift the carriage to the left at the rapid traverse rate.

In the present instance, it has been assumed that, before that positioning operations, the table 47 is so located that the fourth reference element 56d is disposed adjacent the right end of the normal range g of carriage movement and the actuator 205B is depressed as shown in FIG. 15 to close the switch 204B at the same time that the switch LS3 is closed. The circuit for the relay A3 (FIG. 40c) thus is completed by closure of normally open contacts of the relay B2 (FIG. 40d) between the conductors 106 and 107. The contacts A3-4 then close in series with the limit switch LS3 for energization of the relay XA (FIG. 40a) and completion of the circuit for the relay A6 by the contacts XA-1 (FIG. 40a). The contacts A6-2 then open to disable the circuit through the reversing relay A4 and the contacts A6-1 close in series with the contacts A3-5 in the holding circuit for the relay A6.

The relay A6 (FIG. 40a) remains energized to disable the reversing relay A4 until the carriage 58 moves far enough to the left with respect to the fourth reference element 56d that the switch actuator 205B is out of engagement with the active cam plate 207. The identifying relay B2 then drops out and the relay A3 (FIG. 40c) is deenergized to open its contacts A3–5 in the holding circuit for the relay A6. The contacts A6–2 of the latter then open in the circuit for the reversing relay A4. With this arrangement, the reversing relay cannot be energized to stop the leftward movement of the carriage and select the fourth reference element 56d as the "0" element. The carriage then continues to the left toward the third element 56c at the rapid traverse rate.

When the carriage 58 reaches the third reference element 56c and the actuators 205c and 205d are depressed as shown in FIG. 14, the identifying relays C2 and D2 (FIG. 40d) are energized and their contacts close to complete parallel circuits for the relay A3 (FIG. 40c) between the conductors 106 and 107. This relay then pulls in and its contacts A3–3 close in series with the then closed contacts RT1D–1, RL–1 and A6–2 for energization of the reversing relay A4 (FIG. 40a) and closure of its contacts A4–3 in series with the normally closed contacts A3–2 in the circuit for the directional relay RL (FIG. 40a). The latter contacts A3–2 are of the slow-break or delayed opening type and open after the contacts A3–3 and A4–3 have closed. The directional relay RL thus is reenergized and its contacts RL–3 close in a holding circuit around the slow-break contacts A3–2 before the latter open. Other contacts RL–2 (FIG. 40a) close in series with reversing relay contacts A4–2 to energize the relay RT2. Also, contacts LR–12 (FIG. 40b) open for deenergization of the rapid traverse motor relay M1 and the motor 59. The carriage 58 then coasts a short distance and stops when the reference member 57 is to the left of the third element 56c as shown in FIG. 5. To maintain the relay A4 energized during such coasting, contacts A4–1 thereof close in a holding circuit around the contacts A3–3 (FIG. 40a).

Energization of the relay RT2 (FIG. 40a) is followed by closure of its contacts RT2–1 in the circuit of the time delay relay RT2D (FIG. 40a). After a short interval, the latter pulls in and its contacts RT2D–1 close in series with the then closed contacts FR–1, L–1, M1–3 and X–3 to energize the feed relay M2 (FIG. 40b). When this relay pulls in, the field 90 of the feed motor 60 and the clutch 89 are connected to the high voltage line 92 through contacts M2–4, the armature 93 is connected to the high voltage line through the motor relay contacts M2–4 and M2–2 and contacts K–2 of the then deenergized slow feed relay K, contacts M2–3 open in the dynamic braking shunt circuit, contacts M2–5 close in series with the then closed time delay contacts RT2D–1 to energize the slow feed time delay relay RT3D (FIG. 40b) and contacts M2–6 open in the circuit for the rotary solenoid 104. The reference member 57 thus is released to move to its upper active position and the carriage 58 moves to the right at its fast feed rate.

Movement of the carriage 58 to the right and toward the selected third reference element 56c at the fast feed rate continues until the time delay relay R3TD pulls in. Then the contacts RT3D–1 close in series with the contacts RT1D–1 for energization of the slow feed relay K (FIG. 40b). This results in opening of the contacts K–2 to interrupt the high voltage armature circuit, closure of the contacts K–1 to connect the armature 93 to the low voltage line 94, and closure of contacts K–3 in the circuit for the relay FR. The carriage then continues to travel to the right at the slow feed rate until the reference shoulder 101 (FIG. 10) engages the third reference element 56c and the last carriage switch ff is closed to energize the relay FF (FIG. 40d). When this relay pulls in, the contacts FF–2 close in series with the then closed contacts K–3, RT3D–1, and RT2D–1 to energize the relay FR (FIG. 40b). The contacts FR–1 then open to interrupt the circuit for the feed motor relay M2 and the latter drops out to stop the carriage in its zero position with respect to the third reference element 56c as shown in FIG. 6.

In the event that no reference element such as the fourth element 56d in this instance is adjacent the right end of the normal carriage range g as shown in FIG. 4 so that the switch LS3 and the relay A3 are energized simultaneously, the relays A6 and XA (FIG. 40a) remain deenergized during movement of the carriage 58 to select a reference element. The circuit for the reversing relay A4 then is completed the first time the switch actuators 205A to 205D engage the cam plates 207 of a reference element and, thus, the first time the relay A3 is energized during movement of the carriage to the left away from the right end of its normal range. Once the reversing relay A4 is energized, the operation in stopping the leftward movement of the carriage and shifting the same to the right and into its zero position is the same as that just described.

The relay FR (FIG. 40b), in addition to stopping the carriage 58 in its zero position with respect to the selected third reference element 56c, is utilized to initiate operation of the resetting means 62 and 63 for orienting the counting and identifying mechanisms 64 and 65 with respect to this element and thereby establishing the same as the "0" element. Thus, upon energization of the relay, contacts FR–3 thereof close as shown in FIG. 38 to connect the tens conditioning relay PA (FIGS. 38 and 40e) to the "0" tens brush 212, contacts FR–4 (FIG. 40e) close to connect the plates of the thyratrons Tb to Te to the supply conductor 165 and contacts FR–5 close to connect the energized supply conductor 120 to the tens reset motor 190a through the conductor 192 and to the other reset motors 190b to 190e through the conductors 192 and 193 (FIG. 40e). The energizing circuit for the relay FR is maintained through its own holding contacts FR–2 (FIG. 40b).

After the relay FR has pulled in, each of the counting mechanism reset motors 190b to 190e is energized to rotate the segments of the associated one of the commutators 129b to 129e and continues to run until both the "9" and "0" segments contact the commutator brush. When this occurs, the two grids of the corresponding thyratron are grounded through the brush and the tube fires. The associated one of the relays RJ, RE, RC and RA then pulls in to interrupt the circuit to the motor and stop the segments. As shown in FIG. 40e, the brushes 130b to 130e of the various commutators may occupy different angular positions so that the segments 131b to 131e may rotate different amounts to bring the pairs of "9" and "0" segments into contact with their respective brushes.

The reset motor 190a for the identifying mechanism 65 similarly is energized to rotate the segments 131a relative to the tens commutator brushes 212 when the relay FR is energized. Such energization continues until both the tens conditioning relay contacts PA–1 and the centering switch C (FIGS. 35 and 40e) are open simultaneously in the motor circuit. Although the centering switch opens each time the segments are centered on the brushes during rotation of the segments, the relay PA remains deenergized until the segment connected to the identifying circuit 208c of the selected third reference element 56c contacts the brush which is connected to the "0" contact 128a of the tens selector switch 125a as shown in FIG. 38. Since this is the only one of the ten identifying circuits 208a to 208j which is completed, the centering switch C and the conditioning contacts PA–1 open simultaneously to deenergize the reset motor 190a only when the segment of the third element 56c engages the "0" tens brush 212. The third element thus is established as the "0" element in the numerical succession of elements.

When all of the reset motors 190a to 190e have stopped, the conductor 202 (FIGS. 40d and 40e) is connected to the energized supply conductor 100 through the then closed contacts RH–1, RJ–2, RE–2, RC–2 and RA–2 (FIG. 40e) to energize the setup complete relay RF (FIG. 40a). This relay then pulls in and its contacts RF–5 (FIG. 40d) close in parallel with the setup relay contacts R–6 in the energizing circuit for the primary of the transformer 185, holding contacts RF–1 (FIG. 40d) close in series with a "reference release" button 241 in a self-maintaining circuit around the contacts of the various setup motor relays between the conductors 100 and 202, contacts RF–2 (FIG. 40c) close in series with normally open contacts L–2 of the then deenergized carriage stopping relay L and normally closed contacts FG–2 of the table stopping relay in the circuit for a preset complete relay RR (FIG. 40d), and contacts RF–3 close in series with the "preset" button 67 (FIG. 40a) in the circuit for the preset conditioning relay S. Closure of the contacts RF–3 also completes a circuit through a "setup complete" signal lamp 242.

To deenergize the relays which were active during the reference setup cycle, the setup complete contacts RF–4 open for deenergization of the reference setup relay R (FIG. 40a). When this relay drops out, the carriage 58 is in its zero position with respect to the selected third reference element 56c, the counting and identifying mechanisms 64 and 65 are oriented with respect to this element and thereby establish the same as the "0" element, and the control circuits are prepared for the preset cycle.

Once energized, the setup complete relay RF (FIG. 40d) remains energized either until the supply conductor 100 is deenergized or until the "reference release" button 241 (FIG. 40d) is depressed to open the maintaining circuit for the relay. The purpose of this button is to enable the relay to be deenergized and the reference setup elements to be conditioned thereby for another reference setup cycle in the event that the table has been moved either into its final desired position or into any other position after a setup cycle has been completed. To recondition the control circuits for initiating the preset cycle in the event that the setup complete relay is deenergized after a reference setup cycle has been completed but before the table is moved, a "reference pickup" push button switch 243 (FIG. 40d) is connected in a shunt circuit around the "reference release" button 241 and the maintaining contacts RF–1.

It will be apparent from the foregoing that, regardless of the initial position of the table 47, a reference element within approximately one whole increment of the right end of the normal carriage range $g$ may be established as the "0" element. This enables the range to be equal to slightly more than two whole increments and is made possible by moving the carriage first to the right end of the range and then picking out the first element to the left. The carriage is permitted to make such movement while avoiding contact of the reference member 57 with any element other than the selected one because of the movement of the member between its active and inactive positions. Establishment of the selected element as the "0" element is facilitated by resetting the identifying mechanism 64 so that the partial increment $f$ is measured directly from the selected element and by resetting the identifying mechanism 65 so as to identify the elements in their numerical succession starting with the selected element as zero.

*Preset cycle.*—When the reference setup relay R (FIG. 40a) dropped out at the end of the setup cycle, contacts R–7 thereof (FIGS. 38, 39 and 40e) closed to connect the tens conditioning relay PA to the tens wiper 126a as shown in FIG. 39 so that this relay is controlled subsequently in accordance with the setting on the tens dial 124a. Also, setup relay contacts R–8 closed in the energizing circuits for the commutator relays Es, Cs, Bs and As to enable the carriage motors 59 and 60 (FIG. 40b) to be controlled in accordance with the setting of the partial increment number on the units, tenths, hundredths and thousandths dials 124b to 124e.

Drop-out of the reference setup relay R also resulted in opening of its contacts R–1 (FIG. 40a) which connect the supply conductor 109 (FIGS. 40a and 40d) for the latch relays PB1 and PB2 (FIG. 40d) to the energized conductor 100. Thus, the last one of these latch relays which was pulled in when the setup relay dropped out remains pulled in and the other latch relay remains dropped out throughout the preset cycle. In this instance, where the fourth reference element 56d was disposed initially so close to the right end of the normal carriage range $g$ that the reversing relay A4 (FIG. 40a) was disabled until the identifying switch actuators 205A to 205D moved to the left beyond the cam plates 207 of this element, the zero position of the carriage 58 is located slightly more than 10 inches from the right end of the carriage range, that is, outside of the first partial range $n9$ and within the second partial range $n0$ (FIG. 2). The second range relay N0 then was energized at the end of the setup cycle so that the first latch relay PB1 (FIG. 40d) remains pulled in and the second relay PB2 remains dropped out throughout the preset cycle.

The number corresponding to the desired distance $a$ of table movement may be set on the dials 124a to 124e at any time before initiation of the preset cycle. In the present example where this distance is 39.892 inches then, the tens pointer 126a is set at 3, the units pointer 126b is set at 9, the tenths pointer 126c is set at 8, the hundredths pointer 126d is set at 9 and the thousandths pointer 126e is set at 2 all as shown in FIG. 40f.

When a 9 is selected on the units dial 124b as shown in FIG. 40f, the units wiper 126b engages the "9" contact 128b of the units selector switch 125b, the contact arm 161b of the units lockout switch 156b engages the "8" contact 162b, and the arm 175b of the disabling switch 174b engages the "9" contact 176b. Since the units brush 130b is contacting its "9" segment 131b in the zero position of the carriage 58, the units relay Es is energized as soon as the selection is made after the reference setup relay R drops out. The disabling switch 174b is open between the conductors 141 and 144 (FIGS. 34 and 40c to 40f) in the circuit for the stopping relays J and J1 (FIGS. 34 and 40b). The burden of conditioning this circuit for completion upon energization of the signal relay G1 during leftward movement of the carriage then falls on the first latch relay PB1 (FIG. 40d) and the third range relay N1 (FIG. 40e).

The selection of an 8 on the tenths dial 124c results in engagement of the arm 157c with the "8" contact 158c of the tenths condition switch 155c (FIG. 40f) and closure of this switch in series with the units lockout switch 156b in the circuit for the units lockout relay E1s. Thus, whenever the units brush 130b engages the "8" segment 131b selected on the units lockout switch, the units lockout relay is energized. The tenths relay Cs is deenergized in the zero position of the carriage because the tenths brush 130c is out of contact with the "8" segment 131c selected on the tenths dial 124c.

Although the hundredths brush 130d is contacting the "9" segment 131d selected on the hundredths dial 124d in the zero position of the carriage, the circuit for hundredths relay Bs remains open at the relay contacts Cs–1 because the tenths relay Cs is deenergized. Also, the stopping relay contacts J–3 (FIG. 40f) then are open in the hundredths relay circuit. Because of the selection of a 9 on the hundredths dial, the circuit for the tenths lockout relay Cls (FIG. 40f) remains open at the hundredths conditioning switch 155d throughout the preset cycle. The circuit for the hundredths lockout relay Bls, however, is completed through the hundredths lockout switch 156d and the thousands conditioning switch 155e whenever the stopping relay contacts J–3 (FIG. 40f) are closed and the hundreds brush 130d engages the "0" segment 131b which has been selected on the hundredths lockout switch, the thousandths conditioning switch 155e being closed in response to selection of a 2 on the thousands dial 124e.

The preset cycle is initiated by manual depression of the "preset button" 67 (FIG. 40a). This completes the circuit to the present relay S through the then closed contacts RF-3 of the setup complete relay RF (FIG. 40c). When the preset relay pulls in, its contacts S-1 (FIG. 40a) close in series with normally closed contacts RR-3 of the preset complete relay RR (FIG. 40c) in a holding circuit around the "preset" button. Also, contacts S-3 (FIG. 40a) close for energization of the conductor 120 (FIGS. 40a and 40b) in the circuits for the relays controlling the carriage feed motor 60. The circuit for the directional relay RL is completed through the contacts S-3 and S-4 and then closed contacts FP-3 (FIG. 40a) of the rightward motion stopping relay FP (FIG. 40e). Other contacts S-5 (FIG. 40a) open to disable the relays A3 and A4, contacts S-6 (FIG. 40a) close to energize a supply conductor 116 (FIGS. 40a and 40b), contacts S-7 (FIG. 40b) close in a circuit for the carriage rapid traverse motor relay M-1, and contacts S-8 (FIG. 40d) open in one circuit for the signal relay G.

To condition the thyratron T1 for firing to energize the relay FP and stop the initial rightward carriage motion, preset relay contacts S-9 (FIG. 40e) close to connect the plate of the tube to the supply conductor 165 and contacts S-10 and S-11 close to connect the grids of the tube respectively through the conductors 171 and 179 to the "9" slip ring 146b of the units commutator 129b and through the conductor 173 to the "7" slip ring 146c of the tenths commutator 129c.

Upon closure of normal open contacts S-2 of the preset relay S (FIG. 40a), the relay RT1 pulls in to close its contacts RT1-1 for energizing the time delay relay RT1D. The latter pulls in after a short interval to close its contacts RT1D-2 (FIG. 40b) and energize the rapid traverse relay M1 through the energized conductor 120 and then closed contacts J1-3, S-7, RL-11, M2-1 and X-3. Also, contacts RT1D-4 (FIG. 40e) close to connect the cathode of the thyratron T1 to ground through the then closed first latch relay contacts PB1-2 and third range relay contacts N-1, the zero position of the carriage being in the second range n0. When the rapid traverse relay pulls in, the rapid traverse motor 59 is energized through the then closed directional contacts RL-7 and RL-9 and the carriage 58 is shifted to the right at its rapid traverse rate.

The initial rightward shift of the carriage 58 continues for slightly less than .2 of an inch until the units and tenths brushes 130b and 130c engage their respective "9" and "7" segments 131b and 131c simultaneously as shown in FIG. 29. Such engagement results in grounding of both grids of the thyratron T1 and the latter fires for energization of the stopping relay FP (FIG. 40b). When this occurs, contacts FP-1 close in a holding circuit around the tube and through the preset contacts S-9. Contacts FP-2 (FIGS. 34 and 40b) close in series with the signal contacts G1-1 (FIGS. 34 and 40d) in the circuit for the stopping relays J and J1 (FIGS. 34 and 40b), and contacts FP-3 (FIG. 40a) open for deenergization of the directional relay RL.

Energization of the relay RL results in opening of its contacts RL-11 (FIG. 40b) for deenergization of the rapid traverse motor M1 and interruption of the circuits for the motor 59. The carriage 58 thus is stopped with the tenths brush 130c spaced from its "0" segment 131c as shown in full in FIG. 29. Also, contacts RL-6 close to energize the time delay relay RLT (FIG. 40a) which, after a short interval, closes its contacts RLT-1 to energize the rapid traverse relay M1 through the then closed contacts J1-3, RT1D-2, RC-12, M2-1 and X-3 (FIG. 40b). The rapid traverse motor 59 then is energized through directional contacts RL-8 and RL-10 for shifting the carriage to the left through its zero position at the rapid traverse rate.

During the initial rightward shift of the carriage 58 away from its zero position, the units and tenths brushes 130b and 130c engage their selected "9" and "8" segments 131b and 131c as shown in FIG. 29 and the units and tenths relays Es and Cs are energized simultaneously for energization of the signal relay G1 (FIGS. 34 and 40d). Such engagement and energization also occur during the leftward shift of the carriage through the zero position. Closure of the signal contacts G1-1 (FIGS. 34 and 40d) has no effect at this time, however, because the disabling switch 174b is open and neither of the shunt circuits is closed around this switch between the conductors 141 and 144.

One shunt circuit extending between the conductors 141 and 144 and through the second latch relay contacts PB2-1 (FIG. 40d) remains open throughout the preset cycle as described above. The other shunt circuit through the now closed first latch contacts PB1-1 is completed only when the carriage shifts to the left and into the third range n1 for energization of the relay N1 (FIG. 40e) and closure of its contacts N1-1 (FIG. 40d). By the time the carriage enters the third range n1 (FIG. 2), it will be approximately three inches to the left of the zero position adjacent the third reference element 56c and the units brush will have moved clockwise and out of engagement with the selected "9" units segment 131b.

As the carriage 58 continues to shift to the left in the third range n1, the units brush moves clockwise and into contact with the "8" units segment 131b which precedes the "9" segment selected on the units dial 124b. This completes the circuit for the units lockout relay Els through the units lockout switch 156b and the tenths conditioning switch 155c (FIG. 40f) until the units brush leaves the "8" segment. When this occurs, the tenths brush 130c will have completed eight revolutions and the units brush 130b will be contacting its selected "9" segment so that the units relays Es is energized. The leftward carriage movement then continues until the tenths brush contacts its "8" segment selected on the tenths dial 124c for energization of the tenths relay Cs through the now closed units relay contacts Es-1. Simultaneous energization of the units and tenths relays is accompanied by energization of the associated relays E and C (FIG. 40d) and reenergization of the signal relay G1. This time, closure of the contacts G1-1 thereof (FIGS. 34 and 40d) is effective to complete the circuit for the stopping relays J and J1 (FIG. 40b).

Upon energization of the relay J, its contacts J-1 close for energization of the relay J1 (FIG. 40b) and the latter pulls in to close its contact J1-1 in a common holding circuit for the two relays. Other contacts J-2 (FIG. 40d) close in series with contacts C-1 to condition the circuit of the rightward signal relay G for closure in the final carriage position and contacts J-3 (FIG. 40f) close in series with the hundredths commutator and lockout relays Bs and Bls. When the other stopping relay J1 pulls in, its contacts J1-2 (FIG. 40b) close to complete a circuit for the slow feed relay K and to condition the circuit of the stopping relay L for completion at the rightward signal relay contacts G-2. Also, contacts J1-3 open to interrupt the circuit for the rapid traverse relay M1 (FIG. 40b) and deenergize the rapid traverse motor 59. The carriage then coasts to the left beyond the final position indicated by a line h in FIG. 7 and to a stopping position indicated by a line i spaced to the left of the final position approximately .1 of an inch.

Energization of the stopping relay J1 (FIG. 40b) also results in closure of its contacts J1-5 (FIG. 40a) to complete an energizing circuit through the directional relay RL and closure of contacts J1-4 to energize the relay RT2 (FIG. 40a). When the latter pulls in, its contacts RT2-1 complete the circuit for the time delay relay RT2D and the latter closes its contacts RT2D-1 to energize the feed motor relay M2 (FIG. 40b) through the then closed contacts FR-1, L-1, M1-3 and X-3. Also, contacts RT2D-2 close in a circuit for the rapid traverse table motor relay TRB (FIG. 40c).

When the feed motor relay M2 pulls in (FIG. 40b), the clutch 89 and the field 90 of the motor 60 are connected by the contacts M2-4 between the grounded conductor 91 and the high voltage direct current line 92. The motor armature 93 is connected between the grounded conductor 91 and the low voltage line 94 through motor relay contacts M2-2 and M2-4 and contacts K-1 of the slow feed relay K whose circuit has been completed at the stopping relay contacts J1-2. The feed motor thus is energized to shift the carriage to the right and into its final position at the slow feed rate. Although the motor relay contacts M2-5 close to energize the time delay relay RT3D, such energization and the subsequent pull in of this relay have no effect at this time because the circuit for the slow feed relay K has already been completed through the contacts J1-2.

The circuit for the rotary solenoid 104 (FIG. 40b) also is interrupted at the contacts M2-6 so that the reference member 57 moves to its upper active position. This movement also is ineffectual during the final carriage motion because such motion is stopped under the control of the counting mechanism rather than the carriage switches PS or ff.

During the final rightward carriage shift from the position indicated by the line i approximately .1 of an inch to the left of the final position line h as shown in FIG. 7, the commutator brushes 130b to 130e revolve in a counterclockwise or number decreasing direction as viewed in FIG. 40e. Although the tenths brush 130c may have shifted beyond its selected "8" segment 131c as shown in full in FIG. 31 during the leftward coasting of the carriage 58 beyond the final position, there is no problem of premature energization of the tenths brush with the selected segment during the final rightward shift because the "9" segment 131d was selected on the hundredths commutator 129d. The hundredths conditioning switch 155d then remains open and the tenths lockout relay C1s remains deenergized during the final carriage shift. Thus, with the units commutator relay Es energized at the end of the leftward carriage shift and the tenths lockout relay C1s deenergized, the tenths relay Cs will be energized to close its contacts Cs-1 in the hundredths relay circuit as soon as the tenths brush 130c engages the selected "8" segment 131c in the final carriage shift as shown in phantom in FIG. 31. Also, contacts Cs-2 (FIG. 40d) close to energize the relay c and the latter pulls in to close its contacts C-4 in series with the contacts J-2 in the circuit for the signal relay G.

Due to the selection of a 2 on the thousandths dial 124e and the resulting closure of the thousandths conditioning switch 155e (FIGS. 32 and 40f), the hundredths lockout relay Bls (FIG. 40f) is energized to disable the hundredths relay Bs while the hundredths brush 130d engages the "0" hundredths segment 131d as shown in full in FIG. 32 after the contacts J-3 and Cs-1 close. This segment is the one selected on the hundredths lockout switch 156d as preceding the "9" segment selected on the dial switch 125d when the brushes are revolving in their number decreasing direction. As the hundredths brush leaves the preceding "0" segment 131d, the hundredths lockout relay is deenergized to close its contacts Cls-1. At this same time, the brush is engaging the selected "9" segment as shown in phantom in FIG. 32 to complete the circuit for the hundredths relay Bs for closure of its contacts Bs-1 (FIG. 40f) in the thousandths relay circuit and Bs-2 (FIG. 40d) in the circuit for the relay B. The latter then pulls in to close its contacts B-1 in series with the contacts C-1 and J-2 in the signal relay circuit.

After the contacts C-1, J-2 and B-1 (FIG. 40d) are closed, the circuit for the signal relay G is completed through the contacts As-1 when the thousandths relay As is energized upon engagement of the thousandths brush 130e with the "2" thousandths segment 131e selected on the thousandths dial 124e. At this time, the various commutator brushes 130b to 130e are in their positions corresponding to the partial increment number selected on the associated dials 124b to 124e and the carriage 58 is in its final position spaced accurately to the left of its zero position a distance equal to the partial increment f of the desired distance a.

To stop the carriage in its final position, contacts G-2 close in series with then closed contacts J1-2 to complete the circuit for the stopping relay L (FIG. 40b) and the latter pulls in to open its contacts L-1 and interrupt the circuit for the feed relay M-2. When this relay drops out, the feed motor is deenergized and its dynamic braking circuit through the contacts M2-3 is completed for stopping the motor shaft and the carriage quickly. Other contacts L-2 (FIG. 40c) of the stopping relay L close to energize the preset complete relay RR through then closed contacts RF-2 of the setup complete relay RF (FIG. 40d) and contacts FG-2 of the then deenergized table stopping relay FG (FIG. 40d).

Pull-in of the preset complete relay RR (FIG. 40c) results in closure of its contacts RR-1 in a holding circuit around the stopping relay contacts L-2. Also, contacts RR-2 close to condition the circuit of the table conditioning relay PT for completion by the "table motion" button 68 (FIG. 40c) and to complete a circuit through a preset complete signal lamp 244 (FIG. 40c). Other contacts RR-3 (FIG. 40a) open in the holding circuit for the preset relay S and the latter drops out to restore its contacts to their original conditions thereby deenergizing the conductors 116 and 120 and interrupting the circuits for various relays including the commutator relays Es, Cs, Bs and As which controlled the carriage movements during the preset cycle. With both the setup complete relay RF (FIG. 40d) and the preset complete relay RR (FIG. 40c) energized, the apparatus is prepared for initiating the cycle in which the table 47 is moved into its final desired position.

In the event that the machine operator has made an erroneous selection on the partial increment dials 124b to 124e and desires to move the carriage 58 to a different final position with respect to the "0" reference element 56c, the supply conductor 100 and thus the setup complete and preset complete relays RF and RR first are deenergized either by depressing the "emergency stop" button 240 (FIG. 40a) or by disconnecting the lines L1 and L2 from their source. Then, after power is restored to the conductor 100, the "reference pickup" button 243 (FIG. 40d) is depressed and the setup complete relay RF pulls in to condition the circuits for a new preset cycle. After the number corresponding to the new final position of the carriage has been selected on the dials, the new preset cycle is initiated by depressing the "preset" button 67 (FIG. 40a). During the new cycle, the operation is the same as before except that, instead of starting from the zero position with respect to the "0" reference element 56c, the carriage 58 starts from a position located in the third partial range n1 and spaced 9.892 inches to the left of the zero position. As before, depression of the "preset" button 67 is followed by establishment of the circuits for shifting the carriage at its rapid traverse rate to the right. This motion continues until the stopping relay FP (FIG. 40e) is energized by firing of the thyratron tube T1 when the units and tenths brushes 130b and 130c engage their respective "9" and "7" segments 131b and 131c simultaneously as shown in full in FIG. 29. Although the brushes engage these segments at the same time when the carriage has just started its rightward shift and is still 9.7 inches to the left of the zero position, the circuit connecting the cathode of the thyratron to ground 166 (FIG. 40e) is open until the carriage shifts out of the third range n1. Thus, the tube does not fire until the carriage reaches the position approximately .2 of an inch to the right of the zero position. Once the tube fires and the stopping relay FP pulls in, the carriage follows the same motions in moving to the new final position selected on the dials that it followed in reaching the first final position. At the end of the new preset cycle, the preset complete relay RR again pulls in and the circuits are again ready for the table motion cycle.

Should the setup complete and preset complete relays RF and RR be deenergized for any reason such as disconnection of the supply lines L1 and L2 from their source, these relays must be reenergized before the table motion cycle may be initiated. In the case of the setup complete relay RF, this is accomplished by depressing the "reference pickup" button 243 (FIG. 40d) after power is available at the conductor 100. To reenergize the preset complete relay RR, a "preset repeat" button 245 (FIGS. 1 and 40c) is depressed to complete a circuit for the relay extending between the line L1 and the conductor 100 and around the holding contacts RR-1 and the then closed contacts RF-2 and FG-2 (FIG. 40c). Once both relays have pulled in and as long as the carriage 58 has not been moved, the circuits are conditioned again to move the table 47 to its final desired position in response to depression of the "table motion" button 68. Such movement may be effected as long as the table is to the right of its final position and even though the table has been moved. This is because, once the reference setup and preset cycles have been completed and until the settings on the dials or the position of the carriage is changed, the base reference point b remains fixed and the table reference point c remains established on the reference element selected on the tens dial 124a.

Due to the use of only the higher order units and tenths digits of the partial increment number to condition the counting mechanism 64 for stopping the leftward motion of the carriage 58 past its final position, this movement may be made at a rapid traverse rate thereby shortening the preset cycle. Such use of a part of the partial increment number to sense the approximate location of the final position even where the partial increment f is less than .1 of an inch is made possible by the initial shift of the carriage to the right of the zero position far enough to insure that the tenths brush 130c is out of contact with its then selected "0" segment 131c. By virtue of the novel manner of dividing the normal carriage range g into the partial ranges n9, n0 and n1 and of preventing energization of the leftward motion stopping relays J and J1 until the carriage is in another partial range to the left of that where the zero carriage position is located, premature stopping of the carriage due to overlap of the units and tenths brushes 130b and 130c is avoided where the partial increment f is at least 9 inches and the units brush 130b engages its selected "9" segment 131b before the carriage has moved to the left beyond the zero position. Accuracy is insured further by shifting the carriage into both of its zero and final positions in the same direction so as to avoid errors which may otherwise arise due to backlash in the carriage drive connections.

*Table motion cycle.*—In this cycle, the table 47 is moved automatically into its final position where the table reference point c coincides with the base reference point b on the carriage 58. The table reference point was established previously on the sixth reference element 56f by the selection of three whole increments e on the tens dial 124a as shown in FIG. 40f. Such selection resulted in extension of the circuit for the tens conditioning relay PA (FIGS. 39 and 40e) through the identifying circuit 208f for the sixth reference element which is the third element in the numerical succession of elements and is spaced three whole increments to the right of the "0" element 56c.

The table motion cycle is initiated by depression of the "table motion" button 68 (FIG. 40c) which completes a circuit for the table conditioning relay PT (FIG. 40c) through the then closed preset complete contacts RR-2 and contacts PC-1. Pull-in of the conditioning relay is accompanied by closure of holding contacts PT-1 in parallel with the "table motion" button and closure of contacts PT-2 to energize the conductor 106 (FIGS. 40c and 40d) in the circuit for the relay A3 (FIG. 40c) which indicates the presence of the reference elements 56a to 56j adjacent the carriage. Other contacts PT-3 (FIG. 40a) complete an energizing circuit for the relay RT1-1 for energization of the time delay relay RT1D (FIG. 40a). After a short interval, the latter pulls in to close its contacts RT1D-3 and energize the fast feed relay FAF (FIG. 40c) through the closed contacts PA-3 and TRA-2. Although other contacts RT1D-1 and RT1D-2 also close, these contacts are located in the carriage control circuits and are ineffectual at this time because the associated supply conductor 120 remains deenergized throughout the table motion cycle.

When the fast feed relay FAF (FIG. 40c) pulls in, the contacts FAF-1 close to complete a circuit to the controller 218 for energizing the table feed motor 52 to shift the table 47 to the left at its fast feed rate. Such motion continues until the "0" reference element 56c reaches the carriage 58 and the cam plates 207 thereof engage the switch actuators 205C and 205D as shown in FIG. 14 and close the switches 204C and 204D (FIG. 40d) to energize the identifying relays C2 and D2. When these relays pull in, the relay A3 (FIG. 40c) is energized to close its contacts A3-1 in the circuit for the rapid traverse relay TRA. Since the "0" element is neither the sixth element 56f selected on the tens dial 124a nor the preceding fifth element 56e, the corresponding fifth and sixth identifying circuits 208e and 208f remain open and the relays PB and PA (FIG. 40e) which are connected to these circuits through the tens switches 220a and 125a (FIG. 40f) remain deenergized. The contacts PBA-2 (FIG. 40c) in the circuit for the rapid traverse relay TRA thus remain closed so that the circuit is completed when the relay A3 is energized.

Pull-in of the rapid traverse relay TRA (FIG. 40c) is followed by closure of holding contacts TRA-1 through the contacts PBA-2 and around the contacts A3-1, interruption of the circuit for the fast feed relay FAF at contacts TRA-2, and completion of the circuit for the relay RT2 (FIG. 40a) by contacts TRA-2. The feed motor 52 then is deenergized and the circuit for the time delay relay RT2D (FIG. 40a) is completed at contacts RT2-1. After a short interval, the time delay relay pulls in to close its contacts RT2D2 (FIG. 40c) in the circuit for the rapid traverse motor relay TRB and the latter closes its contacts TRB-1 thereby energizing the rapid traverse motor 53 for increasing the table speed to the rapid traverse rate.

The table 47 travels to the left at the rapid traverse rate for two whole increments e during which the fourth reference element 56d passes the carriage 58. This motion continues until the cam plates 207 of the fifth element 56e depress the actuators 205B and 205D as shown in FIG. 16 to close the switches 204B and 204D (FIG. 40c) and energize the identifying relays B2 and D2. Although the relay B2 and the relay A3 were energized when the cam plates of the fourth element 56d moved across the switch actuators, energization of these relays had no effect, the fourth identifying circuit 208d being open in series with both the tens selector switch 125a and the second tens switch 220a (FIG. 40f). Energization of the relays B2 and D2 when the fifth reference element 56e reaches the carriage results in completion of the fifth identifying circuit 208e (FIG. 40e) and energization of the relay PB through the second tens switch 220a. The tens conditioning relay PA remains deenergized at this time because the sixth identifying circuit 208f is open at normally open contacts of the now deenergized third identifying relay C2 and normally closed contacts of the now energized fourth relay D2 (FIGS. 39 and 40e).

When the relay PB (FIG. 40e) pulls in, its contacts PB–1 (FIG. 40c) close in the circuit for the relay PBA and the latter is energized to complete its holding circuit at contacts PBA–1 and to interrupt the circuit for the rapid traverse relay TRA at the contacts PBA–2. The latter relay and the motor relay TRB then drop out for deenergization of the rapid traverse motor 53 and reenergization of the fast feed relay FAF at contacts TRA–2. The feed motor 52 thus is reenergized and the table continues its movement through the last whole increment e at the fast feed rate.

As the sixth reference element 56f selected on the tens dial 124a approaches close enough to the carriage 58 that the cam plates 207 engage the second and third switch actuators 205B and 205C as shown in FIG. 17, at the corresponding identifying relays B2 and C2 (FIG. 40d) are energized to complete the sixth identifying circuit 208f for energization of the tens conditioning relay PA (FIGS. 39 and 40e). When the relay pulls in its contacts PA–2 (FIG. 40c) close to complete the circuit for the feed timer relay FT and to condition the circuit through the extra slow feed relay XSF for completion by closure of the now open carriage switch PS (FIGS. 10 and 40c). Other contacts PA–3 (FIG. 40c) open in parallel with normally closed feed timer contacts FT–2 in the circuit for the fast feed relay FAF and contacts PA–4 (FIG. 40b) open so that the rotary solenoid 104 is deenergized and the reference member 57 shifts into its upper active position.

After the conditioning relay PA (FIG. 40e) pulls in, the table 47 continues to advance to the left at the fast feed rate for a short interval until the feed timer relay FT (FIG. 40c) pulls in. This results in interruption of the circuit for the fast feed relay FAF at the contacts FT–2 and completion of the circuit for the slow feed relay SF at the contacts FT–1. The table speed thus is reduced from fast feed to slow feed where it continues until the sixth reference element 56c engages the shoulder 101 on the reference member 57 (FIG. 10) and the latter is shifted thereby to close the first carriage switch PS (FIGS. 10 and 40c).

Closure of the carriage switch PS completes the circuit through now closed contacts PA–2 for the extra slow feed relay XSF (FIG. 40c) and the latter pulls in to close its contacts XSF–1 in the circuit for the controller 218. The table speed thus is reduced still further to the extra slow rate where it remains until the final carriage switch ff (FIG. 40d) is closed. This occurs after movement of the table through approximately .008 of an inch at the extra slow feed rate and results in energization of the relay FF. The latter than closes its contacts FF–1 (FIG. 40d) in series with the table stopping relay FG which pulls in to open its contacts FG–1 and FG–2 (FIG. 40c) for deenergization of table conditioning relay PT and the preset complete relay RR. These relays then drop out and their contacts PT–1 and PR–2 open to disconnect the slow and extra slow feed relays SF and XSF (FIG. 40c) from the supply conductor 100. This results in deenergization of the table feed motor 52 and the table 47 stops in its final desired position.

Energization of the stopping relay FG (FIG. 40d) also results in closure of its contacts FG–3 (FIG. 40b) to energize a table motion complete relay FL1 having contacts PL1–1 which close to energize a table motion complete signal lamp 246 (FIG. 40b). The armature 247 of this relay normally is held in a pulled in position by a latch 248 which is shifted to an unlatching position by energization of an unlatching coil PL2. The latter is energized to release the armature 247 for opening of the contacts PL1–1 and deenergization of the lamp 246 whenever the reference setup cycle or the preset cycle is started. For this purpose, one energizing circuit for the unlatching coil extends through normally open contacts R–4 (FIG. 40b) of the reference setup relay R (FIG. 40a) and another circuit extends through the conductor 116. (FIGS. 40a and 40b) and normally open contacts S–6 (FIG. 40a) of the preset relay S.

After the reference setup and preset cycles have been completed, but before the table motion cycle has been started, the table 47 may be moved under the control of the manual push buttons 54 (FIG. 1). If such movement is to the right of the initial table position, the table motion cycle will be initiated by depression of the button 68 therefor and the table will be shifted into its final position as described above.

If the table 47 has been shifted to the left of the final position less than 10 inches so that the first reference element to the right of the carriage 58 is the seventh element 56g, depression of the "table motion" button will result in completion of the circuits for energizing the feed motor 52 to shift the table to the left at the fast feed rate. Such motion continues until the cam plates 207 of the seventh reference element engage the switch actuators 205B, 205C and 205D as shown in FIG. 18 for energization of the corresponding identifying relays B2, C2 and D2 and completion of the seventh identifying circuit 208g. This circuit is connected to the relay PC (FIG. 40e) through the third tens switch 228a (FIG. 40f) so that the relay is energized to open its contacts PC–1 in the holding circuit for the table conditioning relay PT. The latter then drops out and the table is stopped due to interruption of its motor control circuits. Since such stopping was not effected in response to energization of the stopping relay FG, the table motion complete lamp 246 remains deenergized to indicate to the operator that the table has stopped beyond rather than at the final desired position.

In the event that the table has been moved to the left of the final position more than 10 inches but less than 20 inches, depression of the "table motion" button 68 will result in shifting of the table to the left at the fast feed rate until the cam plates 207 of the eighth reference element 56h engage the switch actuator 205A as shown in FIG. 19 for completion of the eighth identifying circuit 208h. The relay PC again is energized, this time through the fourth tens switch 229a (FIG. 40f), and the table conditioning relay PT again is deenergized for stopping the table. If the table has been shifted more than 20 inches to the left of the final position before the "table motion" button is depressed, such depression will result in shifting of the table to the extreme left end of its range of movement where a suitable limit switch (not shown) is actuated to interrupt the supply of power to the motor control circuits and stop the table.

It will be apparent that the novel positioning method and apparatus described above make it possible to locate the table 47 in a desired position accurately within .001 of an inch even where the table is to be moved through relatively long distances on the order of tens of inches. Such a high degree of accuracy is achieved and the positioning operations are simplified due to the novel manner of measuring only the partial increment f of the desired distance a to establish the base reference point b and establishing the table point c merely by selecting the reference element which is spaced to the right of the "0" element the number of whole increment e in the desired distance. This selection may be made automatically because of the circuits 208a to 208j which identify the reference elements in their numerical succession starting with the "0" element. In addition to establishing the table reference point c as an incident to selection of the whole increments on the tens dial 124a, the identifying circuits enable the table to travel at its rapid traverse rate where the desired distance is more than two whole increments. In view of this and the novel manner of positioning the carriage 58, the table may be moved to its desired location accurately and in a short time after only a few manipulations by the machine operator.

I claim as my invention:

1. The combination of first and second machine parts mounted for movement relative to each other along a predetermined path, a plurality of reference elements mounted on said first part and accurately spaced apart along said path equal distances each constituting a whole increment, identifying mechanism establishing one of said elements as a zero element, a reference member mounted on said second part and defining a reference point spaced in one direction along said path from said zero element the part of one of said whole increments that a desired distance of relative movement of said parts exceeds a whole number of the increments, said mechanism including feeler means for sensing the presence of the respective elements adjacent said reference member and giving a different signal when each element is adjacent the member, power actuated means for relatively moving said parts to bring first said zero reference element and then the successive following elements one by one up to said reference point, electrical circuits cooperating with said power means to stop said parts in response to the signal corresponding to a final one of said elements spaced in the opposite direction from said zero element, said number of said whole increments in said desired distance, and other electrical circuits responsive to said signals and cooperating with said power actuated means to shift said parts at a first rate of speed until the signal corresponding to said zero element is given, next to increase the speed to a higher rate until the signal is given for the element preceding said final element and then to decrease the speed to the first rate for the last whole increment and until the signal for the final element is given to stop the parts.

2. The combination of first and second machine parts mounted on said base for movement relative to each other along a predetermined path, a plurality of reference elements mounted on said first part and accurately spaced apart along said path equal distances each constituting a whole increment, means for selecting a number corresponding to the number of said whole increments in a desired distance of relative movement of said parts, identifying mechanism establishing one of said elements as a zero element, a reference member mounted on said second part and defining a reference point spaced in one direction along said path from said zero element the part of one of said increments that said desired distance exceeds said number of whole increments, said mechanism including feeler means for sensing the presence of the respective elements adjacent said reference member and giving a different signal when each element is adjacent the member, means including a power actuator for relatively moving said parts to bring first said zero reference element and then the successive following elements one by one up to said reference point, said mechanism giving said different signals as the respective elements approach said point, and means responsive to said different signals and operable to vary the speed of relative movement of said parts and to stop said actuator after said mechanism gives the signal corresponding to the reference element which is spaced in the opposite direction from said zero element a distance equal to said whole increments in said desired distance.

3. The combination of first and second machine parts mounted for movement relative to each other along a predetermined path, a plurality of reference elements mounted on said first part and spaced apart along said path, a reference member mounted on said second part adjacent said path, feeler means operable to sense the presence of each of said elements adjacent said reference member and to give a different signal corresponding to each element, a plurality of identifying circuits one for each of said elements and each completed in response to the signal of said feeler means corresponding to the associated element, a first selector switch having a plurality of contacts engageable individually by a manually controlled wiper, a second selector switch having an annular series of contact members and an annular series of brush members each engageable individually with a different contact member, conductors connecting each of the members of one of said series to a different one of said identifying circuits, other conductors connecting each of the members of the other of said series to a different one of said first switch contacts, means supporting said series for rotation relative to each other whereby each of said identifying circuits may be connected to any one of said contacts, and means controlling relative movement of said parts in response to completion of the one of said identifying circuits which is connected to the contact of said first switch engaged by said wiper thereof.

4. The combination of first and second machine parts mounted for movement relative to each other along a predetermined path, a plurality of reference elements mounted on said first part and spaced along the path equal distances each constituting a whole increment, a reference member mounted on said second part and defining a reference point spaced along said path in one direction from one of said elements a distance equal to the part of one of said increments that a desired distance of relative movement of said parts exceeds a whole number of the increments, feeler means operable to sense the presence of each of said elements adjacent said reference member and to give a different signal corresponding to each element, a plurality of identifying circuits one for each of said elements and each completed in response to the signal of said feeler means corresponding to the associated element, a selector switch having a plurality of contacts connected in succession to the respective identifying circuits and engageable individually by a manually controlled wiper, a multiple switch interposed in the connections between said circuits and said contacts and adjustable to permit such connections to be changed selectively, and means controlling relative movement of said parts in response to completion of the one of said identifying circuits which is connected to the contact of said first switch engaged by said wiper thereof.

5. The combination of first and second machine parts mounted for movement relative to each other along a predetermined path, a plurality of reference elements mounted on said first part and spaced along said path equal distances each constituting a whole increment, a reference member mounted on said second part and defining a reference point spaced along said path in one direction from one of said elements a distance equal to the part of one of said increments that a desired distance of relative movement of said parts exceeds a whole number of the increments, mechanism identifying said elements in a numerical succession and including feeler means for sensing the presence of the respective elements adjacent said reference and giving a different signal when each element is adjacent the member, resetting means operable to orient said mechanism with respect to said one element and thereby establish the latter as the zero element in said succession, said succession progressing along said path from said zero element in the direction opposite to the spacing of said reference point from the element, means including a power actuator for relatively moving said parts to bring first said zero element and then the following elements in said succession one by one up to said member, and electrical circuits controlling said actuator and conditioned to stop the same in response to the signal of the reference element having the same number in said succession as said whole number of increments in said desired distance.

6. The combination of first and second machine parts mounted for movement relative to each other along a predetermined path, a plurality of reference elements mounted on said first part and spaced apart along said path, a reference member mounted on said second part adjacent said path, a plurality of switches fewer in number than said reference elements and mounted on said second part adjacent said reference member, a plurality of sets of actuators mounted on said first part with each set adjacent a different one of said reference elements and operable to actuate said switches in a different combination when the corresponding element is adjacent said member, a plurality of identifying circuits each corresponding to a different one of said reference elements and completed in response to actuation of said switches by the associated one of said sets of actuators, means for selecting one of said circuits and the associated reference element, and means controlling relative movement of said parts in response to completion of the selected one of said identifying circuits.

7. The combination of first and second machine parts mounted for movement relative to each other along a predetermined path, a plurality of reference elements mounted on said first part and spaced apart along the path equal distances each constituting a whole increment, a reference member mounted on said second part and defining a reference point spaced along said path in one direction from one of said elements a distance equal to the part of one of said increments that a desired distance of relative movement of said parts exceeds a whole number of the increments, feeler means operable to sense the presence of each of said elements adjacent said reference member and to give a different signal corresponding to each element, a plurality of identifying circuits one for each of said elements and each completed in response to the signal of said feeler means corresponding to the associated element, a selector switch having a plurality of contacts connected in succession to the respective identifying circuits and engageable individually by a manually controlled wiper, means including a power actuator for relatively moving said parts and bringing first said one element and then the successive following elements one by one up to said reference member, and means including a control circuit and operable to stop said actuator when the circuit is completed, said circuit extending through said selector switch and the one of said identifying circuits which is connected to the contact engaged by said wiper.

8. The combination of first and second machine parts mounted for movement relative to each other along a predetermined path, a plurality of reference elements mounted on said first part and spaced apart along the path equal distances each constituting a whole increment, a reference member mounted on said second part and defining a reference point spaced along said path in one direction from one of said elements a distance equal to the part of one of said increments that a desired distance of relative movement of said parts exceeds a whole number of the increments, feeler means operable to sense the presence of each of said elements adjacent said reference member and to give a different signal corresponding to each element, a plurality of identifying circuits one for each of said elements and each completed in response to the signal of said feeler means corresponding to the associated element, means including a power actuator for relatively moving said parts and bringing first said one element and then the successive following elements one by one up to said reference member, means including a control circuit and operable to stop said actuator when the circuit is completed, and means operable selectively to extend said control circuit through the identifying circuit corresponding to the reference element which is spaced along said path from said one element on the side thereof opposite said reference member said whole number of said increments whereby said actuator is stopped when such element is adjacent the member.

9. The combination of, a base, a support mounted on said base for movement along a predetermined path, a plurality of reference elements mounted on said support and accurately spaced along said path equal distances each constituting a whole increment, means for selecting a number corresponding to the number of said whole increments in a distance through which it is desired to move said support, a reference member mounted on said base and defining a reference point spaced along said path in one direction from one of said elements a distance equal to the part of one of said increments that said desired distance exceeds said number of increments, feeler means operable to sense the presence of the respective reference elements adjacent said reference point and to give a different signal when each element is adjacent the point, mechanism including said feeler means and identifying said elements in a numerical succession starting with said one element as a zero element and progressing therefrom in the opposite direction along said path, a power actuator for moving said support in said one direction to bring first said zero element and then the following element members in said succession one by one up to said reference point, and means including said identifying mechanism and conditioned in response to the selection of said number to stop said actuator when the mechanism gives the signal corresponding to the one of said elements having the same number in said succession as the number corresponding to the said whole increments in said desired distance.

10. The combination of first and second machine parts mounted on said base for movement relative to each other along a predetermined path, a plurality of reference elements mounted on said first part and accurately spaced apart along said path equal distances each constituting a whole increment, means for selecting a number corresponding to the whole number of said increments in a desired distance of relative movement of said parts, identifying mechanism establishing a selected one of said elements as a zero element, a reference member mounted on said second part and defining a reference point spaced in one direction along said path from said zero element the part of one of said increments that said desired distance exceeds said whole number of increments, said mechanism including feeler means for sensing the presence of the respective elements adjacent said reference member and giving a different signal when each element is adjacent the member, means including a power actuator for relatively moving said parts to bring first said zero reference element and then the successive following elements one by one up to said reference point, said mechanism giving said different signals as the respective elements approach said point, and means conditioned in response to the selection of said number corresponding to said whole number to stop said actuator after the mechanism gives the signal corresponding to the reference element which is spaced in the opposite direction from said zero element a distance equal to said whole increments in said desired distance.

11. The combination of first and second machine parts mounted for movement relative to each other along a predetermined path, a reference element mounted on said first part, a reference member disposed in a zero position with respect to said element and mounted on said second part for movement longitudinally of said path within a limited range divided into a plurality of smaller ranges one of which includes said zero position, power actuated means including a shaft for shifting said member back and forth, means for selecting a number comprising a plurality of digits and corresponding to a desired spacing of a final position of said member in one direction along said path from said zero position, a plurality of commutators having brushes driven from said shaft in ratios of ten to one and each wiping across a different annular series of segments, each of said commutators corresponding to a different digit of said number, first electrical circuits including certain of said commutators corresponding to a higher order digit portion of said number, said first circuits cooperating with said power means to shift said member away from said zero position in the direction opposite to said one direction a short distance sufficient that said brush of at least one of said higher order commutators moves out of engagement with the associated segment engaged by the brush while the member is in the zero position, second electrical circuits including said higher order commutators and cooperating with said power means to shift said member at a first rate of speed in said one direction through said zero position and a short distance beyond said final position, third electrical circuits including all of said commutators and cooperating with said power means to shift said member in said opposite direction and into said final position at a second rate of speed slower than said first rate, means providing a different signal when said member is in each of said smaller ranges, said signal means cooperating with said second electrical circuits to prevent stopping of said member while the latter is adjacent said zero position and before it reaches said final position during its movement in said one direction, and second power actuated means operable after said carriage is in said final position to move said parts relative to each other to bring said reference element and said member toward each other.

12. The combination of first and second machine parts mounted for movement relative to each other along a predetermined path, a reference element mounted on said first part, a reference member disposed in a zero position with respect to said element and mounted on said second part for movement back and forth longitudinally of said path, power actuated means including a shaft for shifting said member back and forth, means for selecting a number comprising a plurality of digits and corresponding to a desired spacing of a final position of said member in one direction along said path from said zero position, a plurality of commutators having brushes driven from said shaft in ratios of ten to one and each engageable with a different annular series of segments, each of said commutators corresponding to a different digit of said number, first electrical circuits including certain of said commutators corresponding to a higher order digit portion of said number, said first circuits cooperating with said power means to shift said member away from said zero position in the direction opposite to said one direction a short distance sufficient that said brush of at least one of said higher order commutators moves out of engagement with the associated segment engaged by the brush while the member is in the zero position, second electrical circuits including said higher order commutators and cooperating with said power means to shift said member at a first rate of speed in said one direction through said zero position and a short distance beyond said final position, third electrical circuits including all of said commutators and cooperating with said power means to shift said member in said opposite direction and into said final position at a second rate of speed slower than said first rate, and second power actuated means operable after said member is in said final position to move said parts relative to each other to bring said reference element toward and up to the member.

13. The combination of first and second machine parts mounted for movement relative to each other along a predetermined path, a plurality of reference elements mounted on said first part and equally spaced apart along said path to define equal whole increments of distance, a member defining a first reference point and mounted on said second part for movement longitudinally of said path and back and forth in a limited range, power operated means for shifting said member within said range thereof, electrical circuits controlling said power means and cooperating therewith to move said member first in one direction to one end of said range, next in the opposite direction until the member reaches and moves a short distance beyond a zero one of said elements and then back in said one direction and into a zero position with respect to such element, counting mechanism responsive to the selection of a number corresponding to a part of one of said increments contained in a desired distance of relative movement of said parts, said counting mechanism cooperating with said power means to shift said member first in said opposite direction away from said zero position and beyond a final position and then in said one direction and back into the final position which is spaced from the zero position a distance equal to said part of one increment, means for establishing a second reference point on the one of said reference elements spaced in said one direction from said zero element the number of said whole increments in said desired distance, and power actuated means for relatively shifting said parts to move said second reference point toward said first point and stopping the parts when the second point reaches the first point.

14. The combination of first and second machine parts mounted for movement relative to each other along a predetermined path, a plurality of reference elements mounted on said first part and equally spaced apart along said path to define equal whole increments of distance, a member defining a first reference point and mounted on said second part for movement longitudinally of said path and back and forth in a limited range, power operated means for shifting said member within said range thereof, electrical circuits controlling said power means and cooperating therewith to move said member in one direction and into a zero position with respect to one of said elements disposed within said range, counting mechanism responsive to the selection of a number corresponding to a part of one of said increments contained in a desired distance of relative movement of said parts, said counting mechanism cooperating with said power means to shift said member first in the direction opposite to said one direction away from said zero position and beyond a final position and then in the one direction and back into the final position, said final position being spaced from the zero position a distance equal to said part of one increment, means for establishing a second reference point on the one of said reference elements spaced in said one direction from said zero element the number of said whole increments in said desired distance, and power actuated means for relatively shifting said parts to move said second reference point toward said first point and stopping the parts when the second point reaches the first point.

15. The combination of first and second machine parts mounted for movement relative to each other along a predetermined path, a plurality of reference elements mounted on said first part and spaced apart along said path, a carriage mounted on said second part for movement longitudinally of said path within a limited range, power actuated means for shifting said carriage within said range, electrical circuits controlling said power means and cooperating therewith to shift said carriage to one end of said range and then away from such end and into a zero position with respect to the first one of said elements spaced from the end, means for selecting one of said elements and giving a signal when the element is disposed adjacent said carriage, and means controlling the relative movement of said parts and operable to stop such movement in response to said signal.

16. The combination of first and second machine parts mounted for movement relative to each other along a predetermined path, a plurality of reference elements mounted on said first part and spaced apart along said path, a reference member mounted on said second part for movement back and forth between an inactive position spaced from the path of said elements and an active position disposed in such path for engagement with and movement by one of the elements during relative movement of the parts, means for selecting one of said elements and giving a signal when the element and said member are approaching each other during relative movement of said parts, means normally retaining said member in said inactive position for movement past reference elements other than said selected one and operable in response to said signal to move said member into said active position for engagement with said selected element, electrical control means responsive to movement of said reference member and operable to give first and second control signals in succession during movement of the member after engagement of the same with said selected element, and means controlling relative movement of said parts and operable to reduce the speed of such movement in response to said first control signal and to stop such movement in response to said second signal.

17. The combination of first and second machine parts mounted for movement relative to each other along a predetermined path, a plurality of reference elements mounted on said first part and spaced apart along said path, a reference member mounted on said second part for movement back and forth between an inactive position spaced from the path of said elements and an active position disposed in such path for engagement with and movement by one of the elements during relative movement of the parts, means for selecting one of said elements and giving a signal when the element and said member are approaching each other during relative movement of said parts, means retaining said member in said inactive position for movement past said elements other than the selected one and operable in response to said signal to move said member into said active position for engagement with said selected element, and means controlling relative movement of said parts and operable to stop such movement in response to movement of said member upon engagement with said selected element.

18. The combination of first and second machine parts mounted for movement relative to each other along a predetermined path, a plurality of reference elements mounted on said first part and spaced apart along said path, a reference member mounted on said second part, said member and said elements being mounted for relative movement transversely of said path and back and forth between retracted positions in which the member and the elements move past each other during relative movement of said parts and advanced positions in which the member is disposed in the path of and engageable with the elements, means for selecting one of said elements and giving a signal when the element and said member are approaching each other during relative movement of said parts, means retaining said member and said elements in said retracted positions before said signal is given and operable in response to said signal to move said member and said elements relative to each other transversely of said path and into said active positions for engagement of the member with said selected element, and means controlling relative movement of said parts and operable to stop such movement in response to engagement of said member with said selected element.

19. The combination of first and second machine parts mounted for movement relative to each other along a predetermined path, a reference element mounted on said first part, a reference member disposed in a zero position with respect to said element and mounted on said second part for movement longitudinally of said path within a limited range divided into a plurality of smaller ranges one of which includes said zero position, power actuated means including a shaft for shifting said member back and forth, means for selecting a number comprising a plurality of digits and corresponding to a desired spacing of a final position of said member in one direction along said path from said zero position, a plurality of commutators having brushes driven from said shaft in fixed ratios and each wiping across a different annular series of segments, each of said commutators corresponding to a higher order digit portion of said number, said first circuits cooperating with said power means to shift said member initially from said zero position in the direction opposite to said one direction a short distance sufficient that said brush of at least one of said higher order commutators moves out of engagement with the associated segment engaged by the brush while the member is in the zero position, second electrical circuits including all of said commutators and cooperating with said power means after initial shifting of said member in said opposite direction to shift the member in said one direction through said zero position and into said final position, means providing a different signal when said member is in each of said smaller ranges, said signal means cooperating with said second electrical circuits to prevent stopping of said member while the latter is adjacent said zero position and before it reaches said final position during its movement in said one direction, and second power actuated means operable after said carriage is in said final position to move said parts relative to each other to bring said reference element and said member toward each other.

20. The combination of first and second machine parts mounted for movement relative to each other along a predetermined path, a reference element mounted on said first part, a reference member disposed in a zero position with respect to said element and mounted on said second part for movement back and forth longitudinally of said path, power actuated means including a shaft for shifting said member back and forth, means for selecting a number comprising a plurality of digits and corresponding to a desired spacing of a final position of said member in one direction along said path from said zero position, a plurality of commutators having brushes driven from said shaft in fixed ratios and each engageable with a different annular series of segments, each of said commutators coresponding to a different digit of said number, first electrical circuits including certain of said commutators corresponding to a higher order digit portion of said number, said first circuit cooperating with said power means to shift said member initially away from said zero position in the direction opposite to said one direction a short distance sufficient that said brush of at least one of said higher order commutators moves out of engagement with the associated segment engaged by the brush while the member is in the zero position, second electrical circuits including all of said commutators and cooperating with said power means after initial shifting of said member in said opposite direction to shift the member in said one direction through said zero position and into said final position, and second power actuated means operable after said member is in said final position to move said parts relative to each other to bring said reference element toward and up to the member.

21. The combination of first and second machine parts mounted for movement relative to each other along a predetermined path, a carriage mounted on said second part for movement longitudinally of said path within a limited range, a reference element mounted on said first part within said range, power actuated means for shifting said carriage within said range, first electrical circuits controlling said power means and cooperating therewith to shift said carriage to one end of said range and then away from such end and into a zero position with respect to said reference element, second electrical circuits controlling said power means and cooperating therewith to shift said carriage out of said zero position to a final position spaced a desired distance from the zero position and said reference element, means for giving a signal when said element is disposed adjacent said carriage after the latter is in said final position, and means controlling the relative movement of said parts and operable to stop such movement in response to said signal.

22. The combination of first and second machine parts mounted for movement relative to each other along a predetermined path, a reference element mounted on said first part and disposed along said path, a reference member mounted on said second part for movement back and forth between an inactive position spaced from said path and an active position disposed in the path for engagement with and movement by said element during relative movement of the parts, means for giving a signal when said element and said member are approaching each other during relative movement of said parts, means normally retaining said member in said inactive position for movement past said element and operable in response to said signal to move the member into said active position for engagement with the element, and means controlling relative movement of said parts and operable to stop such movement in response to movement of said member upon engagement with said element.

23. The combination of first and second machine parts mounted for movement relative to each other along a predetermined path, a reference element mounted on said first part and disposed along said path, a reference member mounted on said second part, said member and said element being mounted for relative movement transversely of said path and back and forth between retracted positions in which the member and the element move past each other during relative movement of said parts and advanced positions in which the member is disposed in the path of and engageable with the element, means for giving a signal when said element and said member are approaching each other during relative movement of said parts, means retaining said member and said elements in said retracted positions before said signal is given and operable in response to said signal to move said member and said element relative to each other transversely of said path and into said active positions for engagement of the member with the element, and means controlling relative movement of said parts and operable to stop such movement in response to engagement of said member with said element.

24. The combination of, a base, a support mounted on said base and movable in one direction along a predetermined path, means for selecting first and second numbers corresponding respectively to a number of equal whole increments and to a part of one such increment of a distance through which it is desired to move said support, a plurality of reference elements mounted on said support and accurately spaced apart along said path equal distances each equal to one of said whole increments, a reference member mounted on said base for movement back and forth along said path and defining a reference point, a power actuator means for shifting said member, electrical circuits controlling said power means and operable when rendered effective to energize the same to shift said member to a zero position with respect to one of said elements, counting mechanism responsive to the selection of said second number and cooperating with said power means to shift said member to a final position spaced from said zero position in said one direction a distance equal to said partial increment, a second power actuated means for moving said support in said one direction to bring first said one element and then the successive following elements one by one up to said reference member, mechanism responsive to said reference member and conditioned in response to the selection of said first number to give a signal when said reference point is reached by the reference element spaced from said zero element in the opposite direction along said path a distance equal to said number of whole increments, and means controlling said second power means and operable to stop the same in response to said signal.

25. The combination of first and second machine parts mounted for movement relative to each other along a predetermined path, means for selecting first and second numbers corresponding respectively to a number of equal whole increments and to a part of one such increment of a desired distance of relative movement of said parts, a plurality of reference elements mounted on said first part and accurately spaced apart along said path equal distances each equal to one of said whole increments, a reference member mounted on said second part for movement back and forth along said path and defining a reference point, first power actuator means for shifting said member, electrical circuits controlling said power means and operable when rendered effective to energize the same to shift said member to a zero position with respect to one of said elements, counting mechanism responsive to the selection of said second number and cooperating with said power means to shift said member to a final position spaced from said zero position in one direction along said path a distance equal to said part of one increment, a second power actuator means for relatively moving said parts to bring first said one element and then the successive following elements one by one up to said member, mechanism responsive to said reference member and conditioned in response to the selection of said first number to give a signal when said reference point is reached by the reference element spaced from said zero element in the opposite direction along said path a distance equal to said number of whole increments, and means controlling said second power means and operable to stop the same in response to said signal.

26. The combination of, a base, a support mounted on said base and movable in one direction along a predetermined path, means for selecting first and second numbers corresponding respectively to a number of equal whole increments and to a part of one such increment of a distance through which it is desired to move said support, a plurality of reference elements mounted on said support and accurately spaced apart along said path equal distances each equal to one of said whole increments, a carriage mounted on said base for movement back and forth along said path, a member supported on said carriage and defining a reference point, means conditioned in response to the selection of said second number and operable to move said carriage to space said point from one of said elements in said one direction a distance equal to said partial increment, mechanism identifying said elements in a numerical succession starting with said one element and progressing therefrom in the opposite direction along said path, a power actuator for moving said support in said one direction to bring first said one element and then the successive following elements one by one up to said reference point, means including said mechanism responsive to said member and conditioned in response to the selection of said first number to give a signal when said reference point is reached by the element having the same number in said succession as the first number, and means for stopping said actuator in response to said signal.

27. The combination of first and second machine parts mounted for movement relative to each other along a predetermined path, means for selecting first and second numbers corresponding respectively to a number of equal whole increments and to a part of one such increment of a desired distance of relative movement of said parts, a plurality of reference elements mounted on said first part and accurately spaced apart along said path equal distances each equal to one of said whole increments, a reference member mounted on said second part for movement back and forth along said path and defining a reference point, mechanism conditioned in response to the selection of said second number and operable to move said member to space said point from a zero one of said elements in one direction a distance equal to said partial increment, other mechanism identifying said elements in a numerical succession starting with said zero element and progressing therefrom in the opposite direction along said path, means including a power actuator for relatively moving said parts to bring first said one element and then the successive following elements one by one up to said reference point, means including said other mechanism responsive to said reference member and conditioned in response to the selection of said first number to give a signal when said reference point is reached by the element having the same number in said succession, and means for stopping said actuator in response to said signal.

References Cited in the file of this patent

UNITED STATES PATENTS

| | | |
|---|---|---|
| 1,241,258 | Hawthorne | Sept. 25, 1917 |
| 2,012,249 | Sassen | Aug. 20, 1935 |
| 2,311,142 | Turrettini | Feb. 16, 1943 |
| 2,561,346 | De Vlieg | July 24, 1951 |
| 2,694,804 | Wagner | Nov. 16, 1954 |
| 2,722,853 | Knosp | Nov. 8, 1955 |
| 2,748,665 | Senn | June 5, 1956 |